US012035857B1

(12) United States Patent
Cottrell et al.

(10) Patent No.: US 12,035,857 B1
(45) Date of Patent: Jul. 16, 2024

(54) EXTRACTION CLEANER

(71) Applicant: SHARKNINJA OPERATING LLC, Needham, MA (US)

(72) Inventors: Lee M. Cottrell, Edenbridge (GB); Daniel Innes, Houghton Regis (GB); Jordan Ridgley, High Wycombe (GB); Philippa Copeland, Hayling Island (GB); Mingliang Qin, Suzhou (CN); Xuemei Liu, Suzhou (CN); Ying Dong, Suzhou (CN); Bin Yao, Suzhou (CN); Cong Su, Suzhou (CN); Dawei Liu, Suzhou (CN); Xiang Zhou, Suzhou (CN); Heliang Chen, Suzhou (CN); Richard Dahlgren, Plymouth, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/207,503

(22) Filed: Jun. 8, 2023

Related U.S. Application Data

(63) Continuation of application No. PCT/CN2023/083672, filed on Mar. 24, 2023.
(Continued)

(51) Int. Cl.
*A47L 11/30* (2006.01)
*A47L 11/34* (2006.01)
(Continued)

(52) U.S. Cl.
CPC ............... *A47L 11/30* (2013.01); *A47L 11/34* (2013.01); *A47L 11/4016* (2013.01);
(Continued)

(58) Field of Classification Search
CPC ... A47L 5/24; A47L 5/225; A47L 5/28; A47L 9/106; A47L 9/122; A47L 9/165;
(Continued)

(56) References Cited

U.S. PATENT DOCUMENTS

| | | | |
|---|---|---|---|
| 5,937,475 | A | 8/1999 | Kasen et al. |
| 6,041,472 | A | 3/2000 | Kasen et al. |

(Continued)

FOREIGN PATENT DOCUMENTS

| | | | | |
|---|---|---|---|---|
| CA | 2598834 | A1 * | 8/2006 | .......... A47L 11/4083 |
| CN | 100563543 | | 12/2009 | |

(Continued)

OTHER PUBLICATIONS

PCT International Search Report and Written Opinion, mailed Dec. 22, 2023, received in PCT Application No. PCT/CN23/101236, 10 pages.

*Primary Examiner* — David Redding
(74) *Attorney, Agent, or Firm* — Grossman Tucker Perreault & Pfleger, PLLC

(57) ABSTRACT

An extraction cleaner may include a cleaner body including a pump and a suction motor, a supply tank configured to be removably coupled to the cleaner body and configured to receive a first cleaning fluid, an additive tank configured to receive a second cleaning fluid, a recovery tank configured to be removably coupled to the cleaner body, and a cleaning tool including a fluid applicator and a cleaning assembly, the fluid applicator is configured to deliver one of the first cleaning fluid or a mixture of the first cleaning fluid and the second cleaning fluid to a surface to be cleaned and the cleaning assembly is configured to extract at least a portion of the delivered first cleaning fluid or at least a portion of the delivered mixture.

8 Claims, 38 Drawing Sheets

Related U.S. Application Data

(60) Provisional application No. 63/440,254, filed on Jan. 20, 2023.

(51) Int. Cl.

| | |
|---|---|
| ***A47L 11/40*** | (2006.01) |
| ***C11D 3/00*** | (2006.01) |
| ***C11D 3/10*** | (2006.01) |
| ***C11D 3/33*** | (2006.01) |
| ***C11D 3/39*** | (2006.01) |

(52) U.S. Cl.
CPC ....... *A47L 11/4044* (2013.01); *A47L 11/4083* (2013.01); *C11D 3/0031* (2013.01); *C11D 3/10* (2013.01); *C11D 3/33* (2013.01); *C11D 3/3942* (2013.01); *C11D 3/3945* (2013.01); *C11D 3/3947* (2013.01); *C11D 2111/12* (2024.01)

(58) Field of Classification Search
CPC .... A47L 9/1666; A47L 9/1683; A47L 9/1691; A47L 9/22; A47L 9/2868; A47L 9/322; A47L 9/125; A47L 9/1608; A47L 9/1675; A47L 9/20
See application file for complete search history.

(56) References Cited

U.S. PATENT DOCUMENTS

| | | | | |
|---|---|---|---|---|
| 6,131,237 | A | 10/2000 | Kasper et al. | |
| 6,134,744 | A | 10/2000 | Kasen et al. | |
| 6,279,196 | B2 | 8/2001 | Kasen et al. | |
| 6,550,694 | B1 | 4/2003 | Foster et al. | |
| 6,775,880 | B2 | 8/2004 | Kasper et al. | |
| 6,968,593 | B1 | 11/2005 | Lenkiewicz et al. | |
| 7,021,499 | B2 | 4/2006 | Hansen et al. | |
| 7,073,226 | B1 | 7/2006 | Lenkiewicz et al. | |
| 7,156,324 | B2 | 1/2007 | Birrenkott et al. | |
| 7,225,503 | B1 | 6/2007 | Lenkiewicz et al. | |
| 7,254,864 | B2 | 8/2007 | Cipolla et al. | |
| 7,293,324 | B2 | 11/2007 | Chui et al. | |
| 7,331,082 | B2 | 2/2008 | Hertrick et al. | |
| 7,448,114 | B2 | 11/2008 | Basham et al. | |
| 7,484,265 | B2 | 2/2009 | Kasper et al. | |
| 7,617,563 | B2 | 11/2009 | Hertrick et al. | |
| 7,631,386 | B1 | 12/2009 | Santiago et al. | |
| 7,718,593 | B2 | 5/2010 | Micciche et al. | |
| 7,725,984 | B2 | 6/2010 | Jansen | |
| 7,784,311 | B2 | 8/2010 | Santoemma et al. | |
| 7,849,556 | B1 | 12/2010 | Jansen | |
| 7,862,623 | B1 | 1/2011 | Hansen et al. | |
| 7,870,637 | B2 | 1/2011 | Parr et al. | |
| 7,906,473 | B2 | 3/2011 | Williams et al. | |
| 7,954,200 | B2 | 6/2011 | Leonatti et al. | |
| 7,979,955 | B2 | 7/2011 | Lenkiewicz et al. | |
| 8,099,829 | B2 | 1/2012 | Grove et al. | |
| 8,122,562 | B2 | 2/2012 | Krebs | |
| 8,291,546 | B2 | 10/2012 | Louis et al. | |
| 8,338,354 | B2 | 12/2012 | Williams et al. | |
| 8,375,506 | B2 | 2/2013 | Chaney | |
| 8,418,310 | B2 | 4/2013 | Krebs et al. | |
| 8,370,991 | B2 | 5/2013 | Paliobeis et al. | |
| 8,621,708 | B2 | 1/2014 | Lenkiewicz et al. | |
| 8,631,538 | B2 | 1/2014 | Huffman | |
| 8,784,504 | B2 | 7/2014 | Williams et al. | |
| 8,881,344 | B2 | 11/2014 | Akin | |
| 8,991,000 | B2 | 3/2015 | Huffman et al. | |
| 9,015,898 | B2 | 4/2015 | Nguyen | |
| 9,138,119 | B1 | 9/2015 | Bantum | |
| 9,282,869 | B2 | 3/2016 | Wall et al. | |
| 9,320,402 | B2 | 4/2016 | Krondorfer et al. | |
| 9,452,440 | B2 | 9/2016 | Taggart et al. | |
| 9,572,464 | B2 | 2/2017 | Wehner | |
| 9,615,703 | B2 | 4/2017 | Moyher, Jr. et al. | |
| 9,615,713 | B2 | 4/2017 | Salo et al. | |
| 9,717,389 | B2 | 8/2017 | Johnson et al. | |
| 10,188,253 | B2 | 1/2019 | Miller | |
| 10,189,614 | B2 | 1/2019 | Pruiett | |
| 10,342,402 | B2 | 7/2019 | Lenkiewicz et al. | |
| 10,368,710 | B1 | 8/2019 | Robinson et al. | |
| 10,588,476 | B2 | 3/2020 | Royale et al. | |
| 10,674,881 | B2 | 6/2020 | Chavana, Jr. et al. | |
| 10,893,786 | B2 | 1/2021 | Quintero et al. | |
| 10,986,975 | B2 | 4/2021 | Rukavina et al. | |
| 11,083,170 | B2 | 8/2021 | Moyher, Jr. et al. | |
| 11,089,935 | B2 | 8/2021 | Nguyen | |
| 11,101,088 | B2 | 8/2021 | Holsten | |
| 11,172,799 | B2 | 11/2021 | Rukavina et al. | |
| 11,172,801 | B2 | 11/2021 | Pohlman et al. | |
| 11,229,338 | B2 | 1/2022 | Royale | |
| 11,259,679 | B2 | 3/2022 | Royale | |
| 11,363,923 | B2 | 6/2022 | Paulla et al. | |
| D958,478 | S | 7/2022 | Benacquisto | |
| 11,432,696 | B2 | 9/2022 | Bloemendaal et al. | |
| 11,484,171 | B2 | 11/2022 | Bloom et al. | |
| 2001/0000576 | A1 | 5/2001 | Robinson | |
| 2004/0040579 | A1* | 3/2004 | Smith | A47L 11/4036 15/98 |
| 2004/0226584 | A1 | 11/2004 | Guest et al. | |
| 2009/0108021 | A1* | 4/2009 | Hansen | C12N 15/8247 222/105 |
| 2012/0053103 | A1* | 3/2012 | Sivik | C11D 17/049 510/276 |
| 2012/0129755 | A1* | 5/2012 | Zhu | C11D 3/3947 510/372 |
| 2019/0021565 | A1 | 1/2019 | Fester | |
| 2019/0144783 | A1* | 5/2019 | Panandiker | C11D 3/3738 510/320 |
| 2020/0093344 | A1 | 3/2020 | Quintero et al. | |
| 2020/0237173 | A1 | 7/2020 | Bloemendaal et al. | |
| 2021/0051921 | A1 | 2/2021 | Hoffmann et al. | |
| 2021/0153709 | A1 | 5/2021 | Luyckx | |
| 2021/0330159 | A1 | 10/2021 | Rukavina | |
| 2022/0133113 | A1 | 5/2022 | Wright et al. | |
| 2022/0183527 | A1* | 6/2022 | Kessler | A47L 11/28 |
| 2022/0296072 | A1 | 9/2022 | Royale | |

FOREIGN PATENT DOCUMENTS

| | | | |
|---|---|---|---|
| CN | 100593386 | | 3/2010 |
| CN | 101862167 | | 10/2010 |
| CN | 1767782 | | 1/2011 |
| CN | 102068218 | | 5/2011 |
| CN | 102655796 | | 9/2012 |
| CN | 102711577 | | 10/2012 |
| CN | 202699035 | U | 1/2013 |
| CN | 103494577 | | 1/2014 |
| CN | 104172996 | | 12/2014 |
| CN | 104244790 | | 12/2014 |
| CN | 104545707 | | 4/2015 |
| CN | 103079444 | | 9/2015 |
| CN | 105030149 | | 11/2015 |
| CN | 102670138 | | 12/2015 |
| CN | 102085082 | | 2/2016 |
| CN | 102100504 | | 2/2016 |
| CN | 103079445 | | 6/2016 |
| CN | 205514395 | U | 8/2016 |
| CN | 106308684 | | 1/2017 |
| CN | 106455891 | | 2/2017 |
| CN | 106455892 | | 2/2017 |
| CN | 206026220 | U | 3/2017 |
| CN | 103654631 | | 5/2017 |
| CN | 106955064 | | 7/2017 |
| CN | 107504302 | | 12/2017 |
| CN | 107837048 | | 3/2018 |
| CN | 207412116 | U | 5/2018 |
| CN | 108201420 | | 6/2018 |
| CN | 108289576 | | 7/2018 |
| CN | 109157156 | | 1/2019 |
| CN | 208822676 | U | 5/2019 |
| CN | 209236011 | | 8/2019 |
| CN | 209252673 | U | 8/2019 |
| CN | 209463915 | U | 10/2019 |

(56) References Cited

FOREIGN PATENT DOCUMENTS

| | | | |
|---|---|---|---|
| CN | 209863666 U | | 12/2019 |
| CN | 209884055 U | | 1/2020 |
| CN | 110996744 | | 4/2020 |
| CN | 110996745 | | 4/2020 |
| CN | 210749042 U | | 6/2020 |
| CN | 111366546 | | 7/2020 |
| CN | 211066435 U | | 7/2020 |
| CN | 211460027 U | | 9/2020 |
| CN | 211911482 U | | 11/2020 |
| CN | 211933874 U | | 11/2020 |
| CN | 212140337 U | | 12/2020 |
| CN | 212234331 U | | 12/2020 |
| CN | 112367889 | | 2/2021 |
| CN | 112384116 A | | 2/2021 |
| CN | 112401734 | | 2/2021 |
| CN | 112469319 | | 3/2021 |
| CN | 212996290 U | | 4/2021 |
| CN | 213155687 U | | 5/2021 |
| CN | 112890700 | | 6/2021 |
| CN | 112971637 A | | 6/2021 |
| CN | 213306830 U | | 6/2021 |
| CN | 213488638 U | | 6/2021 |
| CN | 213696753 U | | 7/2021 |
| CN | 113317729 | | 8/2021 |
| CN | 214073176 | | 8/2021 |
| CN | 214073184 U | | 8/2021 |
| CN | 113349688 | | 9/2021 |
| CN | 113365536 | | 9/2021 |
| CN | 113413098 | | 9/2021 |
| CN | 113423319 | | 9/2021 |
| CN | 113440067 | | 9/2021 |
| CN | 113455967 | | 10/2021 |
| CN | 113455970 | | 10/2021 |
| CN | 113455975 | | 10/2021 |
| CN | 214344711 U | | 10/2021 |
| CN | 113633231 | | 11/2021 |
| CN | 113662481 | | 11/2021 |
| CN | 214549279 U | | 11/2021 |
| CN | 113749555 | | 12/2021 |
| CN | 113796790 | | 12/2021 |
| CN | 214965146 U | | 12/2021 |
| CN | 214965148 U | | 12/2021 |
| CN | 215016860 U | | 12/2021 |
| CN | 215016861 U | | 12/2021 |
| CN | 215078099 U | | 12/2021 |
| CN | 215078100 U | | 12/2021 |
| CN | 215305556 U | | 12/2021 |
| CN | 215305557 U | | 12/2021 |
| CN | 215348728 U | | 12/2021 |
| CN | 113876265 | | 1/2022 |
| CN | 113907660 | | 1/2022 |
| CN | 215534063 U | | 1/2022 |
| CN | 215605493 U | | 1/2022 |
| CN | 215650890 U | | 1/2022 |
| CN | 215687555 U | | 2/2022 |
| CN | 215738733 U | | 2/2022 |
| CN | 215820815 U | | 2/2022 |
| CN | 215820816 U | | 2/2022 |
| CN | 215899553 U | | 2/2022 |
| CN | 215914450 U | | 3/2022 |
| CN | 215914451 U | | 3/2022 |
| CN | 215914452 U | | 3/2022 |
| CN | 215937239 U | | 3/2022 |
| CN | 216020832 U | | 3/2022 |
| CN | 216135799 U | | 3/2022 |
| CN | 216167268 U | | 4/2022 |
| CN | 216167270 U | | 4/2022 |
| CN | 216221348 U | | 4/2022 |
| CN | 216221349 U | | 4/2022 |
| CN | 216221357 U | | 4/2022 |
| CN | 216221359 U | | 4/2022 |
| CN | 216256945 U | | 4/2022 |
| CN | 216256946 U | | 4/2022 |
| CN | 216393951 U | | 4/2022 |
| CN | 114467789 | | 5/2022 |
| CN | 216417048 U | | 5/2022 |
| CN | 216495121 U | | 5/2022 |
| CN | 216495122 U | | 5/2022 |
| CN | 216495149 U | | 5/2022 |
| CN | 216569816 U | | 5/2022 |
| CN | 216602698 | | 5/2022 |
| CN | 216702464 U | | 6/2022 |
| CN | 216754364 U | | 6/2022 |
| CN | 216754370 | | 6/2022 |
| CN | 216823277 U | | 6/2022 |
| CN | 216907858 U | | 7/2022 |
| CN | 216932976 U | | 7/2022 |
| CN | 216933048 U | | 7/2022 |
| CN | 216962308 U | | 7/2022 |
| CN | 216962335 U | | 7/2022 |
| CN | 216984752 U | | 7/2022 |
| CN | 216984785 U | | 7/2022 |
| CN | 217013876 U | | 7/2022 |
| CN | 217013889 U | | 7/2022 |
| CN | 217040013 U | | 7/2022 |
| CN | 217066291 U | | 7/2022 |
| CN | 217090576 U | | 8/2022 |
| CN | 217090599 U | | 8/2022 |
| CN | 217244165 U | | 8/2022 |
| CN | 217285620 | | 8/2022 |
| CN | 217285629 U | | 8/2022 |
| CN | 217338449 U | | 9/2022 |
| CN | 217338462 U | | 9/2022 |
| CN | 217365692 U | | 9/2022 |
| CN | 217365738 U | | 9/2022 |
| CN | 217447589 U | | 9/2022 |
| CN | 217488567 U | | 9/2022 |
| CN | 217610853 U | | 10/2022 |
| CN | 217610857 U | | 10/2022 |
| CN | 217610878 U | | 10/2022 |
| CN | 217610879 U | | 10/2022 |
| CN | 217659596 U | | 10/2022 |
| CN | 217852767 U | | 11/2022 |
| CN | 217852795 U | | 11/2022 |
| CN | 217938109 U | | 12/2022 |
| CN | 217959965 U | | 12/2022 |
| CN | 217987467 U | | 12/2022 |
| WO | WO2004089179 | * | 10/2004 .......... A47L 11/4088 |
| WO | 2022119817 A1 | | 6/2022 |

* cited by examiner

EXTRACTION CLEANER

CROSS-REFERENCE TO RELATED APPLICATIONS

The present application is a continuation of PCT/CN2023/083672 filed on Mar. 24, 2023, entitled Extraction Cleaner, claims the benefit of U.S. Provisional Application Ser. No. 63/440,254 filed on Jan. 20, 2023, entitled Extraction Cleaner, each of which are fully incorporated herein by reference.

TECHNICAL FIELD

The present disclosure is generally directed to extraction cleaners and more specifically to portable extraction cleaners configured to be moved about an environment by an operator.

BACKGROUND INFORMATION

Surface cleaning apparatuses are configured to clean one or more surfaces within an environment (e.g., a floor). An example surface cleaning apparatus includes an extraction cleaner. An extraction cleaner is configured to apply at least one liquid (e.g., water) to a surface to be cleaned and to suction the applied liquid from the surface to be cleaned. At least a portion of any debris (e.g., liquid debris or solid debris) on the surface to be cleaned becomes entrained within the applied liquid such that debris laden liquid (or dirty liquid) can be collected within the extraction cleaner for later disposal.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to an extraction cleaner. The extraction cleaner includes a body, a supply tank removably coupled to the body, an additive tank removably coupled to the body, a recovery tank removably coupled to the body, a fluid pump fluidly coupled to the supply and additive tanks, a suction motor fluidly coupled to the recovery tank, and a cleaning tool having a fluid applicator fluidly coupled to the pump and a suction inlet fluidly coupled to the recovery tank. The supply tank is configured to store a first fluid and the additive tank is configured to store a second fluid, the first and second fluids may be different fluids. The pump is configured to urge one or more of the first and/or second fluid(s) through the fluid applicator of the cleaning tool such that the first and/or second fluid(s) are applied to a surface to be cleaned (e.g., a floor). The suction motor is configured to draw at least a portion of the applied first and/or second fluid(s) into the suction inlet of the cleaning tool to be deposited within the recovery tank.

The extraction cleaner may further include a flexible hose configured to fluidly couple the cleaning tool to the recovery tank. The flexible hose may include a first end coupled (e.g., removably or non-removably) to the body and a second end coupled (e.g., removably or non-removably) to the cleaning tool such that the cleaning tool may be moved independently of the body of the extraction cleaner. For example, the extraction cleaner may include a handle coupled to the body such that the body can be carried in one hand of a user and the cleaning tool may be carried in the other hand of the user.

Figure 1:
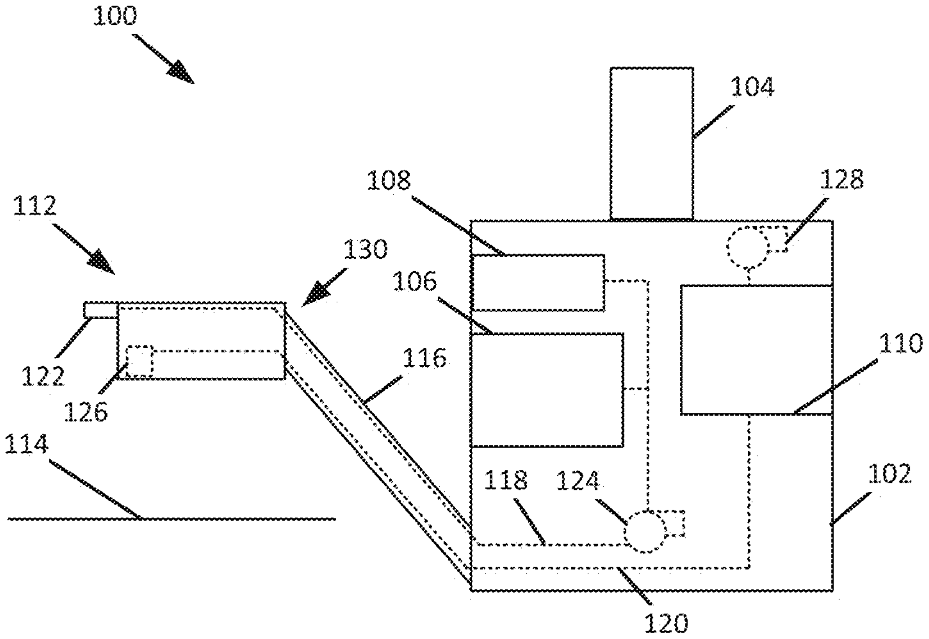
FIG. 1 shows a schematic example of a handheld extraction cleaner, consistent with embodiments of the present disclosure.

FIG. 1 shows a schematic example of a handheld extraction cleaner 100. As shown, the handheld extraction cleaner 100 includes a cleaner body 102, a carry handle 104 for carrying the cleaner body 102, a supply tank 106 configured for receiving a first cleaning fluid, an additive tank 108 configured for receiving a second cleaning fluid, a recovery tank 110, and a cleaning tool 112. The cleaning tool 112 is configured to dispense the first and/or second cleaning fluids onto a surface to be cleaned 114 and to extract at least a portion of the first and/or second dispensed cleaning fluids. The extracted first and/or second cleaning fluid may be conveyed into the recovery tank 110 for collection and later disposal.

In some embodiments, the second cleaning fluid may include a boost fluid mixed with a base cleaning fluid. The boost fluid may include, for example, an oxide such as hydrogen peroxide. The base cleaning fluid may include, for example, water, detergent, soap, a fragrance, and/or other cleaning fluid. The boost fluid may have a pH (potential of hydrogen) that is less than the pH of the base cleaning fluid to prevent breakdown of the boost fluid in the second cleaning fluid. In some embodiments, for example, the pH of the boost fluid may be less than or equal to about 4.5 and the pH of the base cleaning fluid may be greater than or equal to about 9. Use of a boost fluid in the second cleaning fluid may be particularly useful when cleaning using the cleaning tool 112, e.g., to clean a heavily soiled target area.

As shown, a flexible hose 116 couples the cleaning tool 112 to the cleaner body 102 of the handheld extraction cleaner 100. The flexible hose 116 may include a fluid delivery pathway 118 (e.g., one or more delivery tubes) that extends within a recovery pathway 120 defined within the flexible hose 116.

The fluid delivery pathway 118 fluidly couples the cleaning tool 112 (e.g., a fluid applicator 122 of the cleaning tool 112) to the supply and additive tanks 106 and 108. The cleaning tool 112 can be configured to selectively fluidly couple the fluid applicator 122 of the cleaning tool 112 to the fluid delivery pathway 118 (e.g., such that a user can control the delivery of the first cleaning fluid, the second cleaning fluid, and/or a mixture of the first and second cleaning fluids to the surface to be cleaned 114). In some instances, the additive tank 108 may be selectively fluidly coupled to the cleaning tool 112 (e.g., such that the first and second cleaning fluids may be selectively applied as a mixture). The handheld extraction cleaner 100 may include a pump 124 (e.g., the cleaner body 102 includes the pump 124) fluidly coupled to the fluid delivery pathway 118 at a location downstream of at least one of the supply and/or additive tanks 106 and/or 108 and upstream of the fluid applicator 122 of the cleaning tool 112. As such, the pump 124 can be generally described as being configured to urge the first and/or second cleaning fluids through the fluid applicator 122 to be dispensed on the surface to be cleaned 114. In some instances, the handheld extraction cleaner 100 may be configured to deliver only the first cleaning fluid, only the second cleaning fluid, and/or a combination of the first and second cleaning fluids. For example, a user of the handheld extraction cleaner 100 may be able to select between delivering only the first cleaning fluid, only the second cleaning fluid, or a combination of the first and second cleaning fluids to the surface to be cleaned 114. By way of further example, the handheld extraction cleaner 100 may be configured to deliver only a combination of the first and second cleaning fluids to the surface to be cleaned 114. In this example, the handheld extraction cleaner 100 may be configured to deliver the combination of the first and second cleaning fluids until at least one of the first and/or second cleaning fluids is depleted. Alternatively, in this example, when one of the first or second cleaning fluids is depleted, the other of the first or second cleaning fluids may continue to be delivered to the surface to be cleaned 114 until depleted.

At least a portion of any debris on the surface to be cleaned 114 becomes entrained within the dispensed first and/or second cleaning fluids. When debris becomes entrained within the first and/or second cleaning fluids, the resulting mixture may generally be referred to as dirty cleaning fluid. The recovery pathway 120 defined within the flexible hose 116 fluidly couples the cleaning tool 112 (e.g., a suction inlet 126 of the cleaning tool 112) to the recovery tank 110. For example, the handheld extraction cleaner 100 may include a suction motor 128 (e.g., the cleaner body 102 includes the suction motor 128) fluidly coupled to the recovery pathway 120 and the recovery tank 110 such that the suction motor 128 generates an airflow that extracts at least a portion of the dispensed first and/or second cleaning fluids from the surface to be cleaned 114 (e.g., using the suction inlet 126). At least a portion of the extracted cleaning fluid is deposited within the recovery tank 110.

The cleaning tool 112 may be an interchangeable cleaning tool. For example, the cleaning tool 112 may be removably coupled to an accessory end 130 of the flexible hose 116. In this example, the cleaning tool 112 may be replaced with a different tool and/or be used with another extraction cleaner such as an upright extraction cleaner having an above floor cleaning feature. In other words, the cleaning tool 112 may be configured to be used in a cleaning system that includes the handheld extraction cleaner 100 and an upright extraction cleaner.

The supply and/or additive tanks 106 and/or 108 may be configured to provide, collectively and/or individually, a fabric/cleaning composition for removing stains and soil from substrates (the surface to be cleaned 114) such as carpets and fabrics. The fabric/cleaning composition is preferably formed via combination of an aqueous based cleaning solution (e.g., the first cleaning fluid to be received within the supply tank 106) and an aqueous based oxidizing solution (e.g., the second cleaning fluid to be received within the additive tank 108) immediately prior to application to the substrate. The use of two separate solutions and mixing on demand is contemplated to preserve storage stability and optimize cleaning effectiveness while allowing one to achieve the identified and effective levels of active components on a selected surface at a desired pH.

The first aqueous based cleaning solution preferably contains a mixture of ingredients in a relatively basic solution (pH>7.0) and the second aqueous based oxidizing solution contains a mixture of ingredients in a relatively acidic solution (pH<7.0). The first aqueous based cleaning solution herein comprises a water-based solution, which as noted, is a relatively basic solution (pH>7.0). More preferably, the first aqueous based cleaning solution has a pH in the range of 8.5 to 10.0, including all values and increments therein. Accordingly, a pH of 8.5, 8.6, 8.7, 8.8, 8.9, 9.0, 9.1, 9.2, 9.3, 9.4, 9.5, 9.6, 9.7, 9.8, 9.9 or 10.0. A particularly preferred pH range is 8.5 to 9.5, or even more preferably, 9.0 to 9.5. The second aqueous based oxidizing solution herein also comprises a water-based solution, which as noted is a relatively acidic solution (pH<7.0). More preferably, the pH of the oxidizing solution is less than or equal to 5.0, and preferably falls in the range of 3.0 to 5.0, including all individual values and increments therein. Accordingly, a pH of 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8. 4.9 or 5.0.

The second aqueous based oxidizing solution contains a peroxygen compound, i.e. a compound containing a peroxide anion $O_2^{2-}$ or an O—O single bond such as $H_2O_2$. Upon combination of the first and second aqueous solutions, the peroxygen that is then provided and is activated by the carbonate component to then engage with a given substrate for cleaning, and in the particular preferred case of $H_2O_2$ falls in the range of 0.20 wt. % to 0.70 wt. %, including all values and increments therein, e.g., 0.20 wt. %, 0.30 wt. %, 0.40. wt. %, 0.50 wt. % 0.60 wt. % and 0.70 wt. %. One particularly preferred range for the weight percent of $H_2O_2$ compound that is relied upon to treat a substrate for removal of stains and soil is in the range of 0.30 wt. % to 0.40 wt. %.

The peroxygen compound herein therefore are contemplated to include water soluble peroxygen agents that include hydrogen peroxide as well as inorganic alkali metal peroxides in acidic solution at pH<7.0. Such peroxygen compounds therefore include sodium peroxide ($Na_2O_2$) and organic peroxides such as urea hydrogen peroxide ($CH_6N_2O_3$) and melamine hydrogen peroxide ($C_3H_8N_6O_2$). Also contemplated are alkyl hydroperoxides (R—O—OH) where R is an alkyl group such as in methyl hydroperoxide ($CH_3OOH$), tert-butyl hydroperoxide ($(CH_3)_3C$—O—OH), or an aryl peroxide where R is an aryl group as in benzoyl peroxide ($C_{14}H_{10}O_4$). The peroxygen compound herein may also preferably be utilized with or without a peroxidase (enzymes that catalyze the break-up of peroxides).

The first aqueous based cleaning solution preferably contains the following ingredients: (1) nonionic surfactant(s), preferably an alcohol ethoxylate which is reference to a nonionic surfactant containing a hydrophobic alkyl chain attached via an ether linkage to a hydrophilic ethylene oxide chain, which is available under the trade name Ecosurf™ EH-9 from Dow, which is an ethoxylated propoxylated 2-ethyl-1-hexanol, CAS 64366-70-7, and Ecosurf™ EH-6 also available from Dow, CAS 64366-70-7, and alkyl polyglycoside (APG) which is reference to the reaction product of a fatty alcohol and a sugar and is characterized by a saccharide unit and one or more hydrophobic alkyl chains such as decyl glucoside available from Brenntag (CAS 68515-73-1); (2) a source of carbonate anion ($CO_3^{2-}$) such as water soluble alkali metal carbonate or alkali metal bicarbonate; (3) a metal chelating agent such as ethylenediamine-N,N'-disuccinic acid (EDDS), more preferably biodegradable (S,S) ethylenediamine-N,N'-disuccinic acid (EDDS), CAS 178949-82-1; (4) an organic alkyl alcohol, preferably ethanol; (5) a dispersant polymer, a preferred example of which is Acusol 505N, an acrylic acid polymer, CAS 60472-42-6; (6) a metal hydroxide such as sodium hydroxide to provide the desired pH of >7; (7) free-radical scavenger (8) fragrances and/or odor control or other aesthetic agents; and (9) water.

With respect to the free-radical scavenger, preferably such is selected from an aliphatic amino acid, preferably glycine ($C_2H_5NO_2$), CAS 56-40-6. Other free radical scavengers are contemplated to include sarcosine (N-methyl glycine), lysine, serine, glutamic acid and mixtures thereof. The free radical scavenger herein is also contemplated to be selected from, 2-methoxyethylamine, glucosamine, morpholine, piperdine, ethylamine and 3-amino-1-propanol, and mixture thereof. It is contemplated that such free-radical scavengers can trap free radicals such as a hydroxy free radical (HO) to reduce or eliminate the damage that such free radicals may impose upon a given substrate fabric.

The second aqueous based oxidizing solution preferably contains the following ingredients: (1) peroxy compound, e.g., hydrogen peroxide ($H_2O_2$); (2) nonionic surfactant(s), preferably an alcohol ethoxylate which is reference to a nonionic surfactant containing a hydrophobic alkyl chain attached via an ether linkage to a hydrophilic ethylene oxide chain, which is available under the trade name Ecosurf™ EH-9 from Dow, which is an ethoxylated propoxylated 2-ethyl-1-hexanol, CAS 64366-70-7, and Ecosurf™ EH-6 also available from Dow, CAS 64366-70-7; (3) anionic surfactant, a preferred example of which is sodium caprylyl sulfonate, CAS 13419-61-9; (4) a dispersant polymer, a preferred example of which is Acusol 460N, which is a carboxylated polyelectrolyte copolymer based upon maleic anhydride/olefin copolymer; (5) a multifunctional aliphatic organic acid to provide the desired pH of <7.0, preferably citric acid, CAS 77-92-9; (6) a defoaming agent, preferably XFO-64, a silicon polymer; and (6) water.

In the above, it should be noted that the source of the source of the carbonate anion ($CO_3^{2}$) and the metal chelating agent is limited to the first aqueous cleaning solution. In addition, the source of the peroxy compound is limited to the second aqueous based oxidizing solution. It therefore should be appreciated that the other ingredients identified (e.g., nonionic surfactant, organic alkyl alcohol, free radical scavenger, fragrances and/or odor control agents, anionic surfactant, dispersant polymer) may be sourced from either the first aqueous cleaning solution and/or the second aqueous based oxidizing solution.

Reference is now made to Table 1, which identifies preferred formulations, all in weight percent values, for the two-part fabric and cleaning composition herein. Table 1 also serves as a basis for the description of a preferred process for preparing the two-part solutions for placement into two tanks of a cleaning apparatus and the resulting molar concentration levels of the ingredients after mixing of the two solutions as applied to a given substrate.

TABLE 1

Preferred Formulations

| | Component | | | | |
|---|---|---|---|---|---|
| | I Aqueous Based Cleaning Solution (pH > 7.0) | II Aqueous Based Oxidizing Solution (pH < 7.0) | III Active Components (Oxidizing Solution) | IV Cleaning Solution Components After Water Dilution (20:1) | V Components Applied To Substrate For Cleaning |
| Water | 80.9 | 80.3 | 91.29 | 99.1 | 98.4 |
| 35% $H_2O_2$ | 0 | 11.43 | 4.00 | 0 | 0.36 |
| Nonionic Surfactant (EH-9) | 3.38 | 0.83 | 0.83 | 0.16 | 0.22 |
| Anionic Surfactant (38% Sodium Caprylyl Sulfonate) | 0 | 5.82 | 2.21 | 0 | 0.20 |
| Source of Carbonate Anion ($NaHCO_3$) | 4.12 | 0 | 0 | 0.20 | 0.14 [wt. % of $CO_3^{2-}$] |
| Dispersant Polymer (Acusol 460N) | 0 | 1.26 | 1.26 | 0 | 0.12 |
| Metal Chelant (EDDS Acid) | 2.11 | 0 | 0 | 0.10 | 0.09 |
| Nonionic Surfactant (EH-6) | 1.13 | 0.28 | 0.28 | 0.05 | 0.07 |
| Organic Alkyl Alcohol (Ethanol) | 1.6 | 0 | 0 | 0.08 | 0.07 |
| Nonionic Surfactant (APGs) | 1.50 | 0 | 0 | 0.07 | 0.06 |
| Odor Control Agent | 1.5 | 0 | 0 | 0.07 | 0.06 |
| Fragrance | 1.5 | 0 | 0 | 0.07 | 0.06 |
| Metal Hydroxide (50% NaOH) | 1.14 | 0 | 0 | 0.05 | 0.05 |
| Dispersant Polymer (Acusol 505N) | 0.60 | 0 | 0 | 0.03 | 0.03 |
| Radical Scavenger Aliphatic Amino Acid (Glycine) | 0.52 | 0 | 0 | 0.02 | 0.02 |
| Multifunctional Aliphatic Organic Acid (Citric Acid) | 0 | 0.1 | 0.1 | 0 | 0.01 |
| Defoaming Agent (XFO-64) | 0 | 0.03 | 0.03 | 0 | 0.003 |

The preferred charging and mixing of the aqueous based cleaning solution and aqueous based oxidizing solution proceeds as follows. The preferred formulation for the aqueous based cleaning solution (Column I) is poured into a first tank on the cleaning apparatus and then preferably diluted 1 part of cleaning solution with 20 parts of water. The preferred formulation for the aqueous based oxidizing solution (Column II) is poured into a second tank on the cleaning device. Column III shows the preferred weight percent of the active components of the oxidizing solution. Column IV shows the preferred weight percent of the cleaning solution components after the 20:1 water dilution. The aqueous based cleaning solution diluted at 20:1 with water is then combined with the aqueous based oxidizing solution, at a ratio of 10 parts of the diluted aqueous based cleaning solution (Column IV) with 1 part of aqueous based oxidizing solution.

The weight percent of the components that are then present in the preferred mixed solution and applied to a given surface for cleaning is shown in Column V. In Column V, the five (5) components for cleaning include water, the peroxygen compound, metal chelating agent, free-radical scavenger (preferably shown as glycine) and carbonate anion. In addition, it is noted that the pH of the combined and mixed aqueous based cleaning solution and the aqueous based oxidizing solution is preferably ≥9.0, and more preferably, at the pH range of ≥9.0 to 10.0, including all individual values and increments therein, such as 9.0, 9.1, 9.2, 9.3, 9.4, 9.5, 9.6, 9.7, 9.8, 9.9 and 10.0. A particular preferred pH range for the combined aqueous based cleaning solution and aqueous based oxidizing solution is 9.4 to 9.6.

In addition, as can be seen from the Table 1, the level of carbonate anion ($CO_3^{2-}$) that is present in the mixed solution, that is preferably supplied by a metal bicarbonate such as sodium bicarbonate, is at 0.14 wt. %. However, in the broad context of the present disclosure, the level of carbonate anion in the mixed solution is preferably 0.10 wt. % to 0.40 wt. %, including all individual values and increments therein, such as 0.15 wt. %, 0.20 wt. %, 0.25 wt. %, 0.30. wt. %, 0.35 wt. % or 0.40 wt. %. One particularly preferred range of the carbonate anion in the mixed solution is 0.14 wt. % to 0.25 wt. %. Furthermore, while preferably sodium bicarbonate in the aqueous based cleaning solution provides one source of the carbonate anion, it is contemplated herein that the carbonate anion source includes other alkali metal carbonates such as sodium carbonate ($NaCO_3$) as well as other bicarbonates such as potassium bicarbonate.

It should be noted that the metal chelating agent, made available in the aqueous based cleaning solution, that is then present in the mixed solution applied to a given substrate, should be understood herein as any compound that binds to a metal ion, particularly transition metal ions such as iron and copper. Moreover, the metal chelating agent is one that preferably has a relatively lower binding affinity to water hardness divalent metal ions such as magnesium ($Mg^{2+}$) and calcium ($Ca^{2+}$) and a relatively higher binding affinity to transition metal ions such as iron and copper. Such is preferably provided by EDDS. Reference to metal chelating affinity is reference to the stability constant (also called formation constant or binding constant) that reflects the strength of interaction between the reagents that come together to form the complex.

Therefore, the preferred property of the metal chelating agent herein is to have a relatively higher binding constant to $Cu^{2+}$ in the preferred pH range of 9-10, with relatively lower binding constants with the water hardness ions $Ca^{2+}$ and $Mg^{2+}$. It is also desirable that the metal chelating agent is readily biodegradable to prevent accumulation in the environment. Below in Table 2 are the calculated log K (K is the binding constant) values for the preferred metal chelant EDDS herein at pH 7.0:

TABLE 2

| Binding Constants For EDDS | |
|---|---|
| Metal Ion | LogK $EDDS^{4-}$ |
| $Cu^{2+}$ | 18.45 |
| $Ca^{2+}$ | 4.72 |
| $Mg^{2+}$ | 6.09 |

While preferably shown in Table 1 the metal chelating agent EDDS is present at a level of 0.09 wt. % in the mixed solution, it is contemplated herein that the level of metal chelating agent may fall in the range of 0.05 wt. % to 0.15 wt. %, including all individual values and increments therein. One particular preferred range is 0.08 wt. % to 0.13 wt. %. It is contemplated that the preferred metal chelating agent herein, which as alluded to above more actively binds metal ions of copper and iron found in tap water is therefore relatively more effective in neutralizing such metals in tap water that may otherwise catalyze decomposition of hydrogen peroxide to form hydroxy (OH) free radicals and lead to a reduction in bleach activity and fabric damage.

As also shown in Table 1, the preferred level of the free-radical scavenger herein in the mixed solution that engages with a substrate for cleaning is 0.02 wt. % to 0.80 wt. %, including all individual values and increments therein.

Table 3 below now presents the molar concentration ranges in aqueous solution of the identified components (peroxygen compound, metal chelating agent, carbonate anion and free-radical scavenger) when the cleaning solution and boosting solution are mixed and applied to the substrate for cleaning, where the pH of the mix is ≥9.0 to 10.0. Molar concentration is reference to the number of moles of the component per liter of solution.

TABLE 3

| Molar Concentrations Of Key Components Applied To A Substrate For Cleaning | |
|---|---|
| Component | Molar Concentration |
| Peroxygen Compound | $5.0 \times 10^{-2}$ to $2.1 \times 10^{-1}$ |
| Metal Chelating Agent | $1.70 \times 10^{-3}$ to $5.2 \times 10^{-3}$ |
| Carbonate Anion ($CO_3^{2-}$) | $1 \times 10^{-2}$ to $5.0 \times 10^{-2}$ |
| Free Radical Scavenger | $2.0 \times 10^{-3}$ to $1.1 \times 10^{-1}$ |

The molar concentrations of the four key components after mixing as shown in Table 2 can be readily determined from the weight percents of the components identified in the aqueous based cleaning solution and aqueous based oxidizing solution after they are mixed, examples of which were provided in Table 1. The formula for converting concentrations in weight percent to molarity is: molarity=((weight percent)*10)/(molecular weight of 100% active material).

As therefore now can be appreciated, the present disclosure provides a composition, method and kit for cleaning carpet or fabric that preferably makes use of two separate solutions and mixing on demand that provides effective levels of identified components on selected surfaces at a desired pH to optimize cleaning performance.

Figure 2:
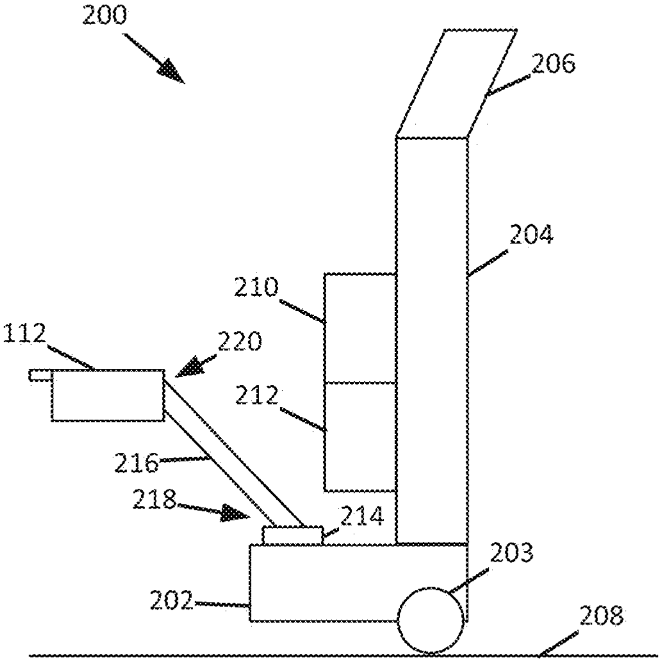
FIG. 2 shows a schematic example of an upright extraction cleaner, consistent with embodiments of the present disclosure.

FIG. 2 shows a schematic example of an upright extraction cleaner 200. The upright extraction cleaner 200 includes a surface cleaning head 202, at least one wheel 203 rotatably coupled the surface cleaning head 202, and an upright body 204 including a handle 206. The upright body 204 is pivotally coupled to the surface cleaning head 202 such that the upright body 204 transitions between an in-use and a storage position in response to pivotal movement of the upright body 204. A user may interact with the handle 206 to maneuver the surface cleaning head 202 along a surface to be cleaned 208. The upright extraction cleaner 200 includes at least one supply tank 210 and a recovery tank 212. At least one of the supply tank 210 and recovery tank 212 are removably coupled to the upright body 204. At least one of the upright body 204 and/or the surface cleaning head 202 includes a flexible hose connector 214 configured to removably couple to a flexible hose 216. The flexible hose 216 includes a cleaner end 218 configured to removably couple to the flexible hose connector 214 and an accessory end 220 configured to removably couple to, for example, the cleaning tool 112 of FIG. 1.

Figure 3:
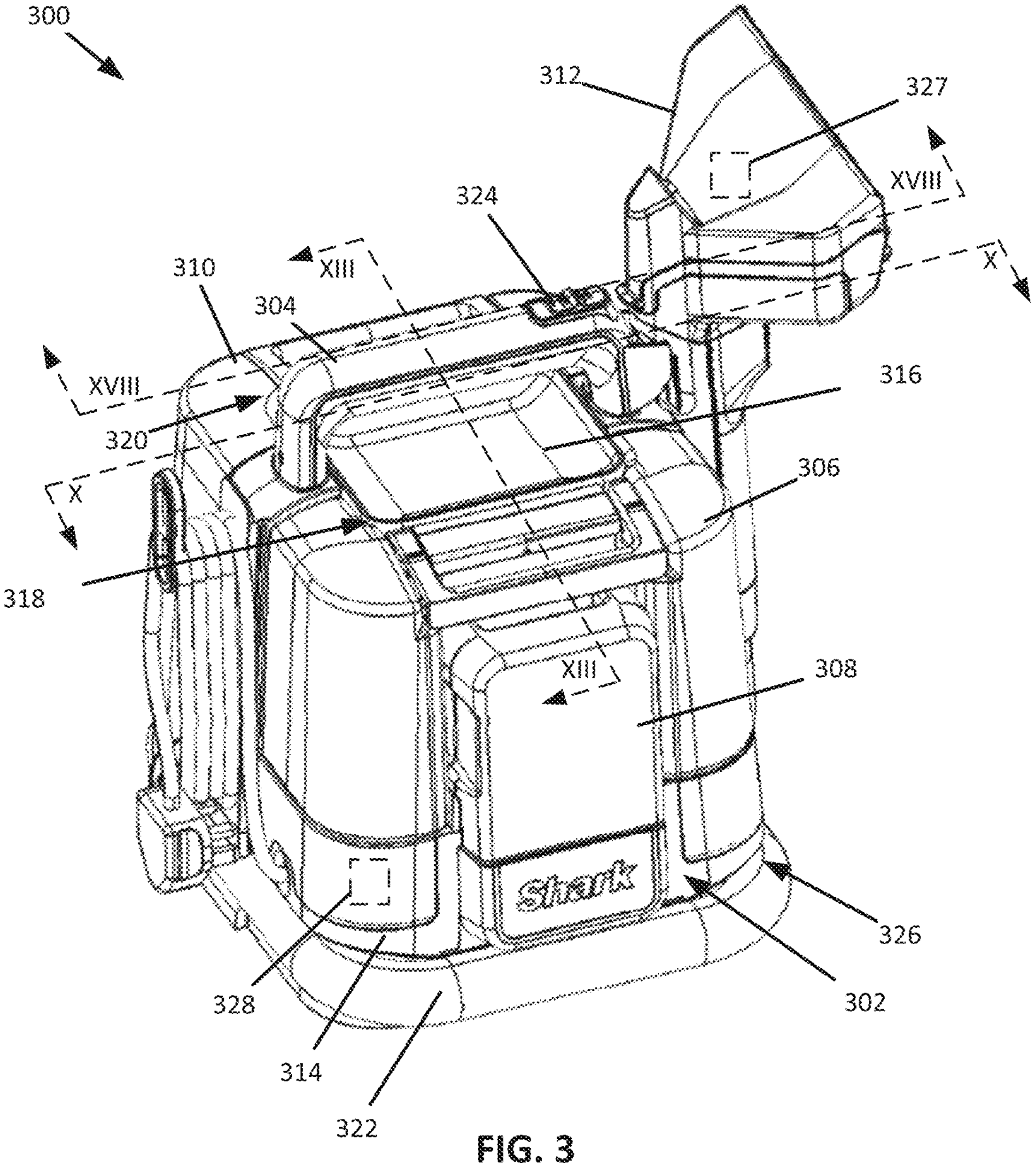
FIG. 3 shows a perspective view of an example of a handheld extraction cleaner, consistent with embodiments of the present disclosure.

FIG. 3 shows a perspective view of a handheld extraction cleaner 300, which is an example of the handheld extraction cleaner 100 of FIG. 1. As shown, the handheld extraction cleaner 300 includes a cleaner body 302, a carry handle 304 for carrying the cleaner body 302, a supply tank 306 configured for receiving a first cleaning fluid, an additive tank 308 configured for receiving a second cleaning fluid, a recovery tank 310, and a cleaning tool 312 (which is an example of the cleaning tool 112 of FIG. 1). The cleaner body 302 includes a base 314 and an upstanding portion 316 extending from the base 314. As shown, at least a portion of the supply and additive tanks 306 and 308 are on a first side 318 of the upstanding portion 316 and at least a portion of the recovery tank 310 is on a second side 320 of the upstanding portion 316, the first side 318 being opposite the second side 320. The carry handle 304 may be configured to extend between the recovery tank 310 and the supply and additive tanks 306 and 308. The carry handle 304 may be coupled to the cleaner body 302 (e.g., the base 314 of the cleaner body 302).

The cleaning tool 312 is fluidly coupled to each of the supply tank 306, the additive tank 308, and the recovery tank 310 via a flexible hose 322. In some instances, the cleaning tool 312 may be selectively fluidly coupled to at least one of the supply and/or additive tanks 306 and/or 308. For example, an additive actuator 324 may be coupled to (e.g., slidably coupled to) the carry handle 304, wherein actuation of the additive actuator 324 is configured to selectively fluidly couple the additive tank 308 to the cleaning tool 312. Additionally, or alternatively, there may be a sensor (e.g., a turbidity sensor) configured to automatically cause the additive tank 308 to be selectively fluidly coupled to the cleaning tool 312. In these instances, the additive actuator 324 may allow the user to selectively choose between an automatic mode and a manual mode for selectively fluidly coupling the cleaning tool 312 to the additive tank 308. Additionally, or alternatively, the additive actuator 324 may configured such that, when actuated, the second cleaning fluid is delivered from the additive tank 308 for a predetermined time and/or in a predetermined quantity. While the additive actuator 324 is shown as being disposed on the carry handle 304, other configurations are possible. For example, the additive actuator 324 may be disposed on the cleaner body 302 or the cleaning tool 312. In some instances, the cleaning tool 312 may include one or more cleaning condition sensors 327 (e.g., a turbidity sensor, a debris sensor, a surface type sensor, and/or any other sensor). The handheld extraction cleaner 300 may be configured to transition between cleaning behaviors and/or make cleaning recommendations to a user (e.g., via a user interface) based, at least in part, on output from the one or more cleaning condition sensors 327. For example, the handheld extraction cleaner 300 may be configured to control which of the first and/or second cleaning fluids are delivered (and/or a ratio of the first and second cleaning fluids delivered) based, at least in part, on an output of a turbidity sensor, a debris sensor, and/or a surface type sensor. As shown, the flexible hose 322 may be stored within a hose wrap 326 defined within the base 314 of the cleaner body 302.

In some instances, the handheld extraction cleaner 300 may include one or more fluid sensors 328 configured to sense a presence of one or more of a first cleaning fluid in the supply tank 306 and/or a second cleaning fluid in the additive tank 308. For example, a first fluid sensor 328 may be configured to detect whether the first cleaning fluid is present in the supply tank 306 by detecting whether the first cleaning fluid is passing through one or more supply tubes. In response to detecting that the supply tank 306 is empty, the handheld extraction cleaner 300 may be configured to discontinue application of the second cleaning fluid. Such a configuration may prevent only the second cleaning fluid from being applied to a surface to be cleaned. In some instances, there may not be a fluid sensor 328 associated with the additive tank 308.

In some instances, the second cleaning fluid within the additive tank 308 may be sensitive to sunlight. As such, the additive tank 308 may be constructed of a transparent material configured to at least partially filter out wavelengths of light that may degrade the second cleaning fluid.

Figure 4:
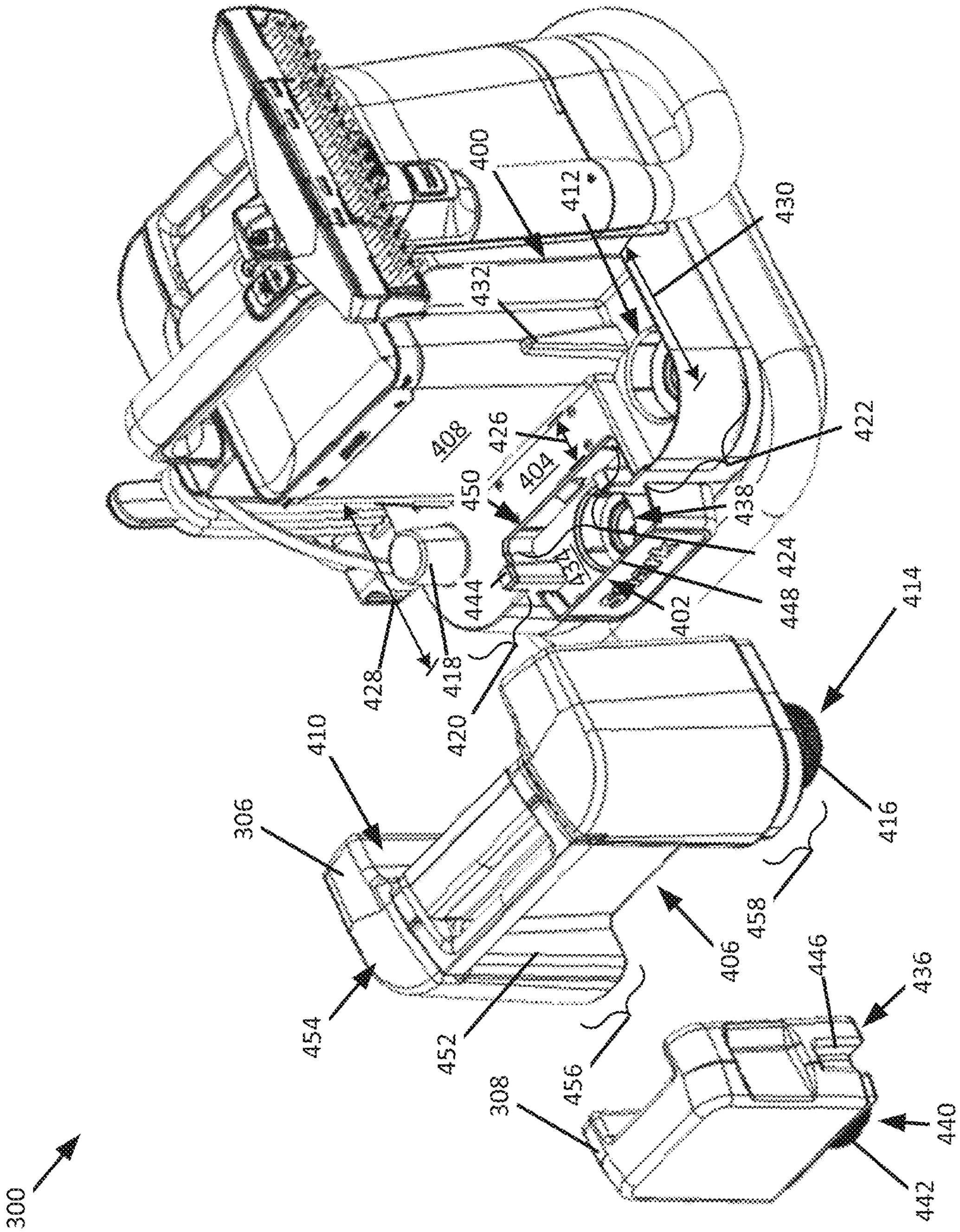
FIG. 4 shows an exploded view of the handheld extraction cleaner of FIG. 3 showing a supply tank and an additive tank removed therefrom, consistent with embodiments of the present disclosure.

FIG. 4 shows a partial exploded view of the handheld extraction cleaner 300. As shown, the supply and additive tanks 306 and 308 are configured to be removably coupled to the cleaner body 302. For example, one or more of the supply tank 306 and/or the additive tank 308 may be removed by a user for replenishing a cleaning fluid stored within the supply tank 306 and/or the additive tank 308.

As shown, the cleaner body 302 defines a supply tank mounting region 400 and an additive tank mounting region 402. The supply tank mounting region 400 includes a supply tank platform 404 configured to support a bottom end 406 of the supply tank 306 and an upstanding portion 408 configured to support a sidewall 410 of the supply tank 306 that extends from the bottom end 406 of the supply tank 306. The supply tank platform 404 may include a supply fluid receptacle 412 configured to receive a supply tank fluid outlet 414 of the supply tank 306. For example, and as shown, the supply tank fluid outlet 414 may be defined within a removable supply tank refill top 416. In this example, the supply fluid receptacle 412 is configured to receive at least a portion of the supply tank refill top 416 and to form a fluid coupling with the supply tank fluid outlet 414.

The supply tank mounting region 400 may further include a supply tank alignment protrusion 418. The supply tank alignment protrusion 418 may extend from the supply tank platform 404 and be received within a corresponding receptacle 501 (see, FIG. 5) defined with the supply tank 306. The supply tank alignment protrusion 418 may be configured to encourage vertical stability of the supply tank 306 when the supply tank 306 is received within the supply tank mounting region 400.

As shown, supply tank alignment protrusion 418 and the supply fluid receptacle 412 are on opposing platform end regions 420 and 422 of the supply tank platform 404. As also shown, an intermediary region 424 extends between the opposing platform end regions 420 and 422. The intermediary region 424 has an intermediary region width 426 that is less than at least one corresponding end region width 428 and/or 430.

The supply tank mounting region 400 may further include one or more supply tank alignment tracks 432 extending along the upstanding portion 408 of the supply tank mounting region 400. The one or more supply tank alignment tracks 432 may be configured to guide insertion of the supply tank 306 into the supply tank mounting region 400. For example, there may be a plurality of supply tank alignment tracks 432, wherein the intermediary region 424 extends between at least two of the plurality of supply tank alignment tracks 432.

The additive tank mounting region 402 includes an additive tank platform 434 configured for supporting a bottom end 436 of the additive tank 308. The additive tank platform 434 includes an additive fluid receptacle 438 configured to receive an additive tank fluid outlet 440 of the additive tank 308. For example, and as shown, the additive tank fluid outlet 440 may be defined within a removable additive tank refill top 442. In this example, the additive fluid receptacle 438 is configured to receive at least a portion of the additive tank refill top 442 and to form a fluid coupling with the additive tank fluid outlet 440.

The additive tank mounting region 402 may further include one or more additive tank alignment tracks 444 extending from the additive tank platform 434. The additive tank 308 includes one or more alignment grooves 446 configured to slidably receive the additive tank alignment tracks 444. As shown, one or more platform sidewalls 448 may extend from the additive tank platform 434 and define an additive tank cavity 450 for receiving at least a portion of the additive tank 308.

The supply tank 306 may define an additive tank receptacle 452 for receiving at least a portion of the additive tank 308. When the supply tank 306 and the additive tank 308 are coupled to the cleaner body 302, the additive tank 308 is at least partially received within the additive tank receptacle 452. Such a configuration may generally be described as a nested configuration. The additive tank receptacle 452 may extend around at least a portion of the additive tank platform 434 when the supply tank 306 is coupled to the cleaner body 302. The additive tank receptacle 452 may extend between the supply tank refill top 416 and a top surface 454 of the supply tank 306, the top surface 454 being opposite the supply tank refill top 416. Additionally, or alternatively, the additive tank receptacle 452 may extend between opposing supply tank end regions 456 and 458 of the supply tank 306, the supply tank end regions 456 and 458 may correspond to the opposing platform end regions 420 and 422 of the supply tank platform 404. When the additive tank is coupled with the cleaner body 302, the supply tank 306 may assist in supporting the additive tank 308 in an upright position.

Figure 5:
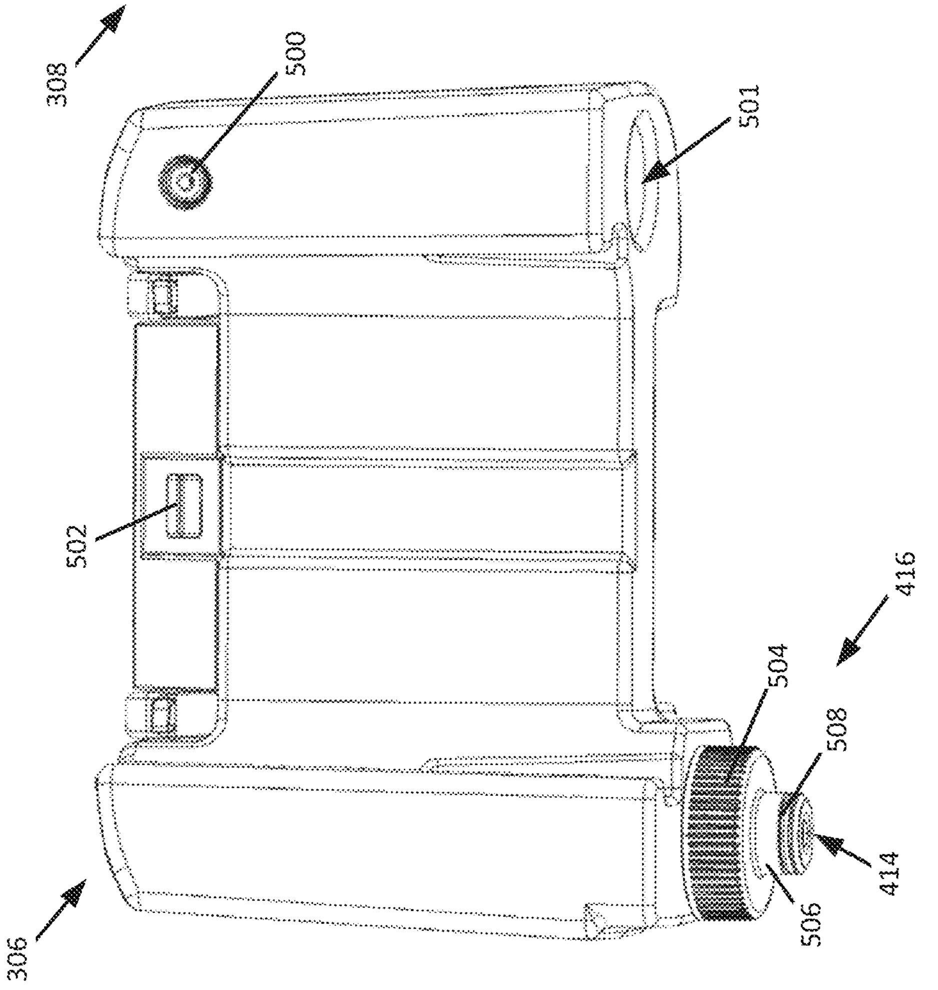
FIG. 5 shows a perspective view of the supply tank of FIG. 4, consistent with embodiments of the present disclosure.

FIG. 5 is a perspective rear view of the supply tank 306. As shown, the supply tank 306 includes a supply tank pressure equalizing valve 500. The supply tank pressure equalizing valve 500 is configured such that ambient air can enter the supply tank 306 as cleaning fluid exits the supply tank 306. The supply tank pressure equalizing valve 500 is configured as a one-way valve such that cleaning fluid within the supply tank 306 is substantially prevented from passing through the supply tank pressure equalizing valve 500. For example, the supply tank pressure equalizing valve 500 may be an umbrella valve. As also shown, the supply tank 306 includes a supply tank catch 502 configured to removably couple the supply tank 306 with the cleaner body 302 of the handheld extraction cleaner 300.

The supply tank refill top 416 may include a supply tank threaded portion 504 and a supply tank insertion portion 506. The supply tank threaded portion 504 is configured to threadably couple the supply tank refill top 416 to the supply tank 306. The supply tank fluid outlet 414 is defined within the supply tank insertion portion 506. As shown, a supply tank gasket 508 extends around an outer perimeter of the supply tank insertion portion 506.

Figure 6:
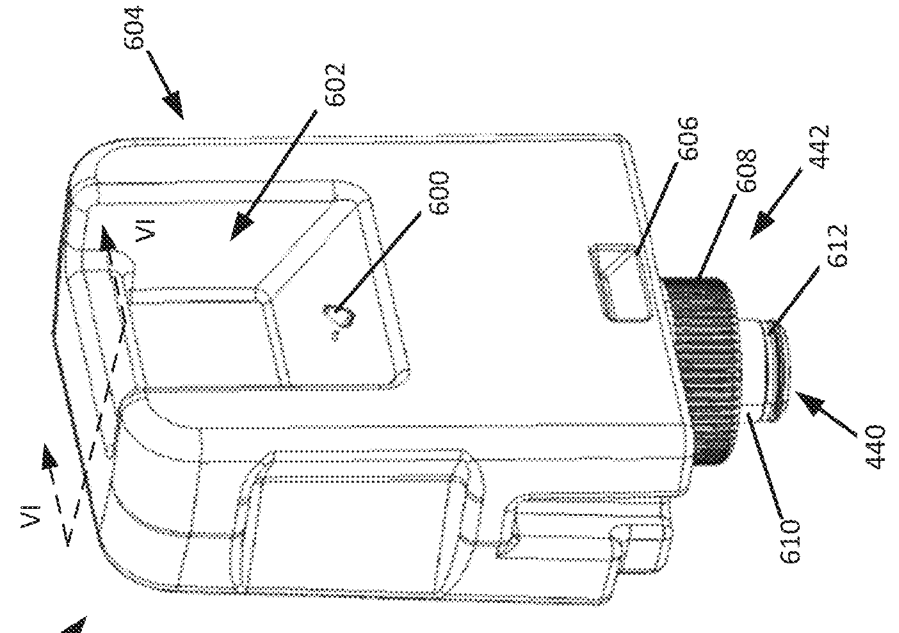
FIG. 6 shows a perspective view of the additive tank of FIG. 4, consistent with embodiments of the present disclosure.

FIG. 6 is a perspective rear view of the additive tank 308. As shown, the additive tank 308 includes an additive tank pressure equalizing valve 600. The additive tank pressure equalizing valve 600 is configured such that ambient air can enter the additive tank 308 as cleaning fluid exits the additive tank 308. The additive tank pressure equalizing valve 600 is configured as a one-way valve such that cleaning fluid within the additive tank 308 is substantially prevented from passing through the additive tank pressure equalizing valve 600. For example, the additive tank pressure equalizing valve 600 may be an umbrella valve.

The additive tank 308 may define a hand grip region 602 in an upper portion 604 (e.g., the upper 75%, upper 50%, or upper 25% of the additive tank 308), the upper portion 604 being opposite the removable additive tank refill top 442. As shown, the additive tank pressure equalizing valve 600 may be disposed within hand grip region 602. The additive tank 308 may also include an additive tank receptacle 606 configured to removably couple the additive tank 308 to the cleaner body 302 of the handheld extraction cleaner 300.

The additive tank refill top 442 may include an additive tank threaded portion 608 and an additive tank insertion portion 610. The additive tank threaded portion 608 is configured to threadably couple the additive tank refill top 442 to the additive tank 308. The additive tank fluid outlet 440 is defined within the additive tank insertion portion 610. As shown, an additive tank gasket 612 extends around an outer perimeter of the additive tank insertion portion 610.

Figure 6A:
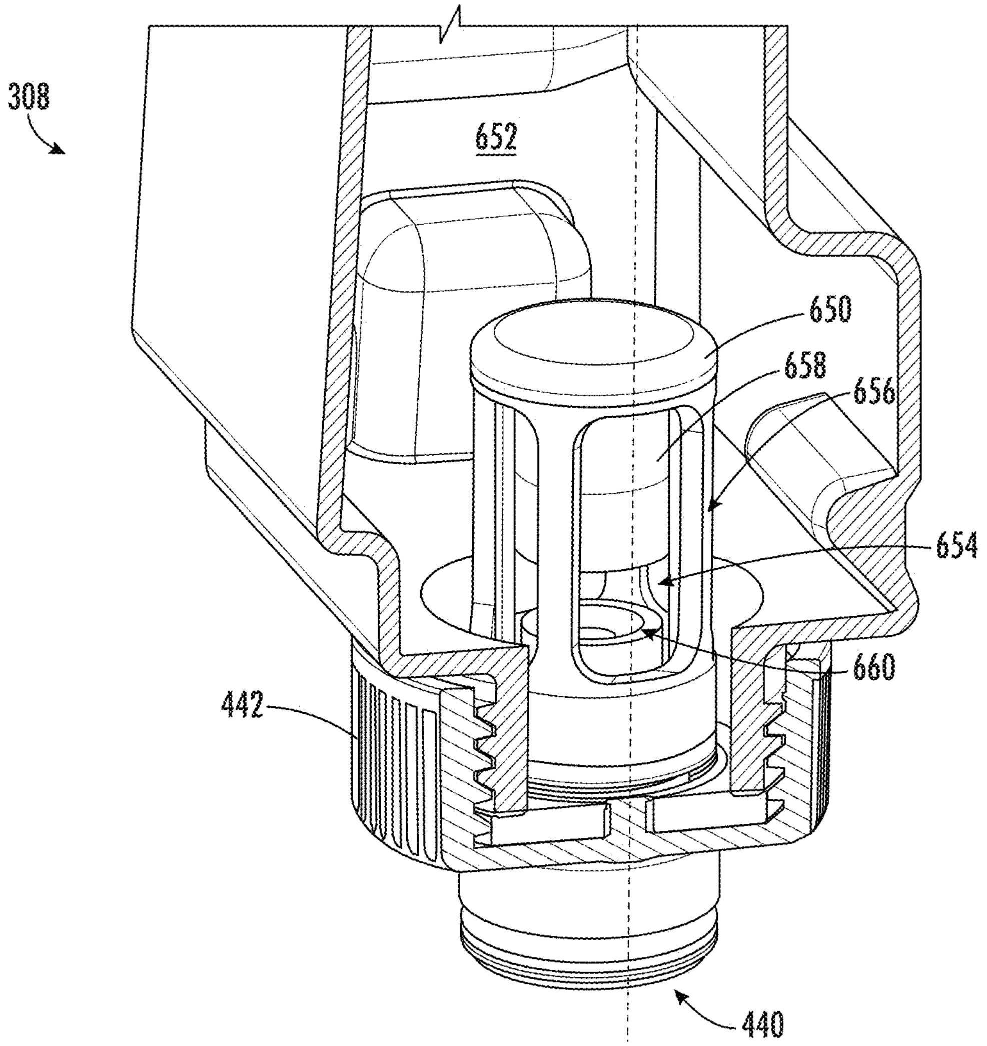
FIG. 6A is a cross-sectional magnified view of a portion of the additive tank of FIG. 4 taken along the line VI-VI of FIG. 6, consistent with embodiments of the present disclosure.

FIG. 6A is a cross-sectional magnified view of a portion of the additive tank 308 taken along the line VI-VI of FIG. 6. As shown, the additive tank refill top 442 may include a cage 650 extending from the additive tank refill top 442. When the additive tank refill top 442 is coupled to the additive tank 308, the cage 650 extends into an additive chamber 652 of the additive tank 308, the additive chamber 652 being configured to receive the second cleaning fluid. The cage 650 defines a cage cavity 654 having one or more cage openings 656. An additive float 658 is moveably disposed within the cage cavity 654 and configured to be buoyant within the second cleaning fluid. The additive float 658 is configured to move within the cage cavity 654 between a flow position and a stop position. When the additive float 658 is floating on the second cleaning fluid, the additive float 658 is in the flow position. When in the stop position, the additive float 658 is in engagement with an additive passageway 660 that is fluidly coupled to the additive tank fluid outlet 440 (the additive passageway 660 may be configured to be selectively fluidly coupled to the additive tank fluid outlet 440 using, for example, a one-way valve). Such a configuration may prevent or reduce air from being drawn into the additive passageway 660 and through the additive tank fluid outlet 440 when the supply of the second cleaning fluid has been depleted, which may reduce and/or prevent foaming in the first cleaning fluid.

Figure 7:
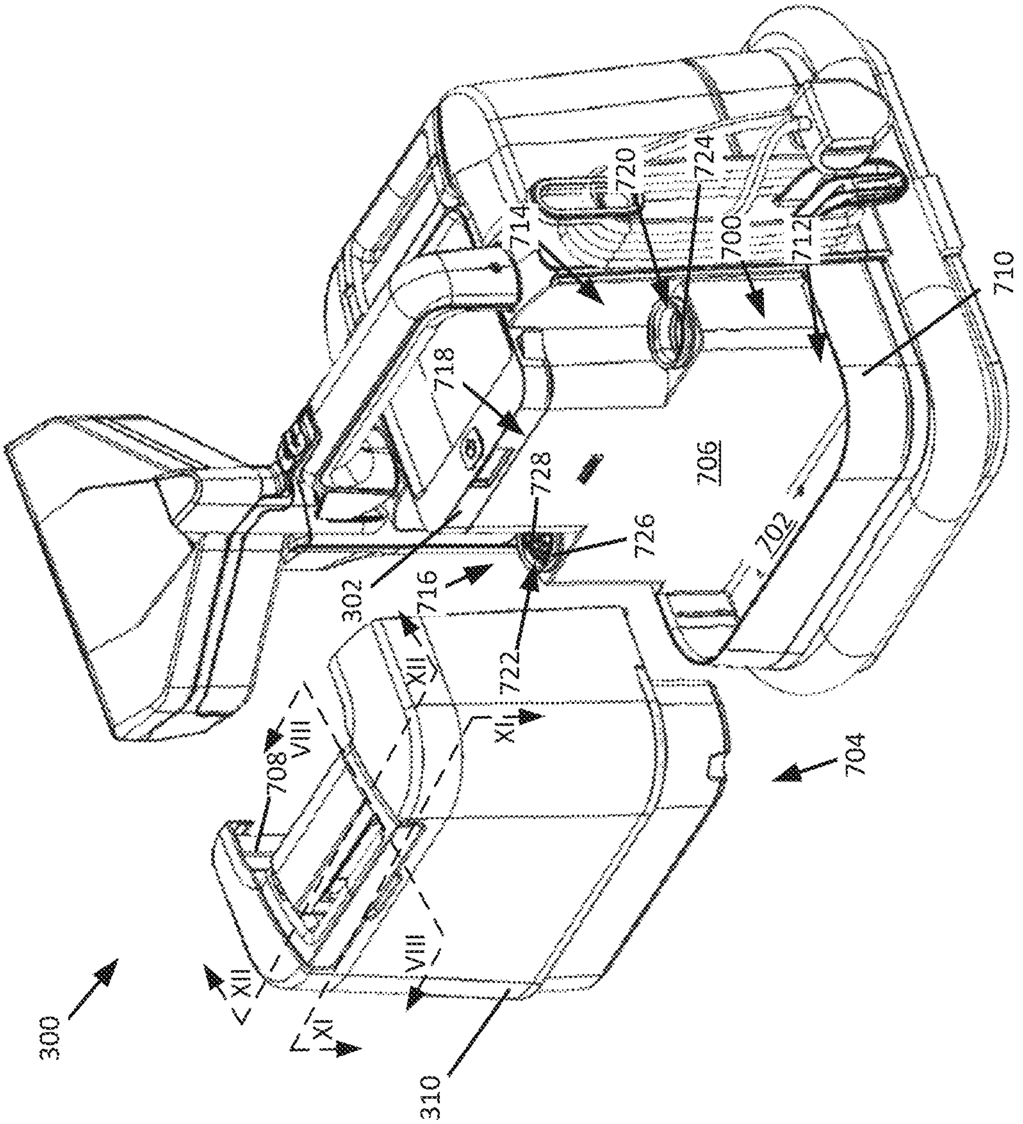
FIG. 7 shows an exploded view of the handheld extraction cleaner of FIG. 3 showing a recovery tank removed therefrom, consistent with embodiments of the present disclosure.

FIG. 7 shows a partial exploded view of the handheld extraction cleaner 300. As shown, the recovery tank 310 is configured to be removably coupled to the cleaner body 302 of the handheld extraction cleaner 300. For example, the recovery tank 310 may be removably coupled to the cleaner body 302 such that a user may remove the recovery tank 310 from the cleaner body 302 for emptying the contents collected within the recovery tank 310.

As shown, the cleaner body 302 defines a recovery tank mounting region 700. The recovery tank mounting region 700 includes a recovery tank platform 702 configured to support a bottom end 704 of the recovery tank 310 and an upstanding portion 706 configured to support at least one sidewall 708 of the recovery tank 310. A recovery platform sidewall 710 may extend around at least a portion of the recovery tank platform 702 defining a recovery tank cavity 712 for receiving at least a portion of the recovery tank 310.

The upstanding portion 706 may include an inlet stepped region 714 and an outlet stepped region 716. The inlet stepped region 714 and the outlet stepped region 716 are on opposite sides of an intermediary region 718 of the upstanding portion 706. The inlet and outlet stepped regions 714 and 716 are vertically spaced apart from the recovery tank platform 702.

The inlet stepped region 714 includes a recovery port 720 and the outlet stepped region 716 includes an exhaust port 722. The recovery port 720 and exhaust port 722 are configured to fluidly couple with the recovery tank 310. The recovery and exhaust ports 720 and 722 may each include a respective gasket 724 and 726 configured to engage (e.g., contact) the recovery tank 310. The inlet stepped region 714 and the outlet stepped region 716 may each include a fluid channel extending therein that fluidly couples with the recovery and exhaust ports 720 and 722. Such a configuration may allow the recovery tank 310 to omit a standpipe for separation of air from recovered liquid that extends within a collection chamber of the recovery tank 310. In some instances, the exhaust port 722 may include a filter 728 (e.g., a mesh screen or foam filter).

In operation, recovered liquid passes through the recovery port 720 and into the recovery tank 310. Once in the recovery tank 310, the recovered liquid is at least partially separated from an air flow drawing the recovered liquid into the recovery tank 310, the air flow exits the recovery tank 310, and passes through the exhaust port 722.

Figure 8:
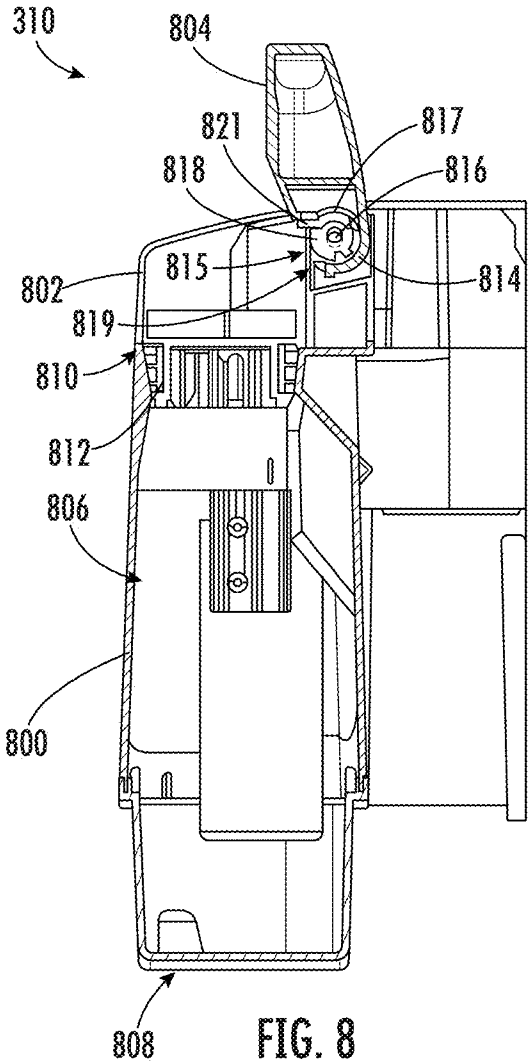
FIG. 8 shows a cross-sectional view of the recovery tank of FIG. 7 taken along the line VIII-VIII of FIG. 7 having a handle in a carry position, consistent with embodiments of the present disclosure.
Figure 9:
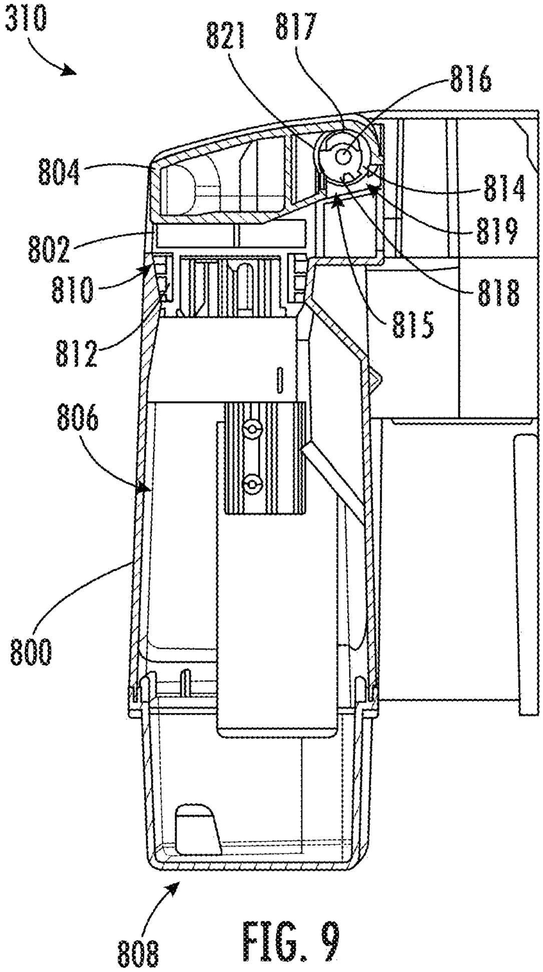
FIG. 9 shows a cross-sectional view of the recovery tank of FIG. 7 taken along the line VIII-VIII of FIG. 7 having the handle in a storage position, consistent with embodiments of the present disclosure.
Figure 9A:
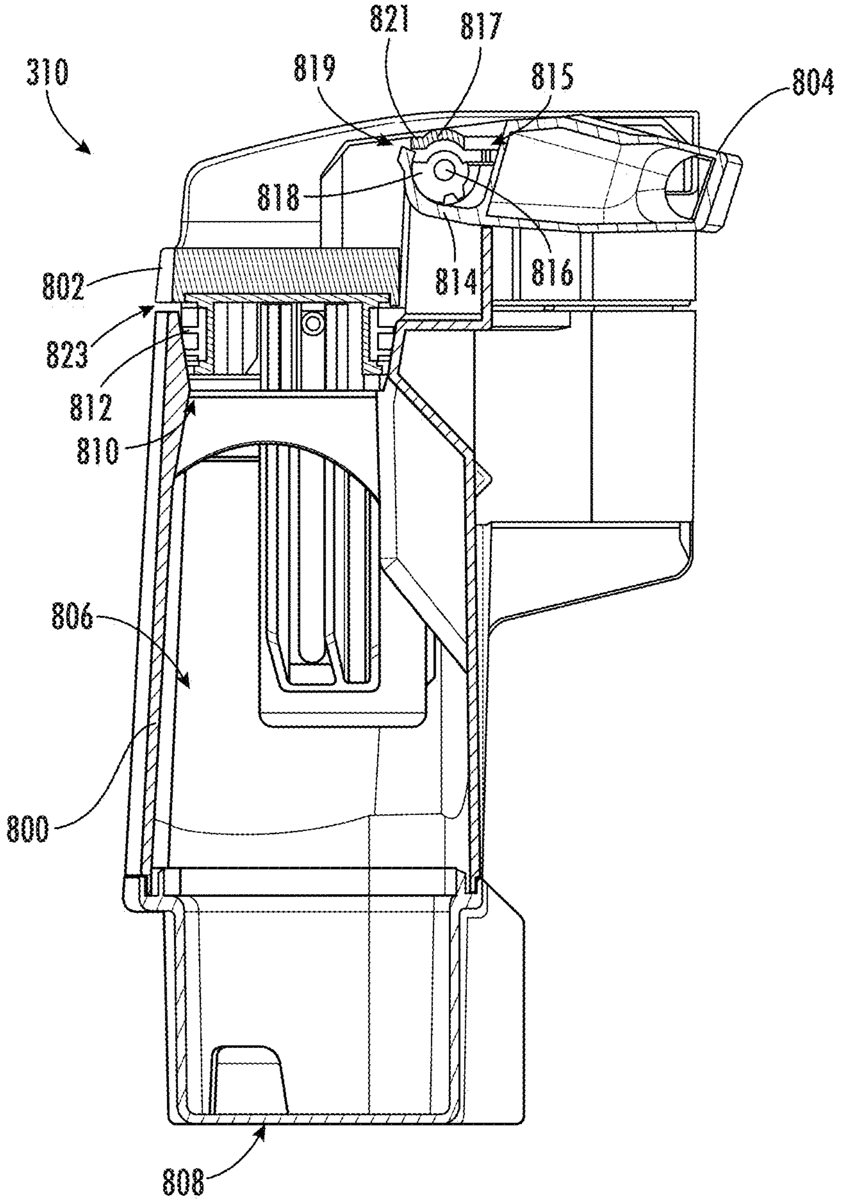
FIG. 9A shows a cross-sectional view of the recovery tank of FIG. 7 taken along the line VIII-VIII of FIG. 7 having the handle in a lid removal position, consistent with embodiments of the present disclosure.

FIGS. 8, 9, and 9A show a cross-sectional view of the recovery tank 310 taken along the line VIII-VIII of FIG. 7. As shown, the recovery tank 310 includes a recovery tank body 800, a recovery tank lid 802 removably coupled to the recovery tank body 800, and a recovery tank handle 804 pivotally coupled to the recovery tank body 800 (or, in some instances, the recovery tank lid 802). The recovery tank 310 includes a collection chamber 806 (e.g., the recovery tank body 800 includes the collection chamber 806) for collecting recovered liquid therein. The recovered liquid may have debris entrained therein. As such, the recovery tank 310 may generally be described as being configured to collect dirty liquid.

The collection chamber 806 has a closed end 808 and an open end 810 opposite the closed end 808. The recovery tank lid 802 is configured to be received within the open end 810 of the collection chamber 806. In some instances, the recovery tank lid 802 may include a lid gasket 812 configured to engage (e.g., contact) a surface of the collection chamber 806.

The recovery tank handle 804 is configured to pivot between a carry position (FIG. 8), a storage position (FIG. 9), and a lid removal position (FIG. 9A). When the recovery tank handle 804 is in the carry position and the storage position, the recovery tank lid 802 is prevented from being removed from the recovery tank body 800. When the recovery tank handle 804 is pivoted to the lid removal position, the recovery tank lid 802 is removable from the recovery tank body 800. In some instances, as the recovery tank handle 804 is pivoted to the lid removal position (or in some instances, beyond the lid removal position to a removal assist position), the recovery tank lid 802 is urged in a direction away from the recovery tank body 800 (e.g., the recovery tank handle 804 is configured to urge the recovery tank lid 802 in a direction away from the recovery tank body 800). In these instances, the recovery tank lid 802 is at least partially removed from the open end 810, which may reduce the frictional interference between the lid gasket 812 and the recovery tank body 800 (e.g., and make removal of the recovery tank lid 802 easier).

The recovery tank handle 804 may include a hook 814 that is configured to pivot with the recovery tank handle 804 about a pivot axis 816 of the recovery tank handle 804. As the recovery tank handle 804 pivots from the storage position to the carry position, the hook 814 pivots about a trunnion 818 of the recovery tank body 800. The hook 814 includes an open portion 815 that faces in a direction of the collection chamber 806 (e.g., the closed end 808) when the recovery tank handle 804 is in the storage position and the open portion 815 faces in a direction away from the collection chamber 806 (e.g., the closed end 808) when in the lid removal position.

The recovery tank lid 802 includes a locking protrusion 817 about which the hook 814 pivots. When the recovery tank handle 804 is in the storage position and the open portion 815 faces in a direction of the collection chamber 806, engagement between the locking protrusion 817 and the hook 814 is configured to prevent removal of the recovery tank lid 802 from the recovery tank body 800. When the recovery tank handle 804 is in the lid removal position and the open portion 815 faces in a direction away from the collection chamber 806, the locking protrusion 817 is able to pass through the open portion 815, enabling the recovery tank lid 802 to be removed from the recovery tank body 800. In some instances, and as shown in FIG. 9A, a hook distal end 819 of the hook 814 is configured to come into engagement with a paw 821 of the locking protrusion 817. Engagement between the hook distal end 819 and the paw 821 urges the recovery tank lid 802 in a direction away from the closed end 808 of the collection chamber 806 (e.g., by a lid separation distance 823). Such a configuration may make removal of the recovery tank lid 802 easier. When the recovery tank handle 804 is in the carry position, the hook 814 and/or the recovery tank handle 804 is configured to prevent removal of the recovery tank lid 802. As shown in FIG. 8, engagement between the locking protrusion 817 and the hook 814 and/or recovery tank handle 804 prevents removal of the recovery tank lid 802.

While FIGS. 8, 9, and 9A show the recovery tank handle 804 being used to removably couple the recovery tank lid 802 to the recovery tank body 800, other configurations are possible. For example, the recovery tank lid 802 may be pivotally coupled to the recovery tank body 800 and a latch may retain the recovery tank lid 802 in a closed position. By way of further example, the recovery tank lid 802 and/or the recovery tank body 800 may include a bump latch for removably coupling the recovery tank lid 802 to the recovery tank body 800. By way of still further example, the recovery tank lid 802 may form a friction fit with the recovery tank body 800 for removably coupling the recovery tank lid 802 with the recovery tank body 800.

Figure 10:
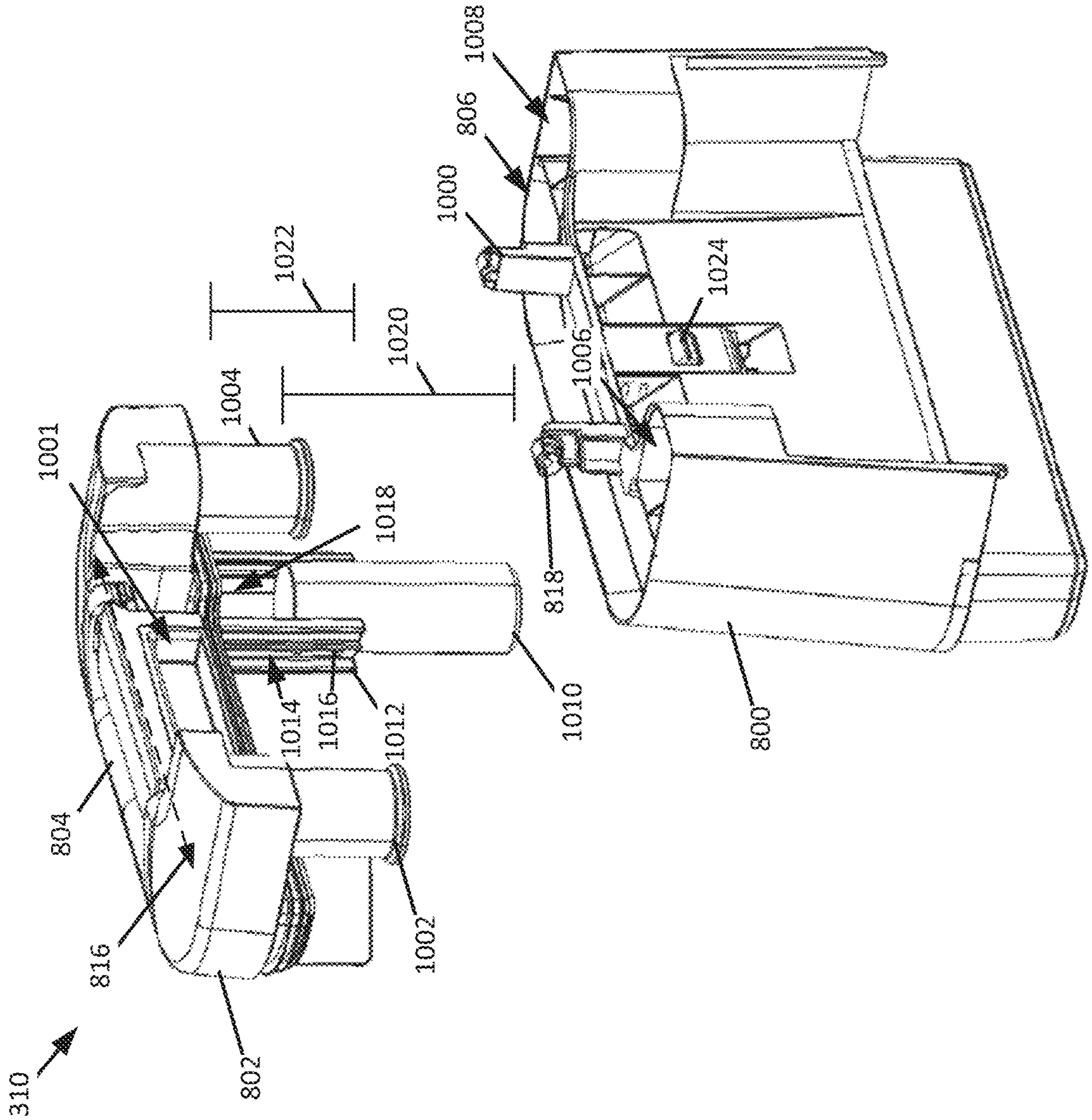
FIG. 10 is an exploded view of the recovery tank of FIG. 7 having a recovery tank lid removed therefrom, consistent with embodiments of the present disclosure.

FIG. 10 shows a perspective view of the recovery tank 310 having the recovery tank lid 802 removed from the recovery tank body 800. The recovery tank body 800 includes a plurality of standoffs 1000, each standoff 1000 having a respective trunnion 818 extending therefrom. As shown, the trunnions 818 may extend from the standoffs 1000 in opposing directions. As also shown, the recovery tank lid 802 defines a hand grip receptacle 1001 that extends between opposing sides of the recovery tank handle 804 and between the pivot axis 816 of the recovery tank handle 804 and the recovery tank body 800.

Figure 10A:
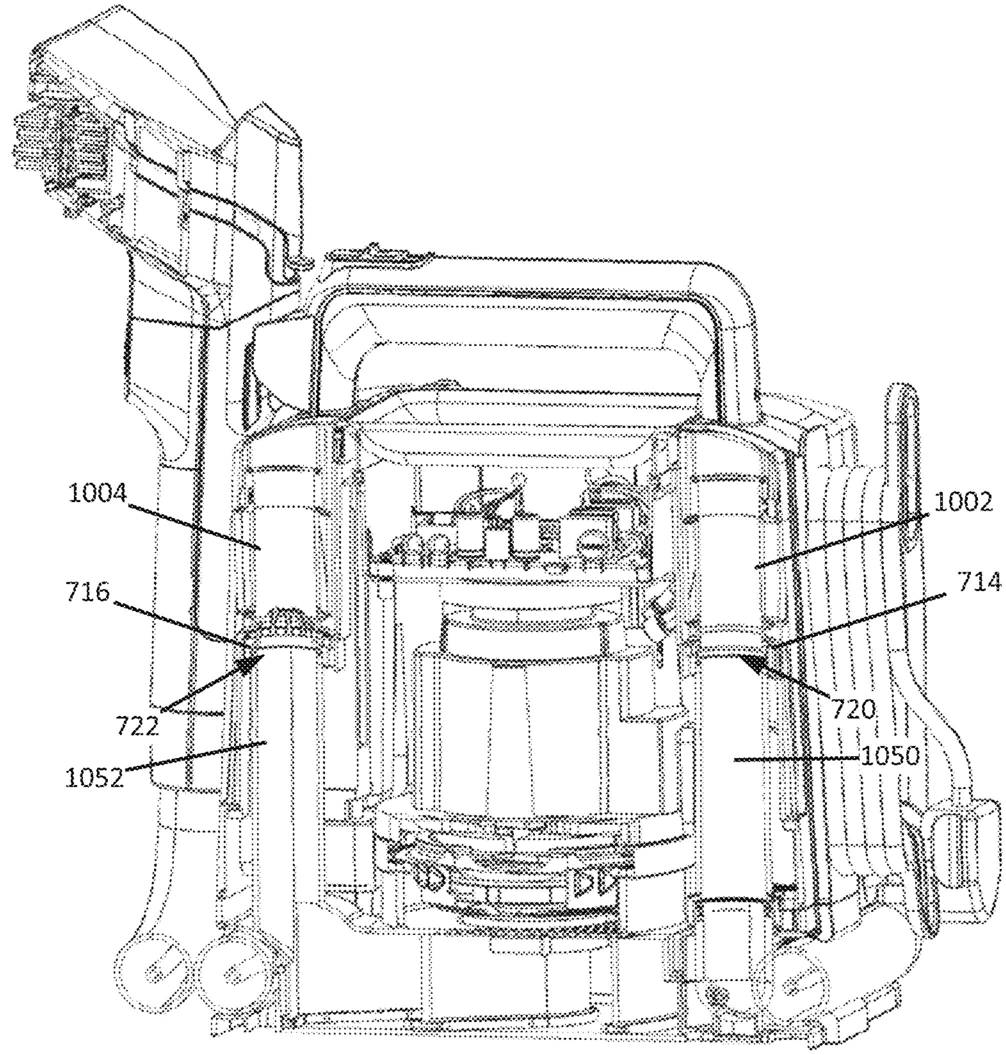
FIG. 10A is a cross-sectional view of the handheld extraction cleaner of FIG. 3 taken along the line X-X of FIG. 3, consistent with embodiments of the present disclosure.

The recovery tank lid 802 includes a recovery downpipe 1002 and an exhaust downpipe 1004. The recovery downpipe 1002 and the exhaust downpipe 1004 are external to the collection chamber 806 when the recovery tank lid 802 is coupled to the recovery tank body 800. When the recovery tank 310 is coupled to the cleaner body 302 (FIG. 3) and the recovery tank lid 802 is coupled to the recovery tank body 800, the recovery downpipe 1002 is configured to fluidly couple to the recovery port 720 (see, FIG. 10A showing the recovery downpipe 1002 fluidly coupled to a recovery fluid channel 1050 via the recovery port 720, the recovery fluid channel 1050 extending within the inlet stepped region 714) and the exhaust downpipe 1004 is configured to fluidly couple to the exhaust port 722 (see, FIG. 10A showing the exhaust downpipe 1004 fluidly coupled to an exhaust fluid channel 1052 via the exhaust port 722, the exhaust fluid channel 1052 extending within the outlet stepped region 716). As shown, the recovery tank body 800 includes a plurality of downpipe passthroughs 1006 and 1008, each corresponding to a respective one of the recovery downpipe 1002 and the exhaust downpipe 1004. The downpipe passthroughs 1006 and 1008 are configured to receive and extend around a respective one of the recovery downpipe 1002 and the exhaust downpipe 1004. For example, and as shown, the downpipe passthroughs 1006 and 1008 may each define a cavity having opposing open ends, the open ends being sized to receive a respective downpipe 1002 and 1004.

As also shown, the recovery tank lid 802 includes a recovery float 1010 and a plurality of float tracks 1012 extending from the recovery tank lid 802. The recovery float 1010 is slidably coupled to the plurality of float tracks 1012. For example, the float tracks 1012 may include a slot 1014 configured to slidably receive a corresponding float protrusion 1016 extending from the recovery float 1010. In some instances, each slot 1014 may receive a plurality of float protrusions 1016. Such a configuration may encourage linear movement of the recovery float 1010 along the float tracks 1012. Additionally, or alternatively, the float tracks 1012 may have a shape that generally corresponds to that of the recovery float 1010. For example, when the recovery float 1010 has a cylindrical shape, the float tracks 1012 may include an arcuate surface that faces the recovery float 1010.

When the recovery tank lid 802 is coupled to the recovery tank body 800, the recovery float 1010 and the float tracks 1012 are configured to extend within the collection chamber 806. As extracted cleaning fluid collects within the collection chamber 806, the recovery float 1010 slides along the float tracks 1012. After a predetermined quantity of extracted cleaning fluid collects in the collection chamber 806, the recovery float 1010 blocks a lid exhaust outlet 1018. When the lid exhaust outlet 1018 is blocked additional fluid is substantially prevented from entering the collection chamber 806, preventing overflowing and/or extracted cleaning fluid from entering a suction motor. As shown, the float tracks 1012 extend from opposing sides of the lid exhaust outlet 1018 and the recovery float 1010 is disposed between the float tracks 1012. In some instances, the recovery float 1010 may extend around the float tracks 1012. In these instances, the float tracks 1012 may define an enclosed tube.

A float length 1020 may be greater than a track length 1022. As such, a portion of the recovery float 1010 may extend below the float tracks 1012. In some instances, the float length 1020 may be such that the recovery float 1010 blocks the lid exhaust outlet 1018 before a level of collected extracted cleaning fluid reaches the float tracks 1012. Such a configuration may prevent and/or reduce a quantity of buoyant solid debris (e.g., fibrous debris) that comes into contact with the float tracks 1012. While the recovery float 1010 is described herein as being slidably coupled to float tracks 1012, other configurations are possible. For example, the recovery float 1010 may be pivotally coupled to the recovery tank lid 802 such that as the recovery float 1010 floats on recovered liquid the recovery float 1010 pivots to accommodate a rising extracted liquid level.

As shown, the recovery tank body 800 may include a recovery tank catch 1024 configured to removably couple the recovery tank to the cleaner body 302 (FIG. 3) of the handheld extraction cleaner 300. For example, the recovery tank catch 1024 can be configured to engage a corresponding receptacle of the cleaner body 302.

Figure 11:
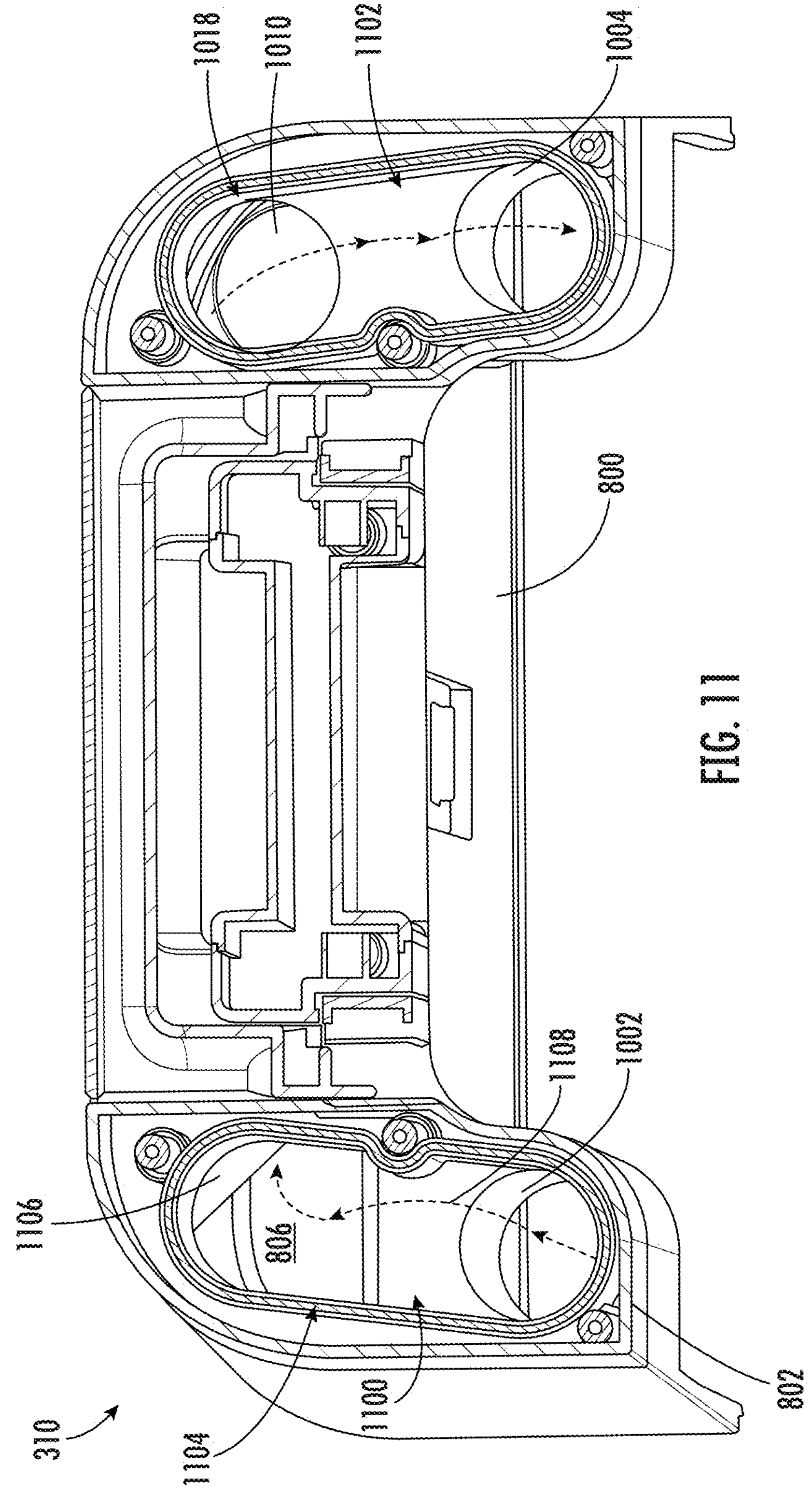
FIG. 11 is a cross-sectional view of the recovery tank of FIG. 7 taken along the line XI-XI of FIG. 7, consistent with embodiments of the present disclosure.

FIG. 11 shows a cross-sectional view of the recovery tank 310 taken along the line XI-XI of FIG. 7. As shown, the recovery tank lid 802 includes (e.g., defines) a recovery pathway 1100 and an exhaust pathway 1102. The recovery and exhaust pathways 1100 and 1102 may have substantially constant cross-sectional areas.

Figure 11A:
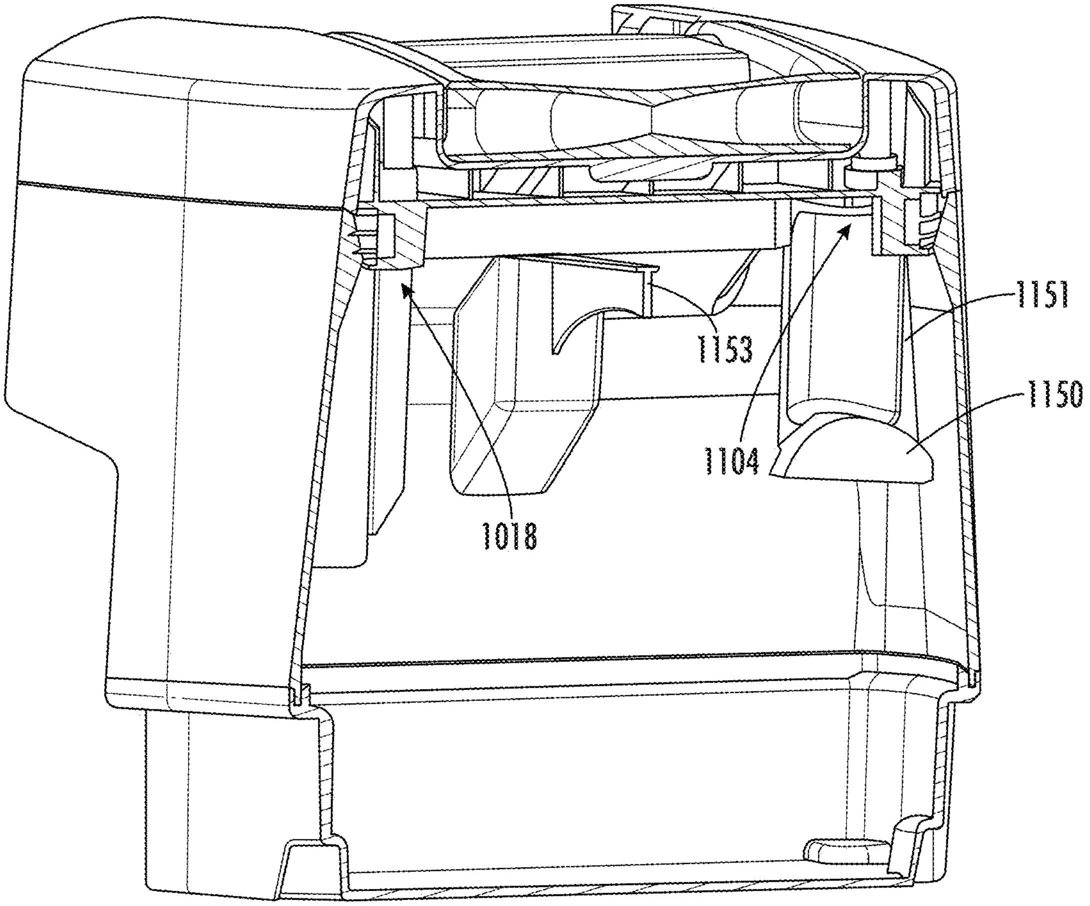
FIG. 11A shows a cross-sectional view of an example recovery tank that includes a deflector having a shelf, consistent with embodiments of the present disclosure.
Figure 11B:
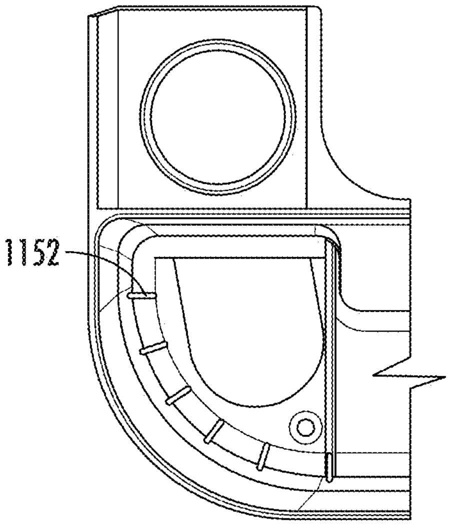
FIG. 11B shows a cross-sectional schematic view of an example of a deflector having one or more ribs, consistent with embodiments of the present disclosure.

The recovery pathway 1100 fluidly couples the recovery downpipe 1002 to the collection chamber 806 via a recovery tank inlet 1104. The exhaust pathway 1102 fluidly couples the exhaust downpipe 1004 to the collection chamber 806 via the lid exhaust outlet 1018. At least a portion of extracted cleaning fluid passing through the recovery tank inlet 1104 may be incident on a deflector 1106. The deflector 1106 may be configured to urge extracted cleaning fluid and/or air towards a bottom of the collection chamber 806. Such a configuration may, for example, encourage at least a portion of any extracted cleaning fluid entrained within air flowing through the collection chamber 806 to come out of entrainment and be deposited within the collection chamber 806. In some instances, the deflector 1106 may include one or more ribs configured to guide fluid incident thereon toward a bottom portion of the collection chamber 806 and/or a shelf that extends between the recovery tank inlet 1104 and a bottom portion of the collection chamber 806. When a shelf is included, the shelf may be shaped to encourage fluid incident thereon to flow towards a bottom portion of the collection chamber 806. One example of a shelf 1150 may be found in FIG. 11A and one schematic example of ribs 1152 may be found in FIG. 11B. As shown in FIG. 11A, the shelf 1150 may have a shape to encourage fluid incident thereon to flow off the shelf 1150. For example, the shelf 1150 may have a convex shape, wherein fluid is incident on the convex surface of the shelf 1150. In some instances, the shelf 1150 may extend from a deflector 1151, the deflector 1151 may be shaped such that fluid is directed towards the shelf 1150. For example, the deflector 1151 may have a concave shape, wherein fluid is incident on the concave surface of the deflector 1151. In some instances, and as shown, there may be tank support 1153 positioned between the recovery tank inlet 1104 and the lid exhaust outlet 1018. The tank support 1153 may improve the structural integrity of the recovery tank body 800.

Figure 12:
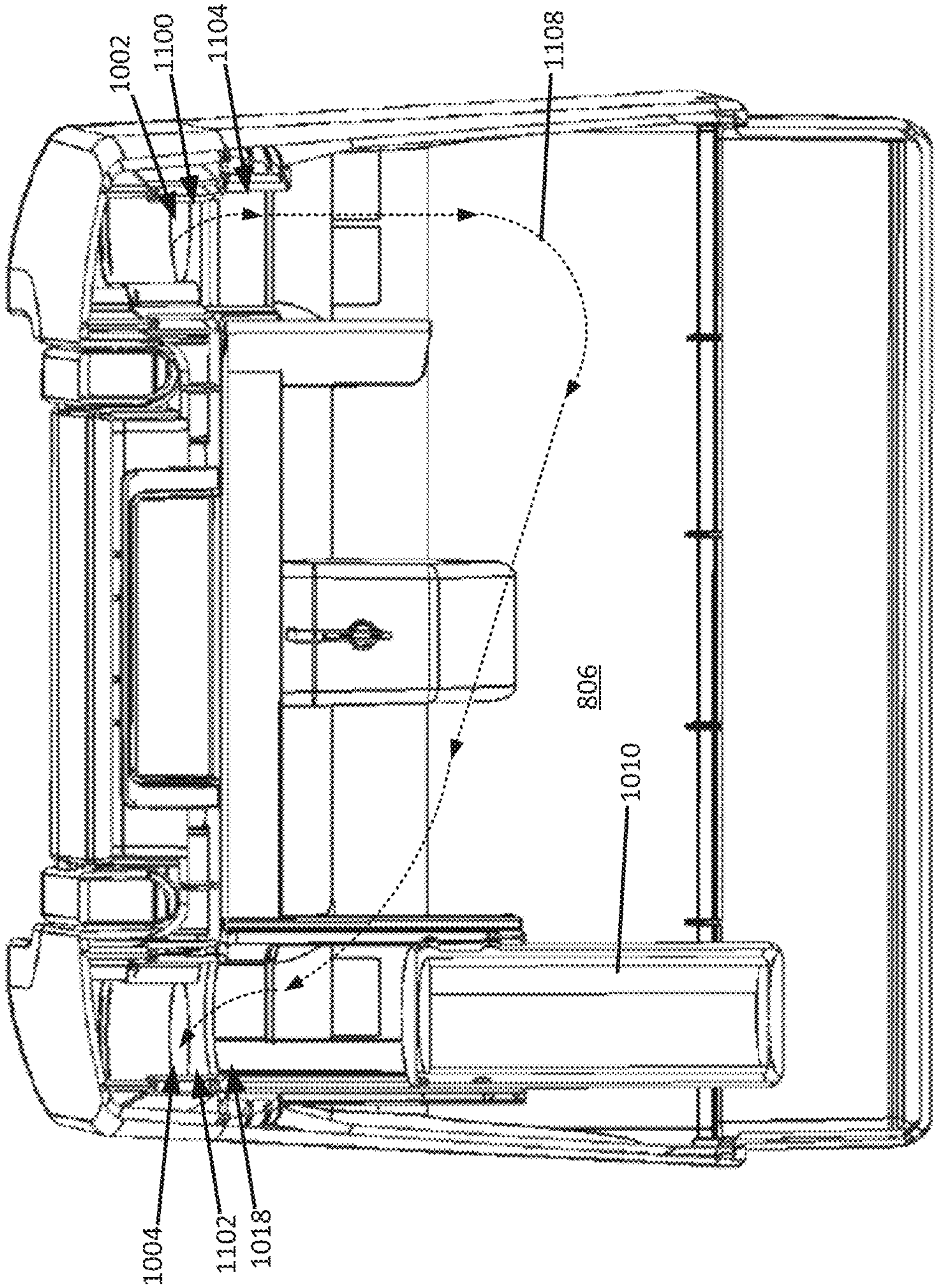
FIG. 12 is cross-sectional view of the recovery tank of FIG. 7 taken along the line XII-XII of FIG. 7, consistent with embodiments of the present disclosure.

In operation, air may flow through the recovery tank 310 along an airflow path 1108 (see, also, FIG. 12 showing a cross-sectional view of the recovery tank 310 taken along the line XII-XII of FIG. 7). As shown, the airflow path 1108 enters the recovery downpipe 1002, passes through the recovery pathway 1100, and enters the collection chamber 806 via the recovery tank inlet 1104. At least a portion of liquid entrained within and/or drawn with air flowing along the airflow path 1108 is deposited in the collection chamber 806 for later disposal. The airflow path 1108 exits the collection chamber 806 via the lid exhaust outlet 1018 and passes through the exhaust pathway 1102 and the exhaust downpipe 1004. When the recovery float 1010 blocks the lid exhaust outlet 1018, the airflow path 1108 is substantially prevented from extending through the collection chamber 806.

Figure 12A:
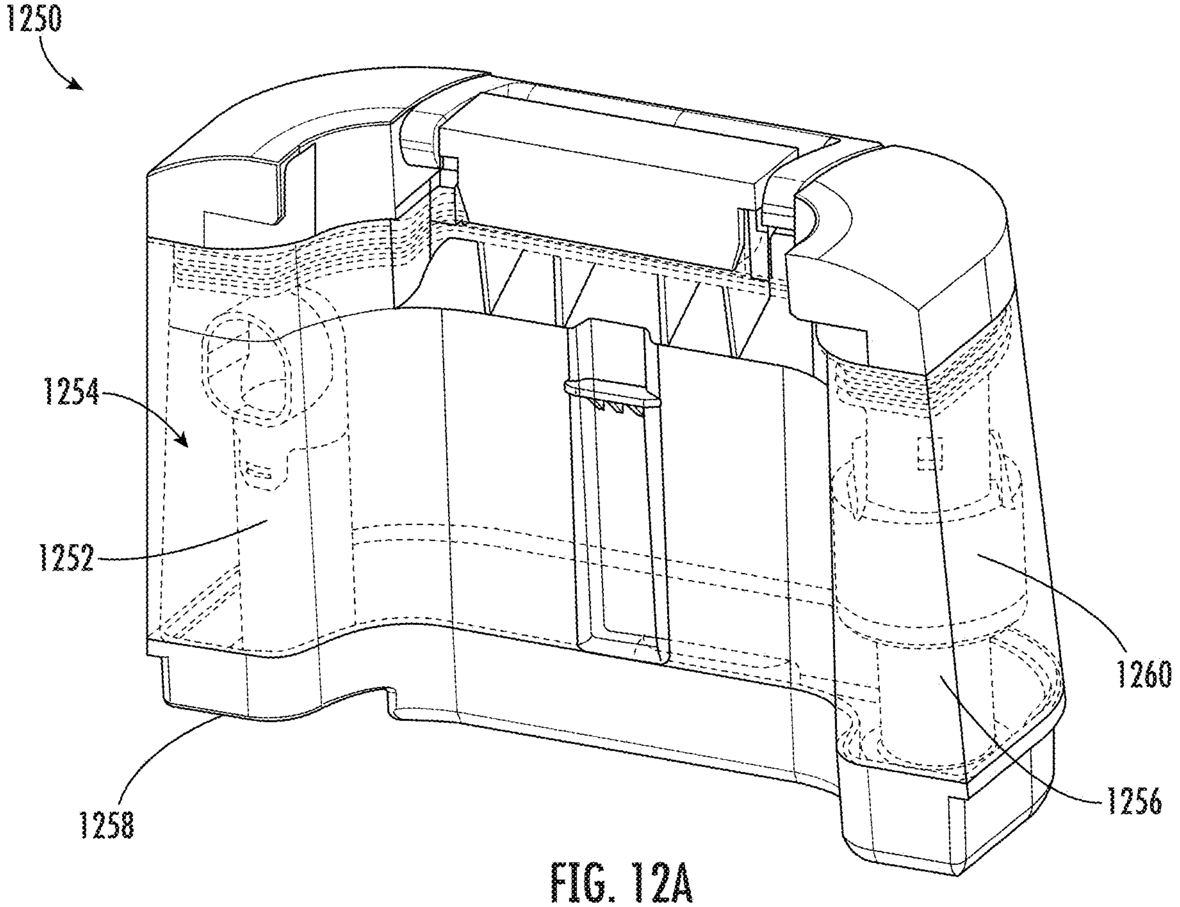
FIG. 12A shows a perspective view of a recovery tank having a standpipe within a collection chamber, consistent with embodiments of the present disclosure.

By having extracted cleaning fluid enter the collection chamber 806 via a recovery tank inlet 1104 defined within the recovery tank lid 802, the recovery tank body 800 may not include (e.g., define) a momentum separator (e.g., a standpipe) that extends within the collection chamber 806. Such a configuration may facilitate easier cleaning of the collection chamber 806 when the recovery tank lid 802 is removed from the recovery tank body 800. FIG. 12A shows an example of a recovery tank 1250 having a standpipe 1252 extending within a collection chamber 1254 of the recovery tank 1250 and an exhaust pathway 1256 extending within the collection chamber 1254. As shown, the standpipe 1252 and the exhaust pathway 1256 extend from a bottom 1258 of the collection chamber 1254 and a recovery float 1260 extends around the exhaust pathway 1256.

Figure 13:
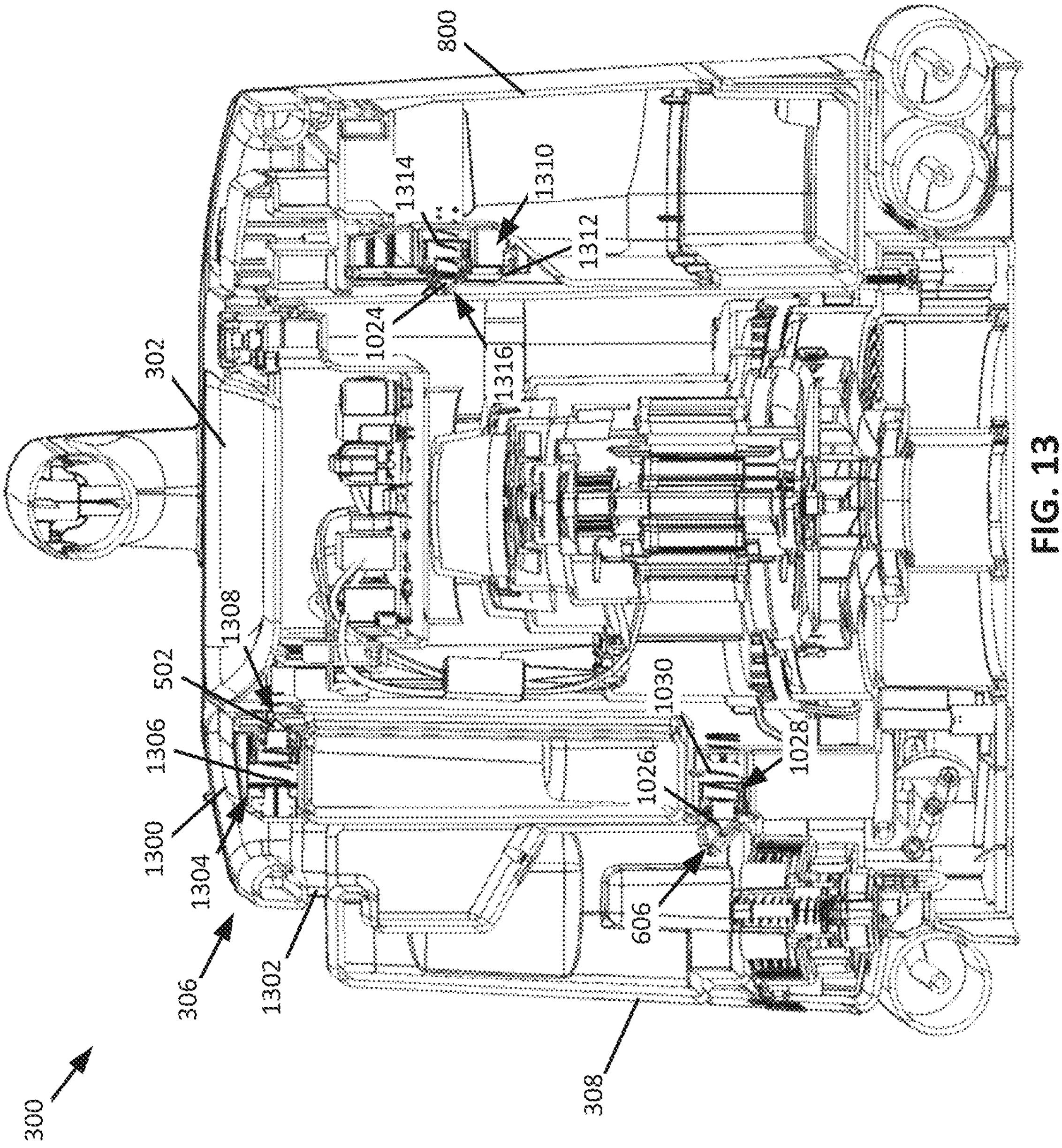
FIG. 13 is a cross-sectional view of the handheld extraction cleaner of FIG. 3 taken along the line XIII-XIII of FIG. 3, consistent with embodiments of the present disclosure.

FIG. 13 is a cross-sectional view of the handheld extraction cleaner 300 taken along the line XIII-XIII of FIG. 3.

As shown, the supply tank 306 includes a supply tank cap 1300 coupled to a supply tank body 1302 of the supply tank 306. The supply tank cap 1300 and the removable supply tank refill top 416 (FIG. 4) are coupled to opposing ends of the supply tank body 1302. The supply tank cap 1300 defines a cap cavity 1304 configured to receive at least a portion of the supply tank catch 502. The supply tank catch 502 can be biased (e.g., using a spring 1306) into engagement with a corresponding supply tank catch receptacle 1308 of the cleaner body 302 of the handheld extraction cleaner 300. In operation, when a user removes the supply tank 306 from or couples the supply tank 306 to the cleaner body 302, the supply tank catch 502 moves within the cap cavity 1304 to enable the supply tank catch 502 to be removed from or received within the supply tank catch receptacle 1308.

As also shown, the recovery tank body 800 defines a catch cavity 1310 for receiving at least a portion of the recovery tank catch 1024. A catch plate 1312 through which a portion of the recovery tank catch 1024 extends may be coupled to the recovery tank body 800 and extend over at least a portion of an open end of the catch cavity 1310. The catch plate 1312 is configured to retain the recovery tank catch 1024 within the catch cavity 1310 when the recovery tank 310 is decoupled from the cleaner body 302 of the handheld extraction cleaner 300. The recovery tank catch 1024 can be biased (e.g., using a spring 1314) into engagement with a corresponding recovery tank catch receptacle 1316 of the cleaner body 302 of the handheld extraction cleaner 300. In operation, when a user removes the recovery tank 310 from or couples the recovery tank 310 to the cleaner body 302 the recovery tank catch 1024 moves within the catch cavity 1310 to enable the recovery tank catch 1024 to be removed from or received within the recovery tank catch receptacle 1316.

As also shown, the additive tank receptacle 606 of the additive tank 308 is configured to receive a body catch 1026. The body catch 1026 extends from a body catch cavity 1028 defined in the cleaner body 302 of the handheld extraction cleaner 300. The body catch 1026 may be biased (e.g., using a spring 1030) into engagement with the additive tank receptacle 606 when the additive tank 308 is coupled to the cleaner body 302. In operation, when a user removes the additive tank 308 from or couples the additive tank 308 to the cleaner body 302 the body catch 1026 moves to enable the body catch 1026 to be removed from or received within the additive tank receptacle 606.

Figure 14:
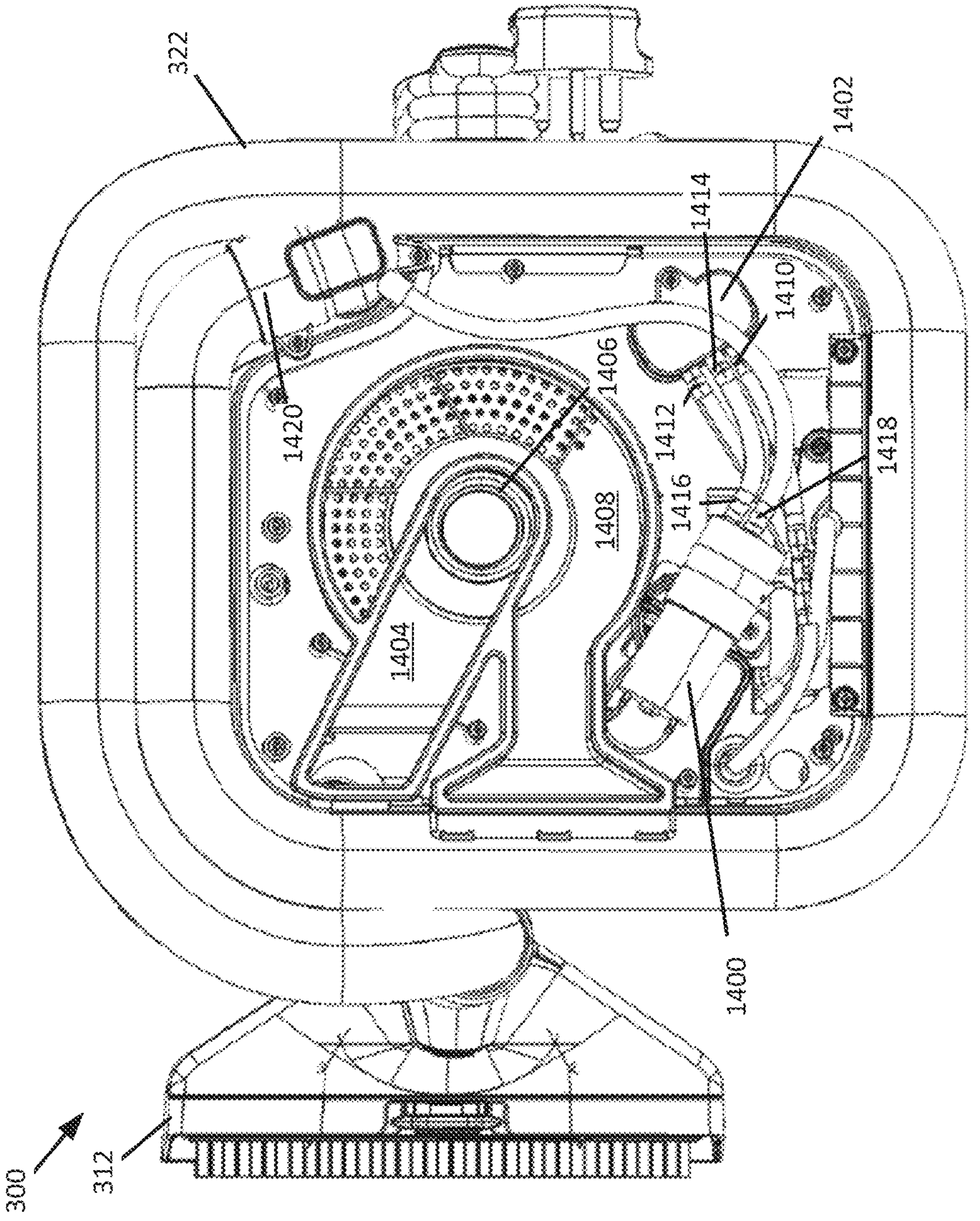
FIG. 14 is a bottom view of the handheld extraction cleaner of FIG. 3 having portions removed therefrom for clarity, consistent with embodiments of the present disclosure.

FIG. 14 shows a bottom view of the handheld extraction cleaner 300, wherein a bottom portion of the base 314 is removed therefrom. As shown, the base 314 includes a pump 1400 fluidly coupled to the supply and additive tanks 306 and 308 (FIG. 3), a mixing valve 1402 fluidly coupled to the pump 1400 and each of the supply and additive tanks 306 and 308, a recovery suction duct 1404 fluidly coupling a suction motor 1406 to the recovery tank 310 (FIG. 3), and a suction motor exhaust duct 1408 fluidly coupling an exhaust of the suction motor to the surrounding environment.

The mixing valve 1402 includes a first mixing valve inlet 1410 fluidly coupled to the supply tank 306, a second mixing valve inlet 1412 fluidly coupled to the additive tank 308, and a mixing valve outlet 1414 fluidly coupled to the pump 1400. When a cleaning fluid is supplied from both the supply tank 306 and the additive tank 308, the supplied cleaning fluids are mixed within the mixing valve 1402 before passing through the pump 1400.

As shown, the pump 1400 includes a pump inlet 1416 fluidly coupled to the mixing valve outlet 1414 and a pump outlet 1418 fluidly coupled to a hose coupler 1420 configured to couple to an end of the flexible hose 322. Cleaning fluid (e.g., the first and/or second cleaning fluids) passing through the pump outlet 1418 and into the hose coupler 1420 is delivered to the cleaning tool 312 such that the cleaning tool 312 can apply (e.g., selectively) the cleaning fluid to a surface to be cleaned (e.g., a floor).

Figure 15:
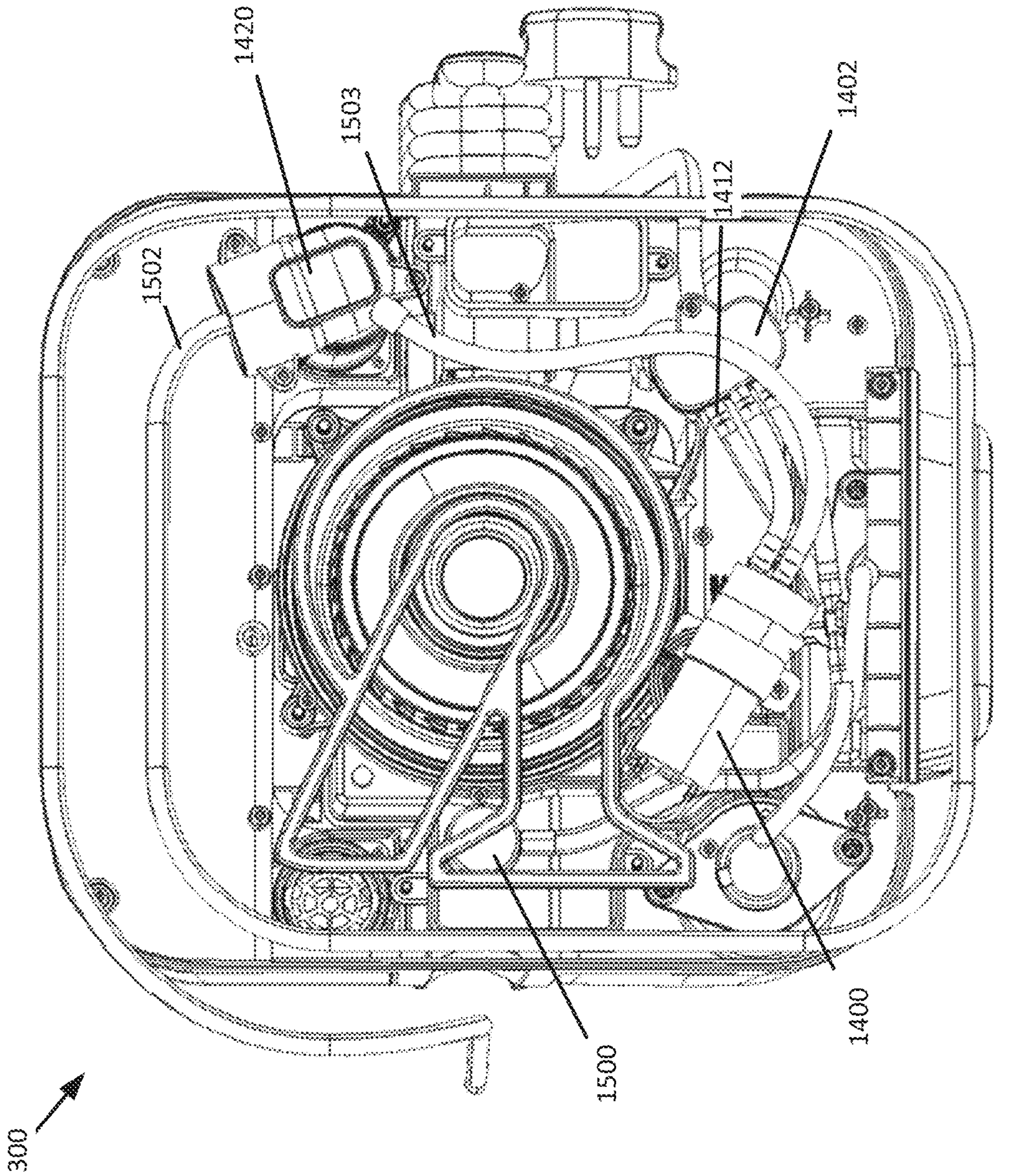
FIG. 15 is another bottom view of the handheld extraction cleaner of FIG. 3 having portions removed therefrom for clarity, consistent with embodiments of the present disclosure.

FIG. 15 shows another bottom view of the handheld extraction cleaner 300, wherein additional portions are removed therefrom. As shown, a control valve 1500 is fluidly coupled to the additive tank 308 (FIG. 3) and the second mixing valve inlet 1412 of the mixing valve 1402. The control valve 1500 is configured to selectively fluidly couple the additive tank 308 with the mixing valve 1402. As such, the control valve 1500 can generally be described as being configured to control whether the second cleaning fluid, stored within the additive tank 308, can be delivered to the surface to be cleaned. In other words, the control valve 1500 may be generally described as being configured to selectively fluidly couple the additive tank 308 to a fluid delivery pathway. The additive actuator 324 may be configured to actuate the control valve 1500. In addition to, or in the alternative to, the control valve 1500, fluid flow from the additive tank 308 may be controlled using a separate pump (e.g., a manual or powered pump) and/or by pressuring the additive tank 308.

As also shown, a flexible tube 1502 is configured to extend within the flexible hose 322 (FIG. 3) for delivering cleaning fluid to the cleaning tool 312 (FIG. 3). The flexible tube 1502 is configured to be fluidly coupled to the pump 1400 via the hose coupler 1420 (e.g., via one or more additional flexible tubes 1503 fluidly coupled to the hose coupler 1420, wherein the flexible tubes 1502 and 1503 may collectively define at least a portion of the fluid delivery pathway). If the additive actuator 324 is included with the cleaning tool 312, a plurality of flexible tubes 1502 may go to the cleaning tool 312 to allow a user to select, for example, between the first cleaning fluid or a mixture of the first and second cleaning fluids.

Figure 16:
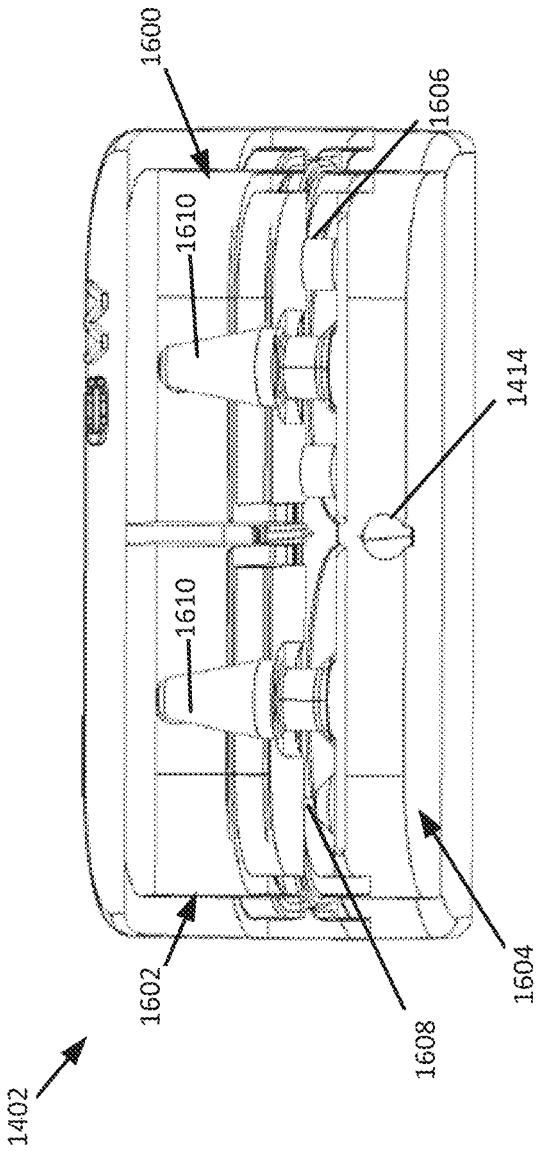
FIG. 16 is a cross-sectional perspective view of a mixing valve of the handheld extraction cleaner of FIG. 3, consistent with embodiments of the present disclosure.

FIG. 16 shows a cross-sectional view of the mixing valve 1402. As shown, the mixing valve 1402 includes a first cavity 1600 corresponding to the first mixing valve inlet 1410 (FIG. 14), a second cavity 1602 corresponding to the second mixing valve inlet 1412 (FIG. 14), and a mixing cavity 1604 fluidly coupled to the first and second cavities 1600 and 1602 and fluidly coupled to the mixing valve outlet 1414. As shown, the first cavity 1600 includes one or more first cavity ports 1606 fluidly coupling the first cavity 1600 to the mixing cavity 1604 and the second cavity 1602 include one or more second cavity ports 1608 fluidly coupling the second cavity 1602 to the mixing cavity 1604. As shown, the mixing valve 1402 includes a plurality of umbrella valves 1610, each umbrella valve 1610 corresponding to a respective one of the first or second cavity 1600 or 1602. The umbrella valves 1610 are configured to function as one-way valves that substantially prevent cleaning fluid within the mixing cavity 1604 from flowing back into the first and/or second cavities 1600 and/or 1602. In addition to, or in the alternative to, the umbrella valves 1610, one or more non-return valves may be fluidly coupled to the first and/or second mixing valve inlets 1410 and/or 1412. In addition to, or in the alternative to, the mixing valve 1402, the first and second cleaning fluids may be mixed using a venturi coupling or valve, a T-coupling or valve, and/or a Y-coupling or valve. In these instances, one or more non-return valves may be fluidly coupled between the valve or coupling and a respective one of the supply tank 306 and/or the additive tank 308.

Figure 16A:
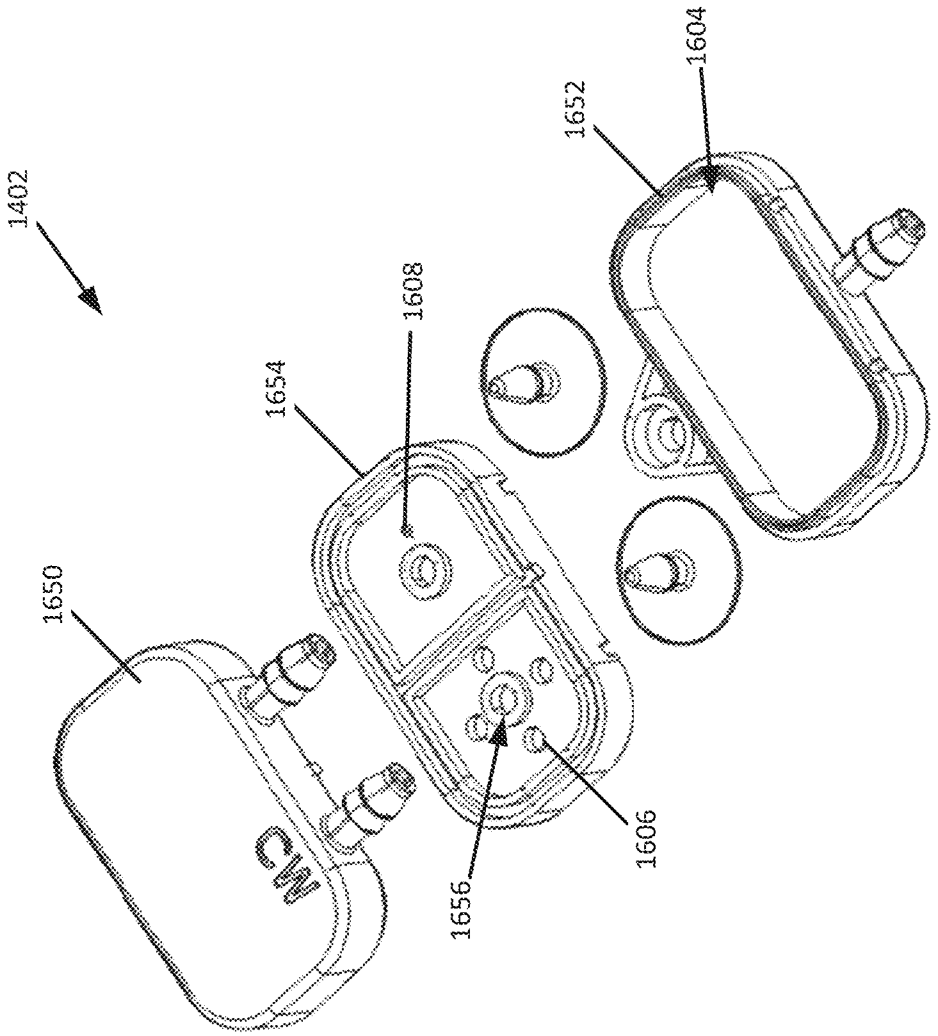
FIG. 16A is an exploded perspective view of the mixing valve of FIG. 16, consistent with embodiments of the present disclosure.

FIG. 16A shows a perspective exploded view of the mixing valve 1402. As shown, the mixing valve 1402 includes a top cover 1650, a bottom cover 1652, and an intermediary plate 1654. The top cover 1650 defines at least a portion of the first and second cavities 1600 and 1602 (FIG. 16) and the bottom cover defines at least a portion of the mixing cavity 1604. The intermediary plate 1654 includes the first and second cavity ports 1606 and 1608 and valve mounting openings 1656 for coupling to the umbrella valves 1610. As shown, the intermediary plate 1654 includes four first cavity ports 1606 and one second cavity port 1608. A diameter of the first cavity ports 1606 may be, for example, between two and four times greater than a diameter of the second cavity ports 1608. By way of further example, a diameter of the first cavity ports 1606 may be 3.125 times greater than a diameter of the second cavity ports 1608. By way of still further example, a diameter of the first cavity ports 1606 may be about (e.g., within 1% of, 5% of, or 10% of) 2.5 millimeters (mm) and a diameter of the second cavity ports may be about 0.8 mm.

The quantity and/or size of the first and second cavity ports 1606 and 1608 may be based, at least in part, on a mixing ratio of the first cleaning fluid (from the supply tank 306) to the second cleaning fluid (from the additive tank 308). For example, the mixing ratio of the first cleaning fluid to the second cleaning fluid may be in a range of 5:1 to 15:1. By way of further example, the mixing ratio of the first cleaning fluid to the second cleaning fluid may be in a range of 9:1 to 11:1. By way of still further example, the mixing ratio of the first cleaning fluid to the second cleaning fluid may be 10:1.

Figure 17:
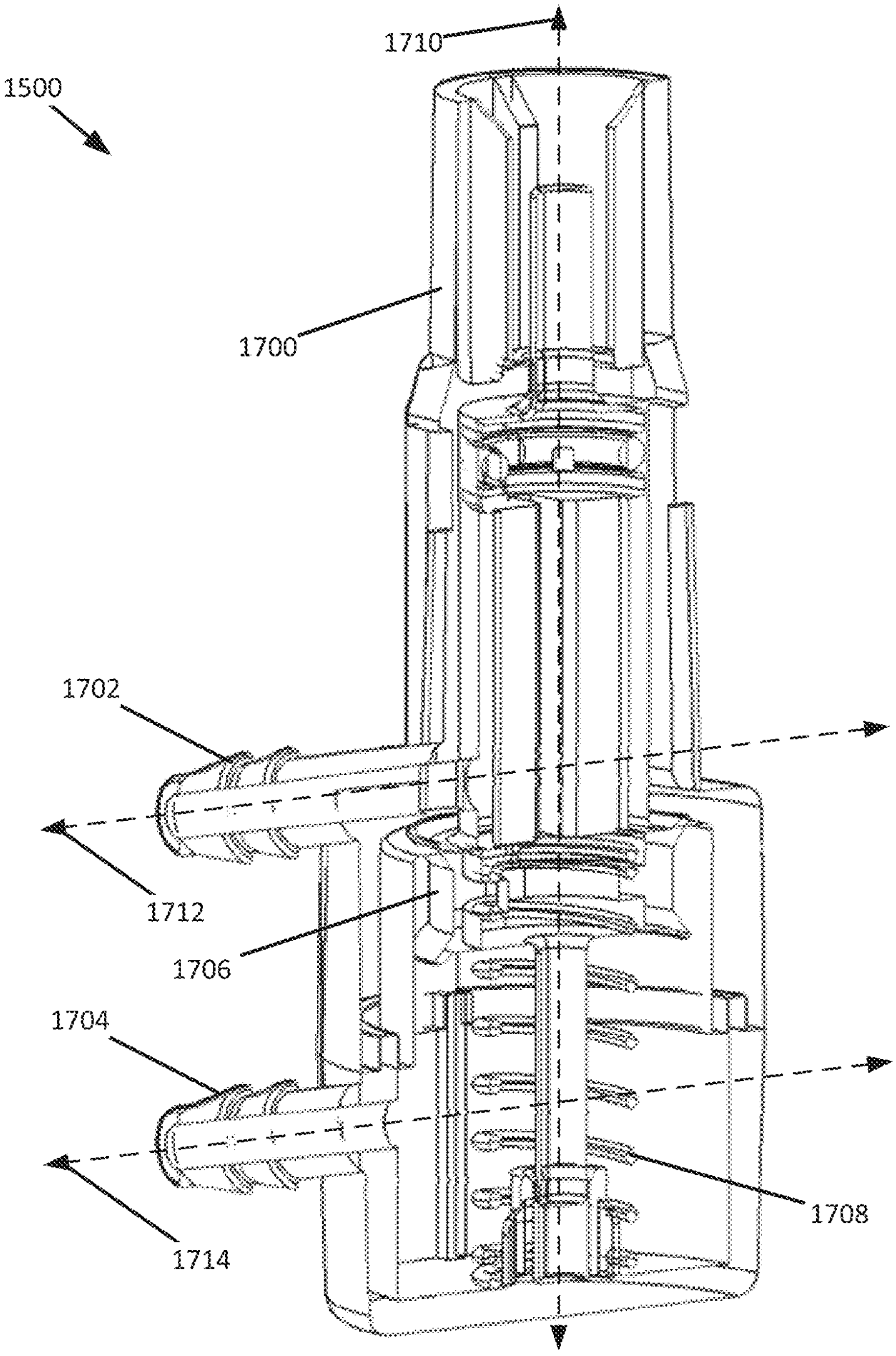
FIG. 17 is a cross-sectional perspective view of a control valve of the handheld extraction cleaner of FIG. 3, consistent with embodiments of the present disclosure.

FIG. 17 shows a cross-sectional view of the control valve 1500. As shown, the control valve 1500 includes a control valve body 1700 having a control valve inlet 1702 fluidly coupled to the additive tank 308 (FIG. 3) and a control valve outlet 1704 fluidly coupled to the mixing valve 1402 (FIG. 14). The control valve 1500 further includes a plunger 1706 slidably received within the control valve body 1700. The plunger 1706 is configured to selectively fluidly couple the control valve inlet 1702 with the control valve outlet 1704 by transitioning between a coupling state and a decoupling state. For example, the plunger 1706 may move between the coupling state and decoupling state in response to actuation of the additive actuator 324 (FIG. 3) on the carry handle 304 (FIG. 3). In this example, a user of the handheld extraction cleaner 300 (FIG. 3) may be able selectively apply cleaning fluid stored in the additive tank 308 to a surface to be cleaned. Such a configuration may allow the user to conserve the cleaning fluid stored in the additive tank 308 for specific cleaning uses (e.g., stain cleaning). The plunger 1706 can be biased (e.g., by a spring 1708) towards the decoupling state. A plunger actuation axis 1710 of the plunger 1706 can extend transverse (e.g., perpendicular) to an inlet axis 1712 of the control valve inlet 1702 and/or an outlet axis 1714 of the control valve outlet 1704.

Figure 17B:
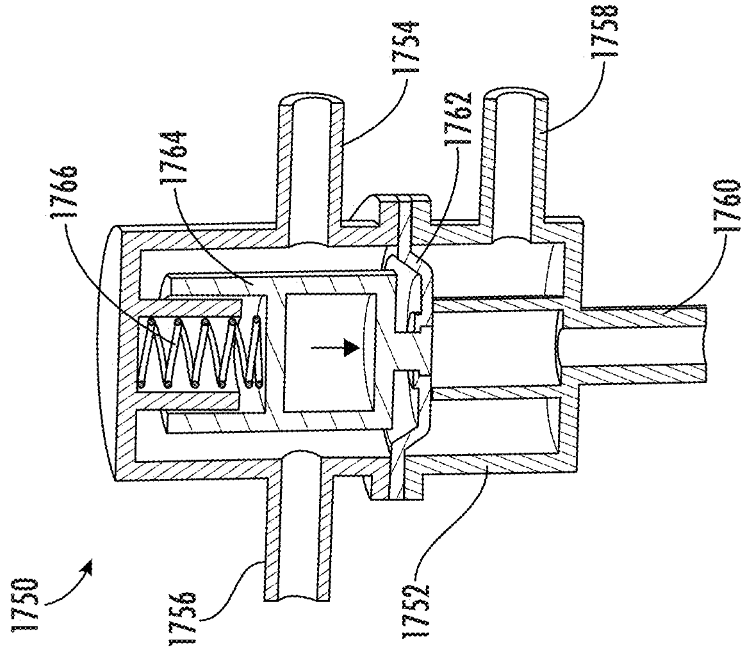
FIG. 17B is a cross-sectional view of the control valve of FIG. 17A in a closed configuration, consistent with embodiments of the present disclosure.
Figure 17A:
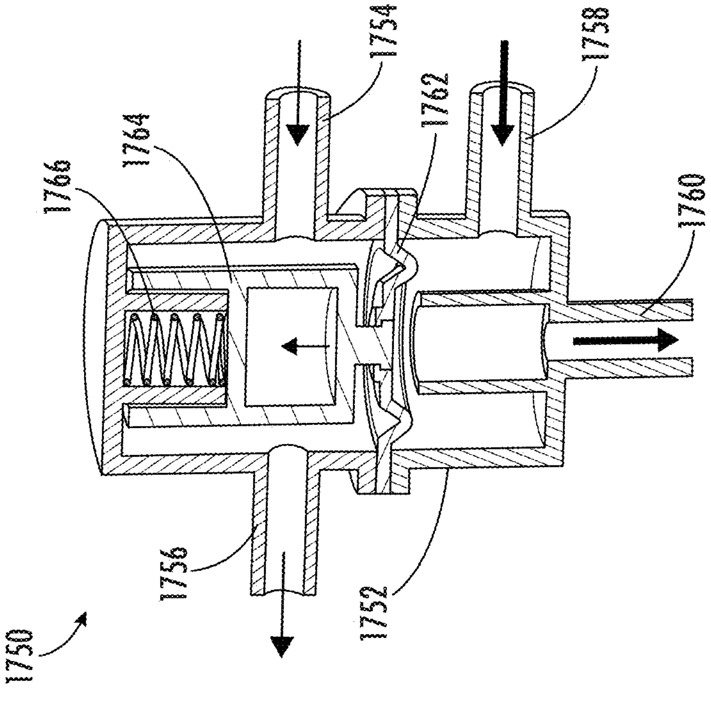
FIG. 17A is a cross-sectional view of another example of a control valve in an open configuration, consistent with embodiments of the present disclosure.

In some instances, the control valve 1500 may be configured to automatically transition between the coupling state and the decoupling state. For example, and as shown in FIGS. 17A and 17B, a control valve 1750 includes a control valve body 1752 having a supply tank inlet 1754, a first outlet 1756, an additive tank inlet 1758, and a second outlet 1760, the first and second outlets 1756 and 1760 are fluidly separate within the control valve body 1752. The supply tank inlet 1754 and the first outlet 1756 are disposed on a first side of a diaphragm 1762 extending within the control valve body 1752 and the additive tank inlet 1758 and the second outlet 1760 are disposed on a second side of the diaphragm 1762, the first side being opposite the second side. The diaphragm 1762 is configured to selectively sealingly engage with the second outlet 1760. As shown, the diaphragm 1762 is configured to transition between an open position (FIG. 17A) and a closed position (FIG. 17B).

A valve float 1764 is coupled to the diaphragm 1762 such that the diaphragm 1762 moves with the valve float 1764. As such, when the first fluid from the supply tank 306 (FIG. 3) is passing through the control valve body 1752, the valve float 1764 moves the diaphragm 1762 out of engagement with the second outlet 1760 allowing a second cleaning fluid from the additive tank 308 (FIG. 3) to pass through the control valve body 1752. When the first cleaning fluid is no longer present within the control valve body 1752 (e.g., when the supply tank 306 is empty), the diaphragm 1762 moves into engagement with the second outlet 1760. For example, the valve float 1764 may be biased (e.g., using a spring 1766) such that the diaphragm 1762 to urged into engagement with the second outlet 1760.

Figure 18:
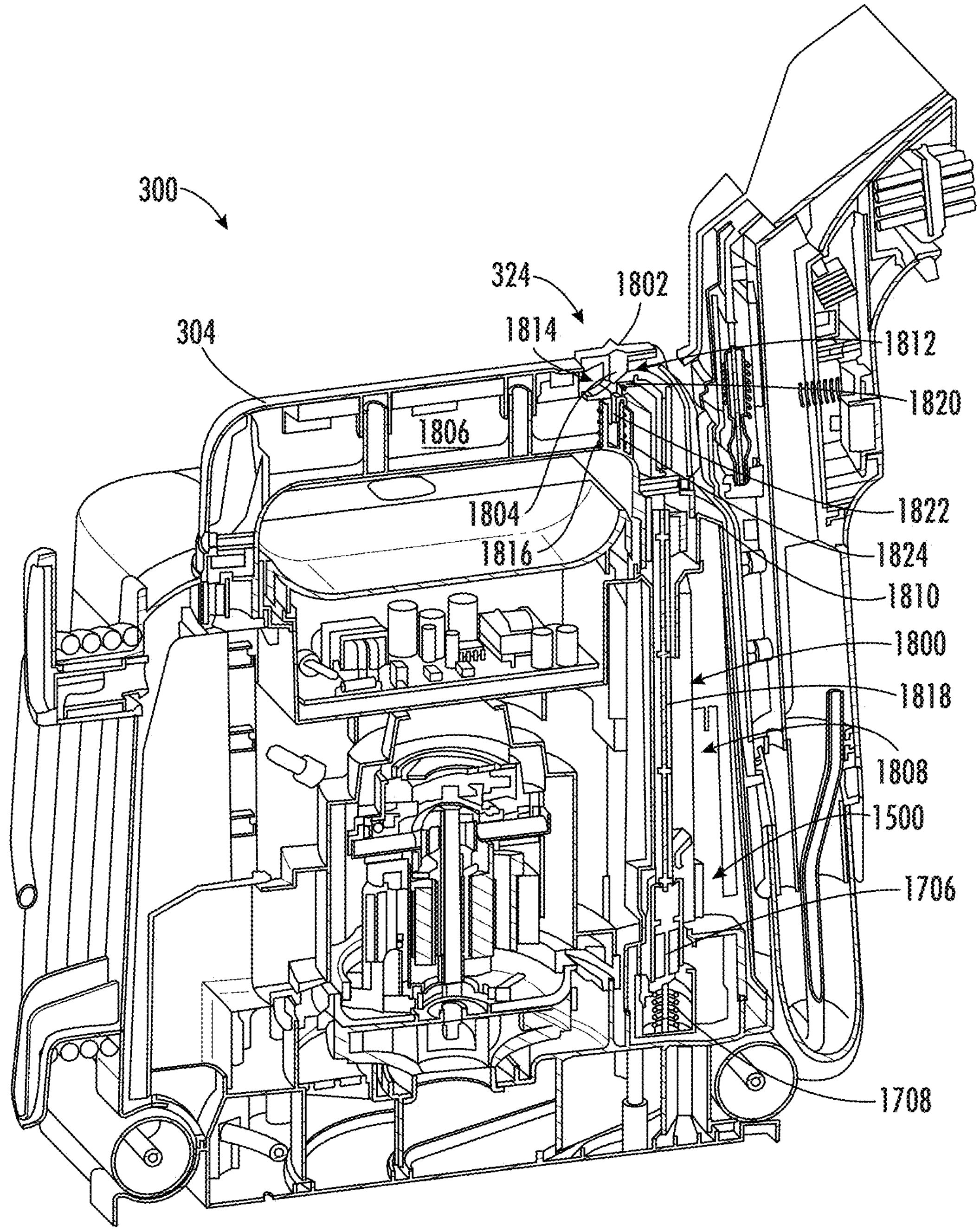
FIG. 18 is a cross-sectional perspective view of the handheld extraction cleaner of FIG. 3 taken along the line XVIII-XVIII of FIG. 3, consistent with embodiments of the present disclosure.

FIG. 18 shows a cross-sectional view of the handheld extraction cleaner 300 taken along the line XVIII-XVIII of FIG. 3. As shown, the additive actuator 324 cooperates with a linkage 1800 which transitions the plunger 1706 of the control valve 1500 from the decoupling state to the coupling state and the spring 1708 transitions the plunger 1706 from the coupling state to the decoupling state.

The additive actuator 324 can be slidably coupled to the carry handle 304 and configured to move between an additive on state and an additive off state, wherein the additive on state corresponds to the coupling state of the plunger 1706 and the additive off state corresponds to the decoupling state of the plunger 1706. The additive actuator 324 can include a user interface portion 1802 with which a user interacts and a switching portion 1804 which engages the linkage 1800. As shown, the user interface portion 1802 is external to the carry handle 304 and the switching portion 1804 is internal to the carry handle 304 (e.g., disposed within a carry handle cavity 1806). As also shown, the linkage 1800 extends within the carry handle cavity 1806 and within a standoff cavity 1808 extending within a standoff 1810 to which the carry handle 304 is coupled. The switching portion 1804 may include a switch ramped region

1812 and the linkage 1800 may include a corresponding linkage ramped region 1814, wherein the ramped regions 1812 and 1814 cooperate to encourage movement of the linkage 1800.

When the additive actuator 324 is moved from the additive off state to the additive on state, the switching portion 1804 urges the linkage 1800 to move, causing the plunger 1706 to transition from the decoupling state to the coupling state. When the additive actuator 324 is moved from the additive on state to the additive off state, the switching portion 1804 moves such that the spring 1708 moves the plunger 1706 from the coupling state to the decoupling state. As the spring 1708 moves the plunger 1706 to the decoupling state, the linkage 1800 moves with the plunger 1706. For example, a force generated by the spring 1708 and/or a force generated by a second spring 1816 disposed within the handle cavity 1806 may move the linkage 1800 as the plunger 1706 transitions to the decoupling state.

The linkage 1800 includes an actuation leg 1818 that extends within the standoff cavity 1808 and an actuated leg 1820 that extends within the handle cavity 1806. The actuation leg 1818 is configured to urge the plunger 1706 to transition from the decoupling state to the coupling state. The actuated leg 1820 includes the linkage ramped region 1814 and extends transverse (e.g., perpendicular) to the actuation leg 1818. In some instances, the linkage 1800 may be generally described as being L-shaped. The actuated leg 1820 may further include a guide protrusion 1822 configured to be received within a guide socket 1824 extending within the handle cavity 1806, wherein the second spring 1816 extends around (or within) the guide socket 1824. When the additive actuator 324 is moved between the additive on and off states, the guide protrusion 1822 moves within the guide socket 1824.

Figure 19:
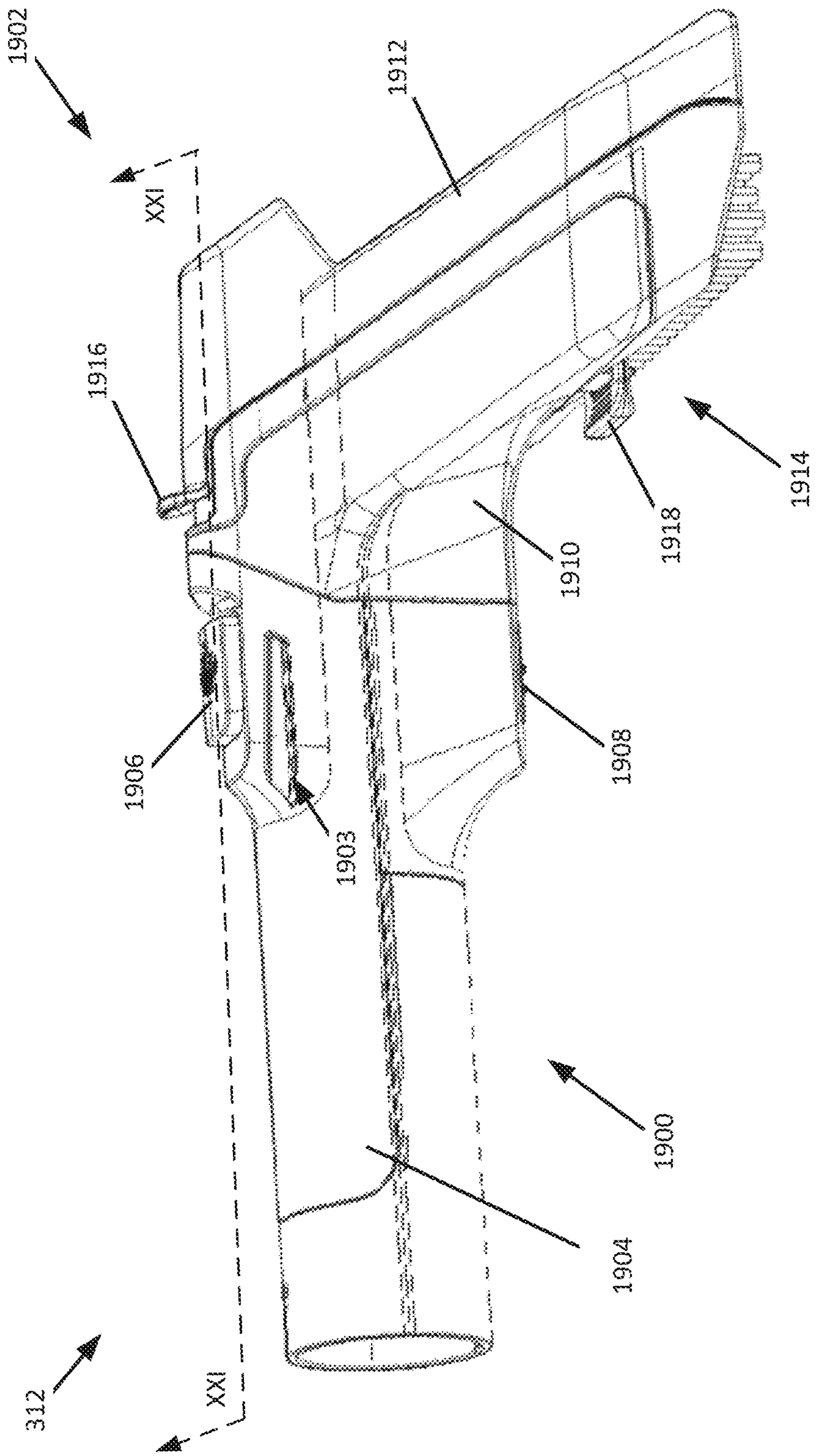
FIG. 19 is a perspective view of a cleaning tool of the handheld extraction cleaner of FIG. 3, consistent with embodiments of the present disclosure.

FIG. 19 is a perspective view of the cleaning tool 312 decoupled from the flexible hose 322. As shown, the cleaning tool 312 includes a tool body 1900 and a cleaning assembly 1902 removably coupled to the tool body 1900.

The tool body 1900 includes a grip region 1904, a cleaning fluid actuator 1906, and a cleaning assembly release 1908. The grip region 1904 is configured to be gripped by a user during use of the cleaning tool 312. The cleaning fluid actuator 1906 is configured to allow a user to selectively deliver cleaning fluid (e.g., from the supply tank 306 and/or the additive tank 308) to the cleaning assembly 1902. For example, the cleaning fluid actuator 1906 may be a button configured to be depressed by a user when cleaning fluid is desired. As may be appreciated, a user may be able to control the additive actuator 324 (FIG. 3) with a hand that is grasping the carry handle 304 (FIG. 3) and to control the cleaning fluid actuator 1906 with a hand that is grasping the grip region 1904. Such a configuration may allow a user to more easily control whether cleaning fluid is supplied from both the supply tank 306 (FIG. 3) and the additive tank 308 (FIG. 3) or just the supply tank 306. This may allow a user to quickly address specific cleaning needs (e.g., for stain cleaning). The cleaning assembly release 1908 may be configured to removably couple the cleaning assembly 1902 to the tool body 1900. Such a configuration may allow a user to more easily clean the cleaning assembly 1902 and/or interchange the cleaning assembly 1902 with a secondary cleaning assembly. In some instances, there may be a plurality of cleaning fluid actuators 1906, wherein each cleaning fluid actuator 1906 corresponds to a specific cleaning fluid and/or mixture of cleaning fluids.

The tool body 1900 may further include tool mounts 1903 configured to mount the cleaning tool 312 with the cleaner body 302 (FIG. 3). For example, and as shown, the tool mounts 1903 may be slots (or protrusions) defined in the tool body 1900 that are configured to slidably engage with the cleaner body 302 (e.g., corresponding protrusions, or slots, defined in the cleaner body 302). As shown, the tool mounts 1903 and the cleaning fluid actuator 1906 are positioned on a common side of the tool body 1900. As such, when the cleaning tool 312 is mounted to the cleaner body 302, the cleaning fluid actuator 1906 faces the cleaner body 302. In some instances, when the cleaning tool 312 is mounted to the cleaner body 302, the cleaner body 302 may at least partially obscure the cleaning fluid actuator 1906 to mitigate a risk of a user inadvertently actuating the cleaning fluid actuator 1906 when removing the cleaning tool 312 from the cleaner body 302.

The cleaning assembly 1902 includes an assembly body 1910, a nozzle cover 1912 removably coupled to the assembly body 1910, and an assembly agitator 1914 removably coupled to the assembly body 1910. The nozzle cover 1912 includes a nozzle removal tab 1916 for removably coupling the nozzle cover 1912 to the assembly body 1910. Removal of the nozzle cover 1912 from the assembly body 1910 may allow a user to more easily clean the cleaning assembly 1902. The assembly agitator 1914 includes an agitator removal tab 1918 configured to removably couple the assembly agitator 1914 to the assembly body 1910.

Figure 20:
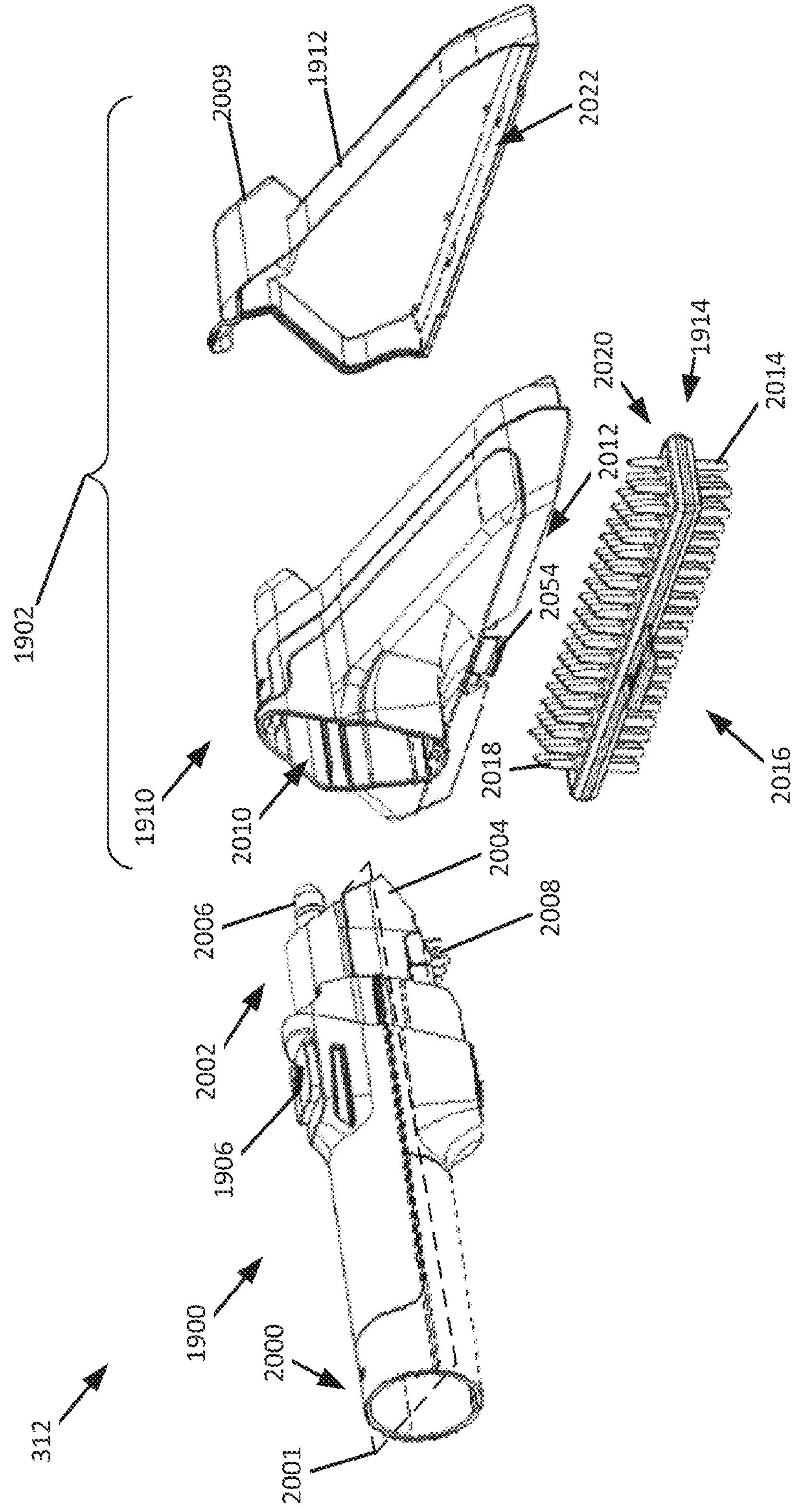
FIG. 20 is an exploded view of the cleaning tool of FIG. 19, consistent with embodiments of the present disclosure.

FIG. 20 shows an exploded view of the cleaning tool 312. As shown, the tool body 1900 includes a coupling end 2000 configured to couple (e.g., removably couple) to the flexible hose 322 (FIG. 3) and a cleaning end 2002 opposite the coupling end 2000. The tool body 1900 includes a suction inlet 2004, a fluid applicator 2006, and a body agitator 2008 (e.g., at the cleaning end 2002), wherein at least a portion of the suction inlet 2004 is disposed between the fluid applicator 2006 and the body agitator 2008. The suction inlet 2004, the fluid applicator 2006, and the body agitator 2008 are configured such that the tool body 1900 can be used independent off the cleaning assembly 1902.

The fluid applicator 2006 is configured to be selectively fluidly coupled to one or both of the supply tank 306 (FIG. 3) and/or the additive tank 308 (FIG. 3) such that a cleaning fluid can be applied to a surface to be cleaned. In some instances, the fluid applicator 2006 may include a nozzle configured to shape and direct cleaning fluid emitted therefrom. For example, the fluid applicator 2006 may include a nozzle configured to generate fan-shaped spray pattern.

In some instances, the nozzle cover 1912 may further include a hood 2009 configured to interact with cleaning fluid passing through the fluid applicator 2006. For example, the hood 2009 may be configured to shape cleaning fluid incident thereon (e.g., the hood 2009 may include or define a nozzle). Alternatively, cleaning fluid may not be incident on the hood 2009. In these instances, the hood 2009 may be configured to protect the fluid applicator 2006 from damage. In some instances, the hood 2009 may be pivotally coupled to the nozzle cover 1912. In some instances, a spray pattern of the fluid applicator 2006 may be adjustable. For example, and as shown in FIG. 20B, a rotatable spray pattern adjuster 2056 may be disposed within a spray path of the fluid applicator 2006, wherein the rotatable spray pattern adjuster 2056 includes a plurality of shaping apertures 2058 for shaping cleaning fluid passing therethrough. Rotation of the rotatable spray pattern adjuster 2056 positions a corresponding shaping aperture 2058 within a spray path of the fluid applicator 2006.

As also shown, the fluid applicator 2006 is configured to direct fluid forward of the assembly agitator 1914 (and/or the suction inlet 2004) and is positioned above the assembly agitator 1914 (and/or the suction inlet 2004). For example, the fluid applicator 2006 may be configured to emit fluid in a downward direction and such that the assembly agitator 1914 (and/or the suction inlet 2004) is positioned between the emitted fluid and the coupling end 2000 of cleaning tool 312. In this example, the fluid applicator 2006 and the cleaning fluid actuator 1906 may be disposed on a common side of a central longitudinal plane 2001 of the tool body 1900 and the assembly agitator 1914 (and/or the suction inlet 2004) may be positioned on an opposing side of the central longitudinal plane 2001 of the cleaning tool 312. Such a configuration may allow for better visibility, enabling a user to more accurately direct fluid to a specific location (e.g., reducing a risk of overspray).

The assembly body 1910 includes a tool body cavity 2010 configured to receive at least a portion of the tool body 1900. The tool body cavity 2010 may be configured to receive the cleaning end 2002 of the tool body 1900 such that the suction inlet 2004, fluid applicator 2006, and body agitator 2008 are at least partially received within the tool body cavity 2010. The tool body cavity 2010 is configured such that the suction inlet 2004 is fluidly coupled to the cleaning assembly 1902 (e.g., to the nozzle cover 1912) and such that the fluid applicator 2006 is capable of directing fluid towards a surface to be cleaned (e.g., at least a portion of the fluid applicator 2006 extends from the tool body cavity 2010).

The assembly body 1910 further defines an agitator cavity 2012 for selectively receiving the assembly agitator 1914. As shown, the assembly agitator 1914 includes a first cleaning implement 2014 (e.g., bristle tufts) on a first side 2016 and a second cleaning implement 2018 (e.g., elastomeric protrusions, such as, silicone protrusions) on a second side 2020, the first side 2016 being opposite the second side 2020. The assembly agitator 1914 may be received within the agitator cavity 2012 in a first orientation, wherein the first cleaning implements 2014 are exposed, or a second orientation, wherein the second cleaning implements 2018 are exposed. The first and second cleaning implements 2014 and 2018 may be different. As such, changing the orientation of the assembly agitator 1914 may change the cleaning characteristics of the cleaning tool 312.

The nozzle cover 1912 defines a nozzle cavity 2022. The nozzle cavity 2022 is configured to define at least a portion of a fluid flow channel that extends between the nozzle cover 1912 and the assembly body 1910 and that is fluidly coupled to the suction inlet 2004.

Figure 20A:
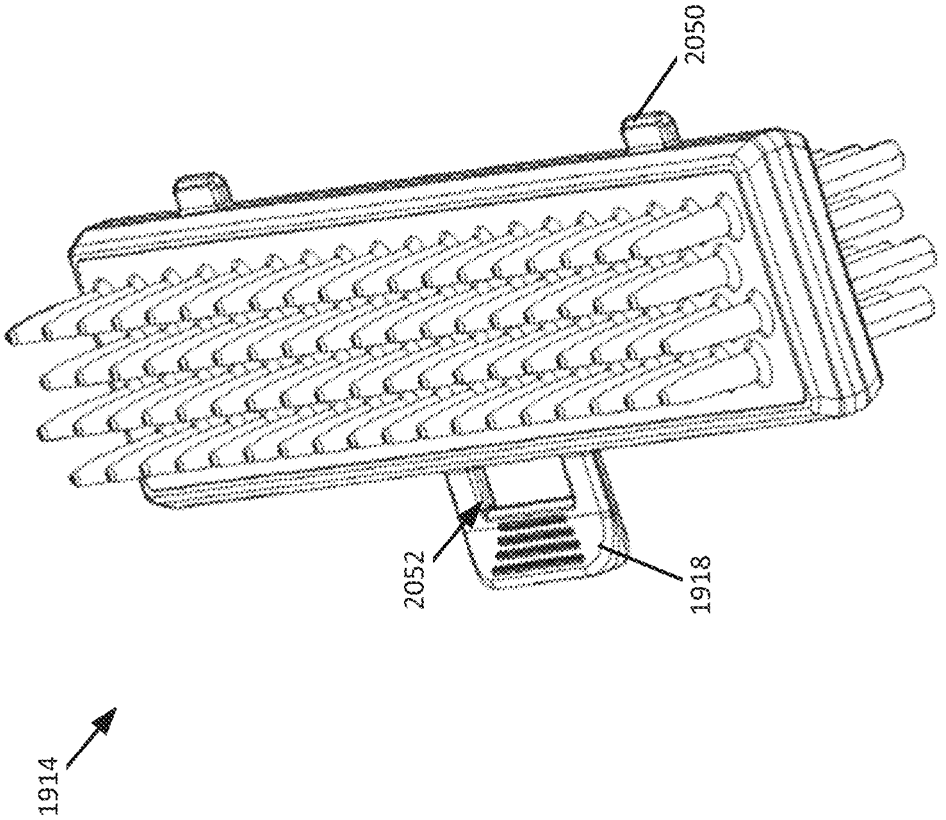
FIG. 20A is a perspective view of an assembly agitator of the cleaning tool of FIG. 19, consistent with embodiments of the present disclosure.
Figure 20B:
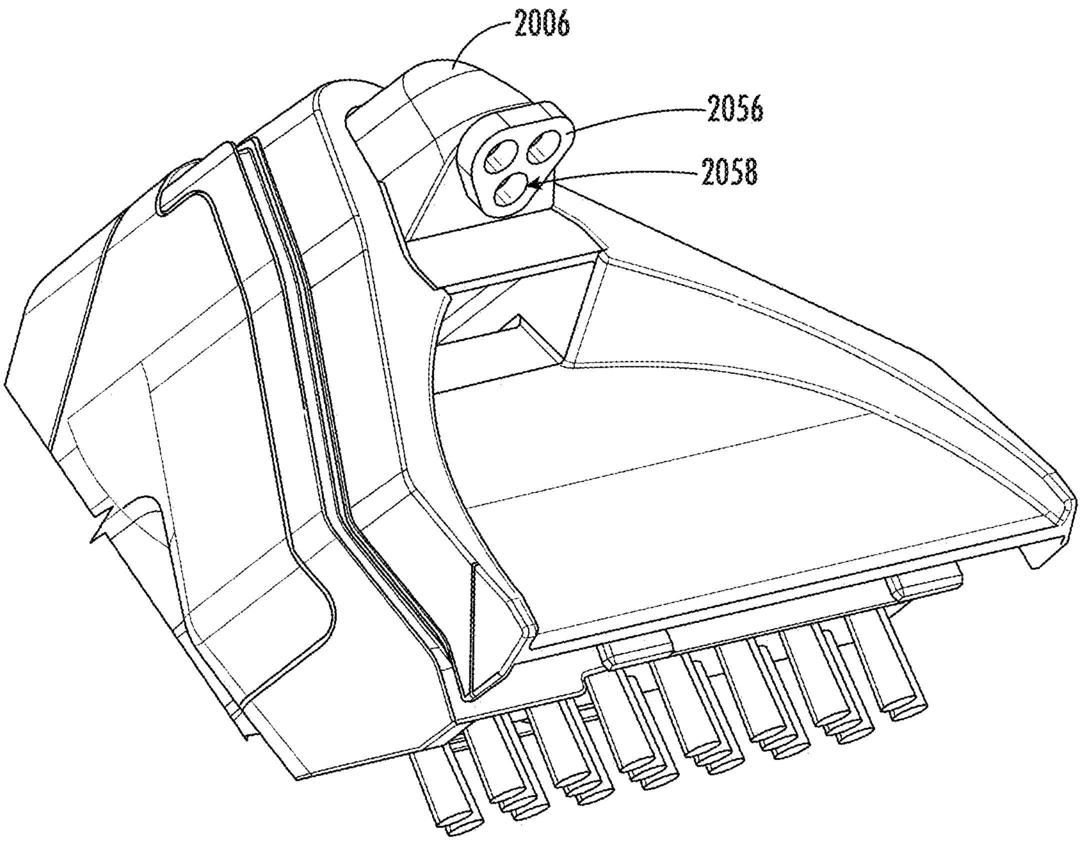
FIG. 20B is a perspective view of a cleaning tool having a rotatable spray pattern adjuster, consistent with embodiments of the present disclosure.

FIG. 20A shows a perspective view of the assembly agitator 1914. As shown, the assembly agitator 1914 includes one or more toe-in protrusions 2050 configured to at least partially couple and/or align the assembly agitator 1914 to the agitator cavity 2012 (FIG. 20). The agitator removal tab 1918 and the one or more toe-in protrusions 2050 are opposite sides of the assembly agitator 1914. The agitator removal tab 1918 includes a coupling socket 2052 configured to releasably engage a corresponding tab 2054 (FIG. 20) extending from the assembly body 1910.

Figure 21:
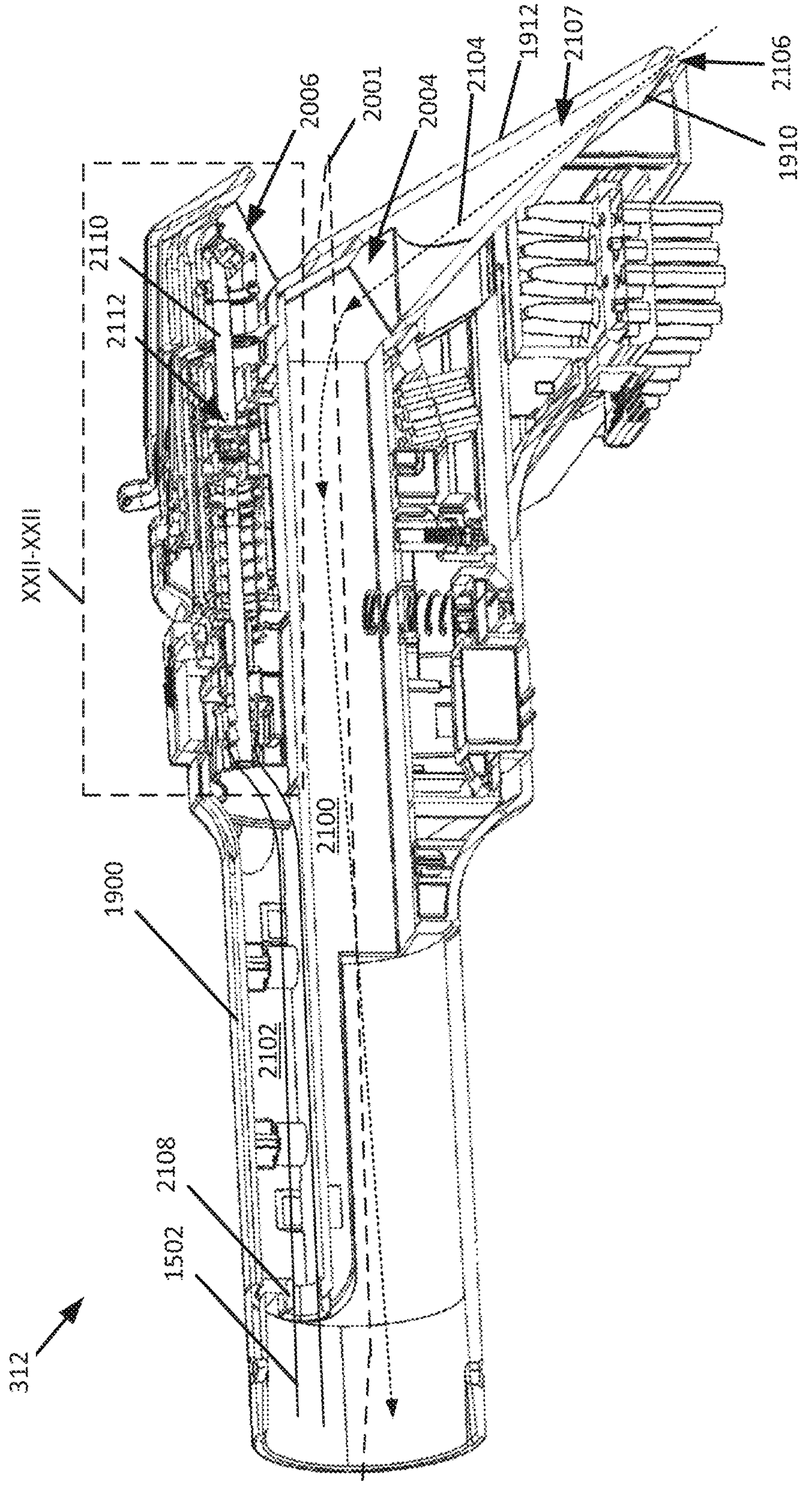
FIG. 21 is a cross-sectional perspective view of the cleaning tool of FIG. 19 taken along the line XXI-XXI of FIG. 19, consistent with embodiments of the present disclosure.

FIG. 21 is a cross-sectional view of the cleaning tool 312 taken along the line XXI-XXI of FIG. 19. As shown, the cleaning tool 312 includes a recovery channel 2100 and a cleaning fluid delivery channel 2102 separate from the recovery channel 2100. As shown, the recovery channel 2100 is defined, at least in part, by the tool body 1900, the assembly body 1910, and the nozzle cover 1912. In operation, air and extracted fluid flows along a cleaning tool air pathway 2104 extending from a nozzle inlet 2106 through a fluid flow channel 2107 extending between the nozzle cover 1912 and the assembly body 1910 and into the suction inlet 2004 of the tool body 1900. The cleaning fluid delivery channel 2102 may be configured to receive one or more delivery tubes (e.g., the flexible tube 1502) configured to carry cleaning fluid to the fluid applicator 2006. For example, the cleaning fluid delivery channel 2102 may include one or more passthrough connections 2108 through which a flexible tube may extend. The one or more passthrough connections 2108 may be configured to form a friction fit with an external surface of the flexible tube 1502 extending therethrough. The flexible tube 1502 may be configured to fluidly couple to the fluid applicator 2006 via an outlet channel 2110 having a channel inlet 2112. The flexible tube 1502 is also fluidly coupled to the supply tank 306 (FIG. 3) and additive tank 308 (FIG. 3).

Figure 21A:
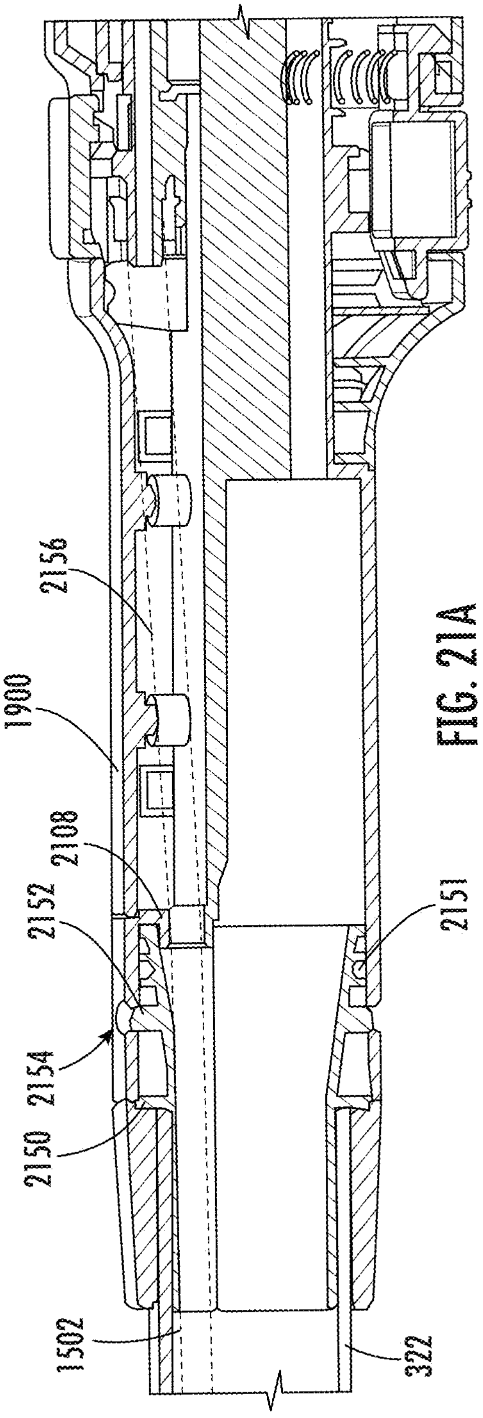
FIG. 21A shows a cross-sectional view of a coupling configured to couple a flexible hose to the cleaning tool of FIG. 19, consistent with embodiments of the present disclosure.

In some instances, the flexible tube 1502 extends within a coupling configured to be removably received within the coupling end 2000. For example, and as shown in FIG. 21A, a coupling 2150 is removably received within the coupling end 2000 and is coupled to the flexible hose 322. The coupling 2150 includes barbs 2152 configured to releasably engage with tool body openings 2154 defined in the tool body 1900 and an O-ring 2151 configured to sealingly engage with an inner surface of the tool body 1900. The flexible tube 1502 extends within the coupling 2150 and fluidly couples to one end of the passthrough connection 2108 defined by the tool body 1900. Another end of the passthrough connection 2108 is fluidly coupled (e.g., via a secondary tube 2156) to the fluid applicator 2006 (FIG. 20).

Figure 21B:
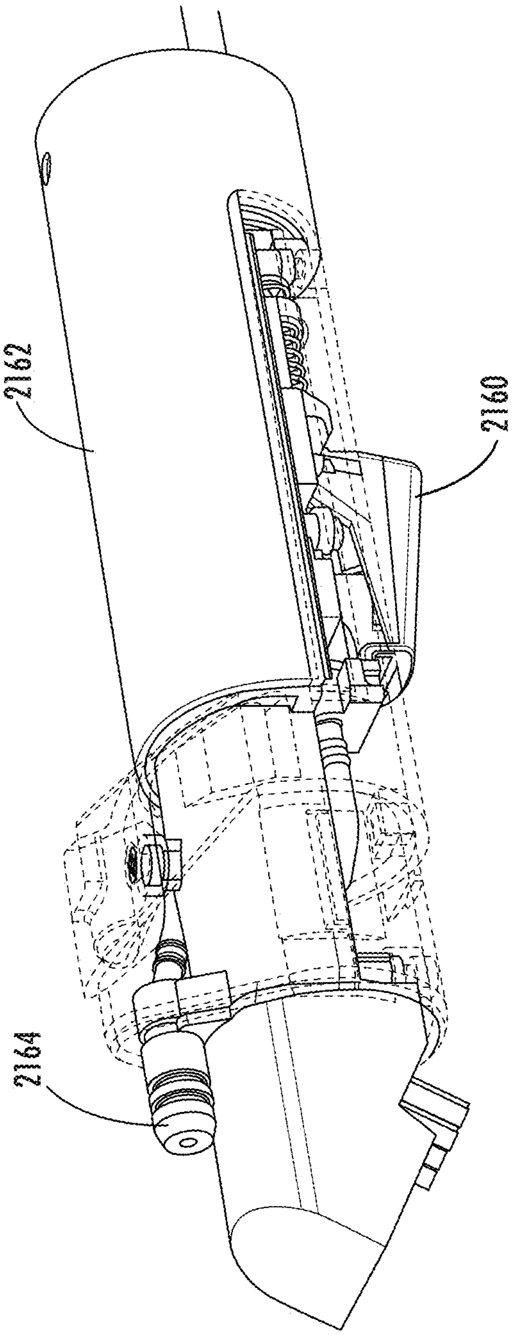
FIG. 21B shows a perspective view of an example of a cleaning tool having a fluid applicator and a cleaning fluid actuator on opposing sides of the cleaning tool, consistent with embodiments of the present disclosure.

As also shown in FIG. 21, the cleaning fluid actuator 1906 and the fluid applicator 2006 are disposed on a common side of the tool body 1900. For example, the cleaning fluid actuator 1906 and the fluid applicator 2006 may be disposed on a first side of the tool body 1900 and the assembly agitator 1914 may be disposed on a second side of the tool body 1900, wherein the first side is opposite the second side. In some instances, the cleaning fluid actuator 1906 and the fluid applicator 2006 are disposed on opposite sides of the tool body 1900. For example, the cleaning fluid actuator 1906 and the assembly agitator 1914 may be disposed on a first side of the tool body 1900 and the fluid applicator 2006 may be disposed on a second side of the tool body 1900, the first side being opposite the second side. The first and second sides may generally be described as being on opposing sides of the central longitudinal plane 2001 of the tool body 1900. FIG. 21B shows an example, wherein a cleaning fluid actuator 2160 is disposed on a first side of a tool body 2162 and a fluid applicator 2164 is disposed on a second side of the tool body 2162, the first side being opposite the second side.

Figure 22:
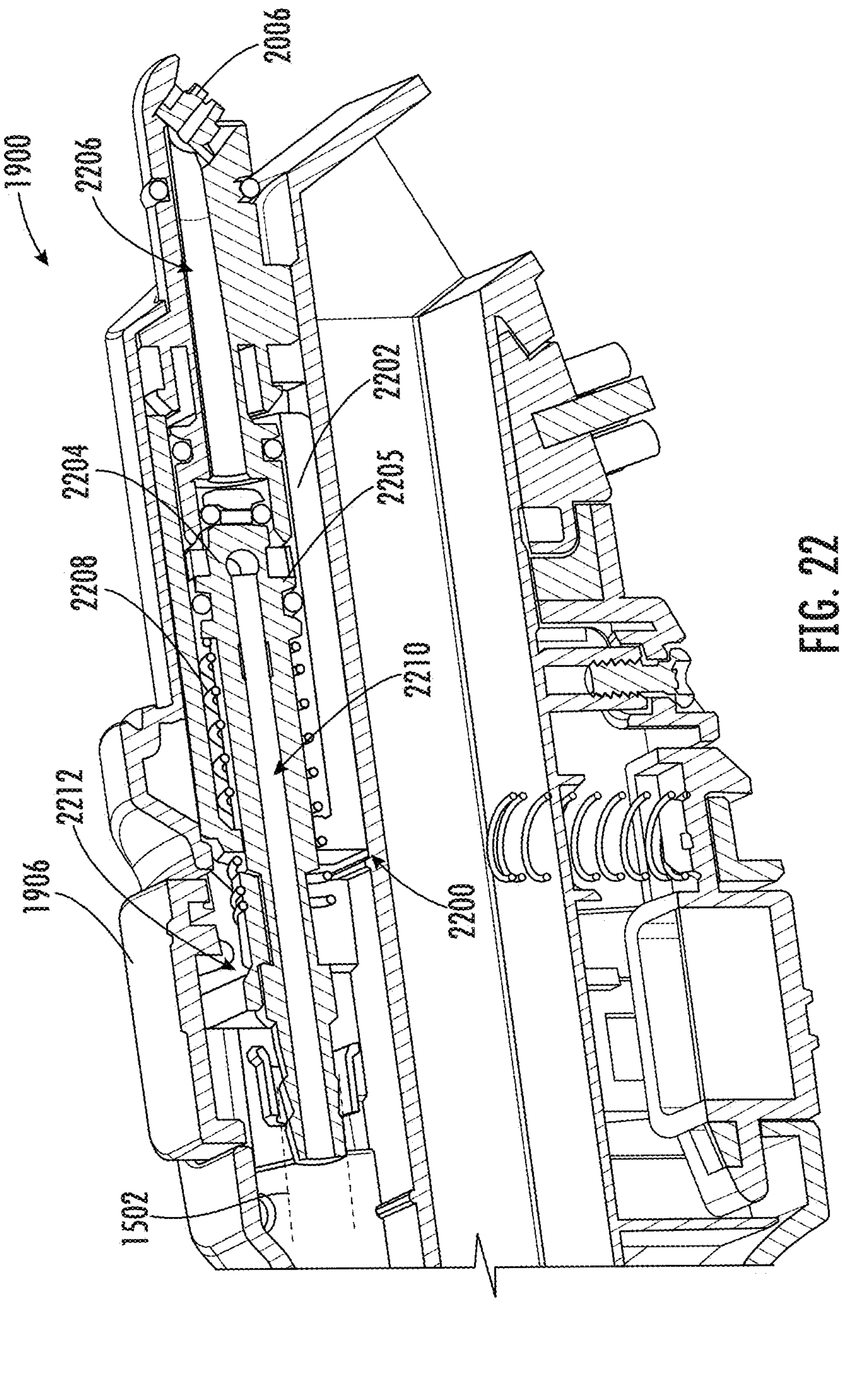
FIG. 22 is a cross-sectional magnified view of the cleaning tool of FIG. 19 corresponding to region XXII-XXII of FIG. 21, consistent with embodiments of the present disclosure.

FIG. 22 shows a magnified cross-sectional view corresponding to region XXII-XXII of FIG. 21 to better illustrate the cleaning fluid actuator 1906, wherein the cleaning assembly 1902 is removed from the tool body 1900 for clarity.

The cleaning fluid actuator 1906 may generally be described as being configured to selectively fluidly couple the fluid applicator 2006 to the fluid delivery pathway. For example, and as shown, the cleaning fluid actuator 1906 is configured to actuate a cleaning tool valve assembly 2200 (e.g., to transition the cleaning tool valve assembly 2200 between an open position and a closed position). The cleaning tool valve assembly 2200 includes a tool valve body 2202, a shuttle 2204 slidably received within the tool valve body 2202, and an outlet channel 2206 fluidly coupling the tool valve body 2202 to the fluid applicator 2006. The shuttle 2204 is configured to slide within the tool valve body 2202 when the cleaning tool valve assembly 2200 transitions between the open and the closed positions (e.g., such that the shuttle 2204 selectively sealingly engages the outlet channel 2206). When the cleaning tool valve assembly 2200 is in the closed position, the shuttle 2204 sealingly engages the outlet channel 2206 to prevent cleaning fluid from passing therethrough. When the cleaning tool valve assembly 2200 is in the open position, the shuttle 2204 sealingly disengages the outlet channel 2206 to allow cleaning fluid to pass therethrough. The shuttle 2204 may be biased into sealing engagement with the outlet channel 2206 (e.g., using a spring 2208). In some instances, the shuttle 2204 may include shuttle flanges 2205 that are configured such that, when a cleaning fluid is present, the cleaning fluid exerts a predetermined force on the shuttle flanges 2205. The exerted force may at least partially counteract a biasing force (e.g., a spring force of the spring 2208) exerted on the shuttle 2204. Such a configuration may reduce an amount of force a user is required to apply to the cleaning fluid actuator 1906 in order to actuate the cleaning fluid actuator 1906.

As shown, the shuttle 2204 defines a shuttle channel 2210 that fluidly couples the tool valve body 2202 to the fluid delivery pathway. For example, the shuttle channel 2210 may be fluidly coupled to the flexible tube 1502 such that cleaning fluid passes through the shuttle channel 2210 and into the tool valve body 2202. When the shuttle 2204 is transitioned to the open position, fluid within the tool valve body 2202 is permitted pass through the outlet channel 2206.

The cleaning fluid actuator 1906 is pivotally coupled to the tool body 1900 to transition between a resting state and a depressed state in response to a user input. When the cleaning fluid actuator 1906 is transitioned from the resting state to the depressed state, the cleaning fluid actuator 1906 causes the shuttle 2204 to move linearly such that the shuttle 2204 sealingly disengages the outlet channel 2206. When the cleaning fluid actuator 1906 is transitioned from the depressed state to the resting state, the spring 2208 urges the shuttle 2204 into sealing engagement with the outlet channel 2206. For example, and as shown, when transitioned to the depressed state, the cleaning fluid actuator 1906 may be configured to engage one or more ramped surfaces 2212 of the shuttle 2204, urging the shuttle 2204 to move linearly.

Figure 23:
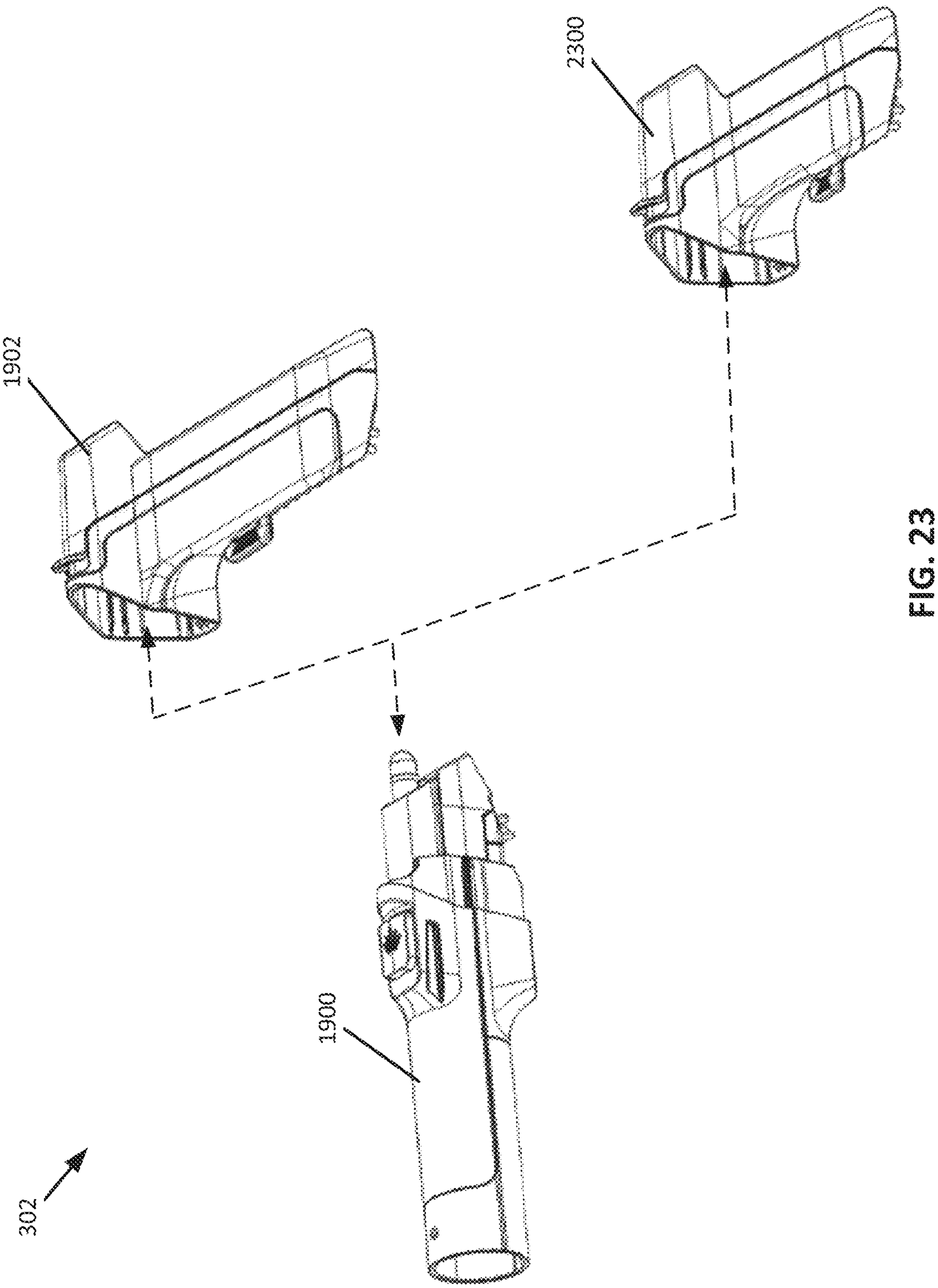
FIG. 23 is an exploded view of the cleaning tool of FIG. 19 showing a first and a second cleaning assembly configured to be removably coupled to a tool body of the cleaning tool, consistent with embodiments of the present disclosure.

FIG. 23 shows an example of the tool body 1900 being configured to couple to the cleaning assembly 1902 or an alternative cleaning assembly 2300. The alternative cleaning assembly 2300 may have a different size (e.g., smaller or larger) than the cleaning assembly 1902 to, for example, enable a user to clean in different spaces. Additionally, or alternatively, the alternative cleaning assembly 2300 may have a different cleaning configuration than the cleaning assembly 1902 (e.g., different cleaning elements such as a rotating agitator, ultraviolet lighting, and/or any other cleaning element).

As may be appreciated, when an upright extraction cleaner (e.g., the upright extraction cleaner 200 of FIG. 2) and a handheld extraction cleaner (e.g., the handheld extraction cleaner 100 of FIG. 1) both include the tool body 1900 (e.g., for above floor cleaning) a user may use the cleaning assemblies 1902 and 2300 interchangeably between the upright and handheld extraction cleaners. Additionally, or alternatively, the tool body 1900 may be configured to removably couple to flexible hoses (e.g., flexible hoses 116 and 216 of FIGS. 1 and 2) of an upright extraction cleaner (e.g., the upright extraction cleaner 200 of FIG. 2) and a handheld extraction cleaner (e.g., the handheld extraction cleaner 100 of FIG. 1) such that the cleaning tool 312 may be used interchangeably between the upright extraction cleaner and the handheld extraction cleaner.

Figure 24:
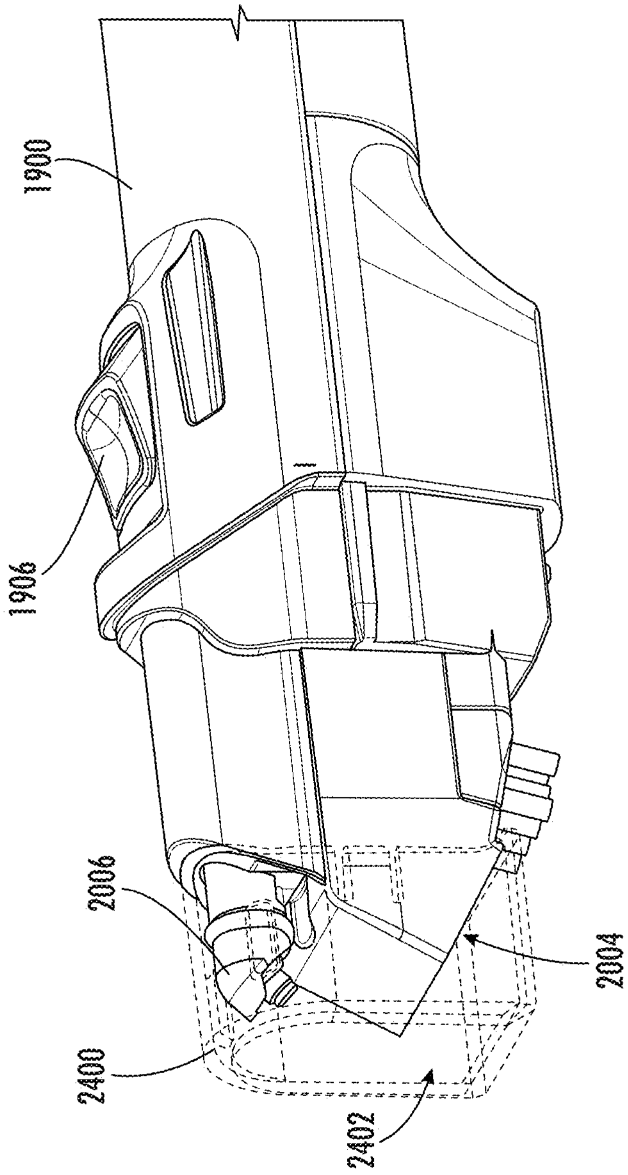
FIG. 24 shows a perspective view of a self-clean tool coupled to a tool body of the cleaning tool of FIG. 19, consistent with embodiments of the present disclosure.
Figure 24A:
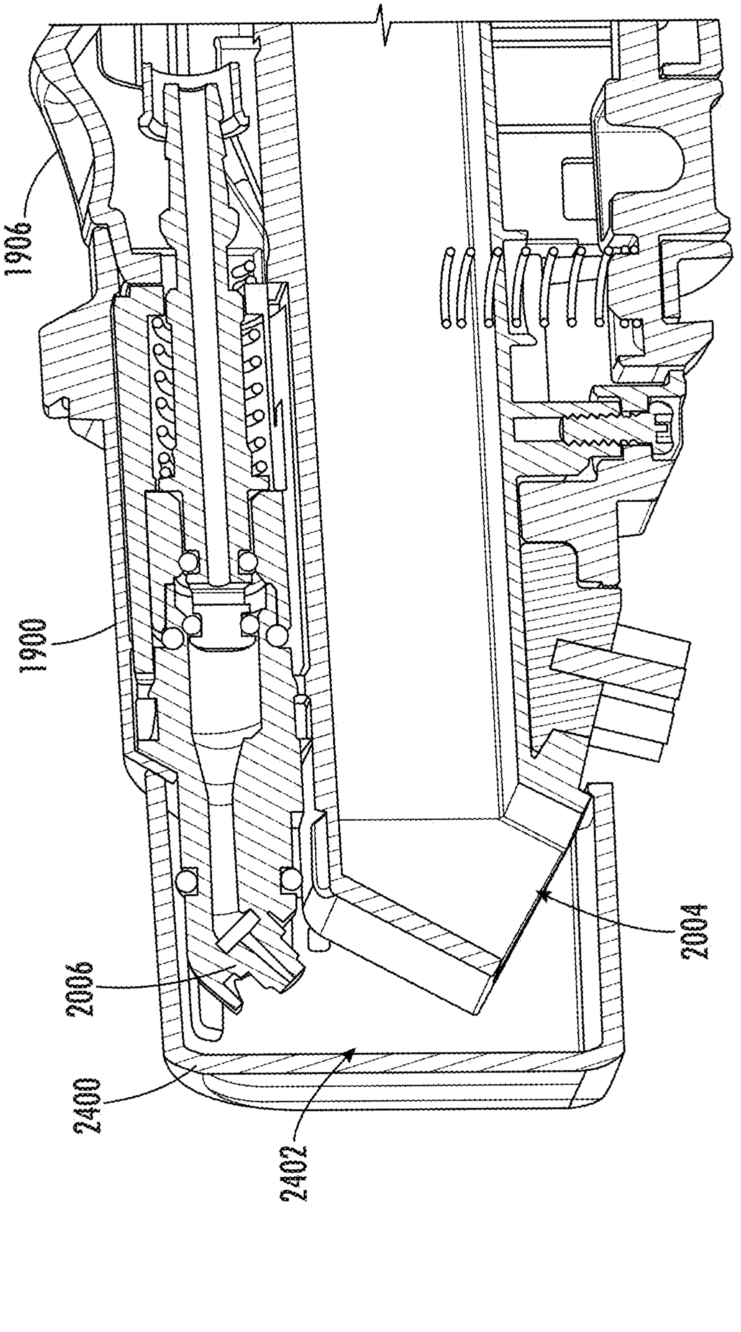
FIG. 24A shows a perspective cross-sectional view of the self-clean tool of FIG. 24, consistent with embodiments of the present disclosure.

FIGS. 24 and 24A shows an example of a self-clean tool 2400 removably coupled to the tool body 1900. The self-clean tool 2400 defines a self-clean tool cavity 2402 configured to removably couple to the tool body 1900 and to receive at least a portion of the tool body 1900. For example, the self-clean tool cavity 2402 may be configured to receive at least the suction inlet 2004 and the fluid applicator 2006. When the self-clean tool 2400 is coupled to the tool body 1900, cleaning fluid may be passed through the fluid applicator 2006 while the suction motor 1406 (FIG. 14) draws the applied cleaning fluid through the suction inlet 2004. In some instances, the self-clean tool 2400 may be configured to automatically cause cleaning fluid to pass through the fluid applicator 2006 (e.g., by actuating the cleaning fluid actuator 1906).

Figure 24B:
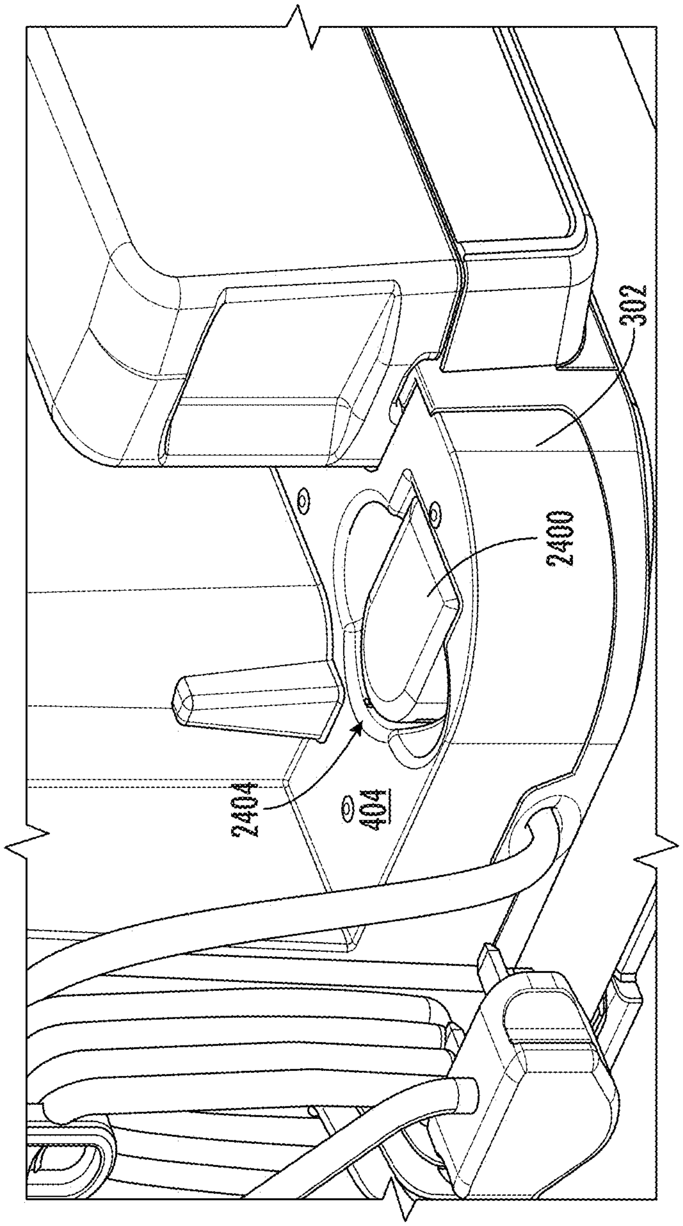
FIG. 24B shows a perspective view of a portion of a self-clean storage receptacle for removably receiving the self-clean tool of FIG. 24, consistent with embodiments of the present disclosure.

FIG. 24B shows an example of a self-clean tool storage receptacle 2404 that is defined within the cleaner body 302 and configured to removably receive the self-clean tool 2400. For example, and as shown, the self-clean tool storage receptacle 2404 may be defined in the supply tank platform 404. As such, when the supply tank 306 (FIG. 3) is coupled to the cleaner body 302, the self-clean tool storage receptacle 2404 is obscured from view.

Figure 25:
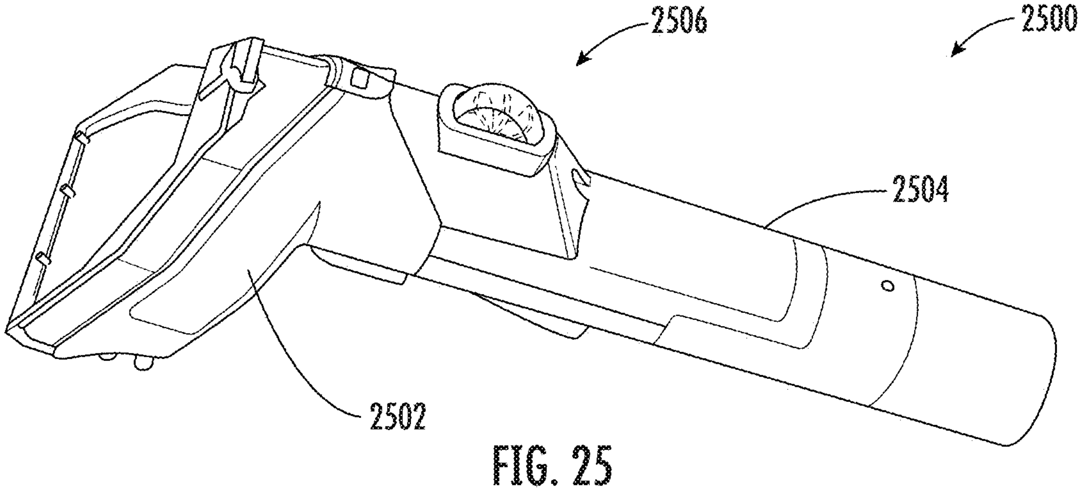
FIG. 25 shows a perspective view of a cleaning tool having a fluid flow visual indicator, consistent with embodiments of the present disclosure.

FIG. 25 shows an example of a cleaning tool 2500, which is an example of the cleaning tool 112 of FIG. 1. As shown, the cleaning tool 2500 includes a cleaning assembly 2502 removably coupled to a tool body 2504. The tool body 2504 includes a fluid flow visual indicator 2506. The fluid flow visual indicator 2506 is configured to provide a visual indication of fluid flow using one or more moving elements. The moving element is configured to move in response to cleaning fluid being applied to a surface to be cleaned.

Figure 26:
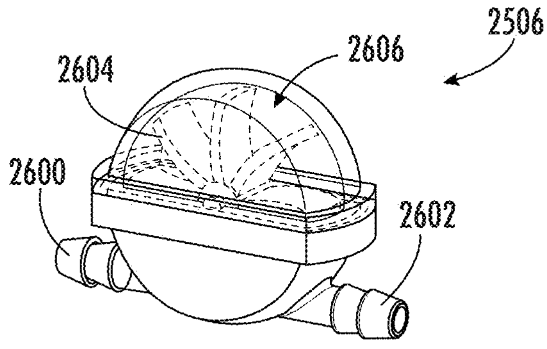
FIG. 26 shows a perspective view of an example of the fluid flow visual indicator of FIG. 25, consistent with embodiments of the present disclosure.

FIG. 26 shows an example of the fluid flow visual indicator 2506 removed from the tool body 2504. As shown, the fluid flow visual indicator 2506 includes an indicator fluid inlet 2600, an indicator fluid outlet 2602, and a spin wheel 2604 configured to rotate within a wheel cavity 2606 when cleaning fluid is incident on the spin wheel 2604. In operation, as cleaning fluid passes from the indicator fluid inlet 2600 to the indicator fluid outlet 2602, cleaning fluid is incident on the spin wheel 2604, causing the spin wheel 2604 to rotate. Rotation of the spin wheel 2604 is perceivable to a user of the cleaning tool 2500. While a spin wheel 2604 is shown as an example of a moving element, other configurations are possible. For example, floating beads and/or a rotating cylinder having one or more helical patterns printed thereon may be used as the moving element.

Figure 28:
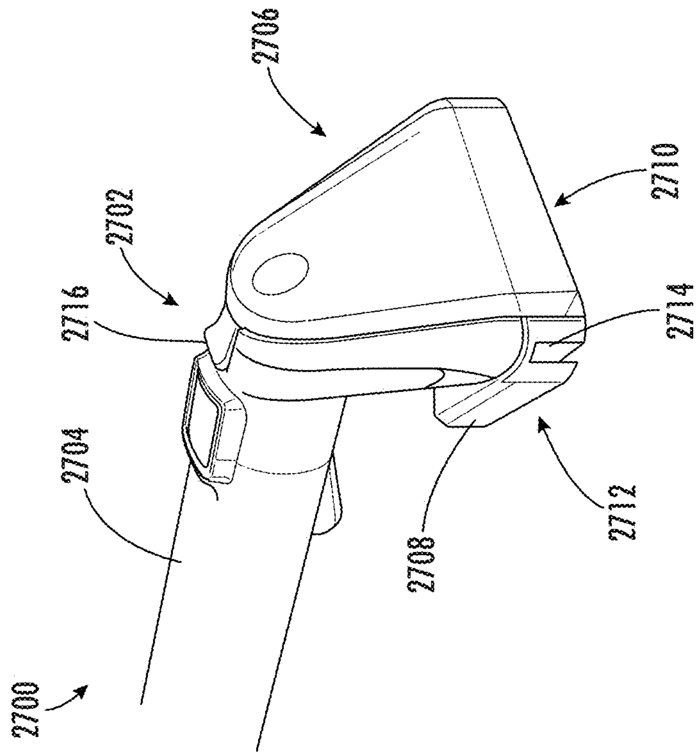
FIG. 28 shows a perspective view of the cleaning tool of FIG. 27 with the cleaning assembly in a retracted configuration, consistent with embodiments of the present disclosure.
Figure 27:
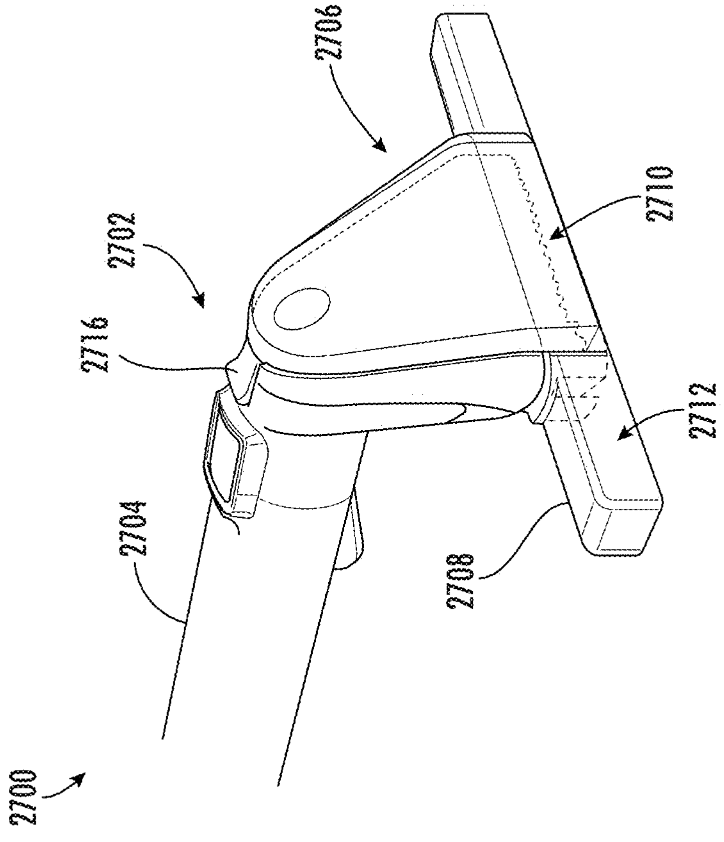
FIG. 27 shows a perspective view of a cleaning tool with a cleaning assembly in an expanded configuration, consistent with embodiments of the present disclosure.

FIGS. 27 and 28 show an example of a cleaning tool 2700, which is an example of the cleaning tool 112 of FIG. 1. As shown, the cleaning tool 2700 includes a cleaning assembly 2702 removably coupled to a tool body 2704. The cleaning assembly 2702 includes a nozzle assembly 2706 having pivoting arms 2708 and an assembly suction inlet 2710. The pivoting arms 2708 define a suction channel 2712 having a channel outlet 2714 configured to selectively fluidly couple to the assembly suction inlet 2710. As shown in FIG. 27, the pivoting arms 2708 are in an expanded position, wherein, when in the expanded position, the suction channel 2712 is fluidly coupled to the assembly suction inlet 2710. As shown in FIG. 28, the pivoting arms 2708 are in the retracted position, wherein, when in the retracted position, the suction channel 2712 is fluidly decoupled from the assembly suction inlet 2710. Such a configuration may allow a user to selectively change a cleaning width of the cleaning assembly 2702 (e.g., in response to actuation of an actuator 2716) to accommodate various cleaning environments. In some instances, the cleaning assembly 2702 may be further configured to adjust (e.g., widen) a spray pattern of cleaning fluid emitted from the cleaning tool 2700 based, at least in part, on whether the pivoting arms 2708 are in the expanded or retracted positions.

Figure 29:
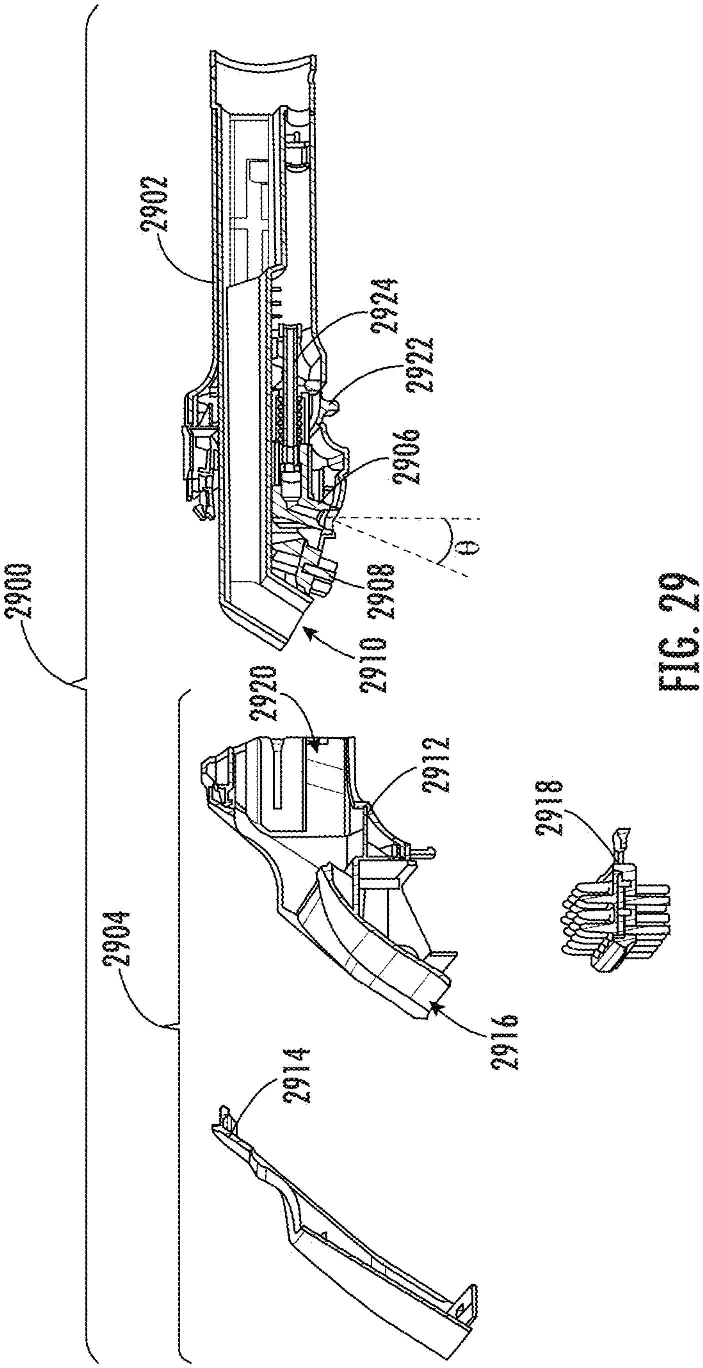
FIG. 29 shows a cross-sectional exploded view of a cleaning tool, consistent with embodiments of the present disclosure.
Figure 30:
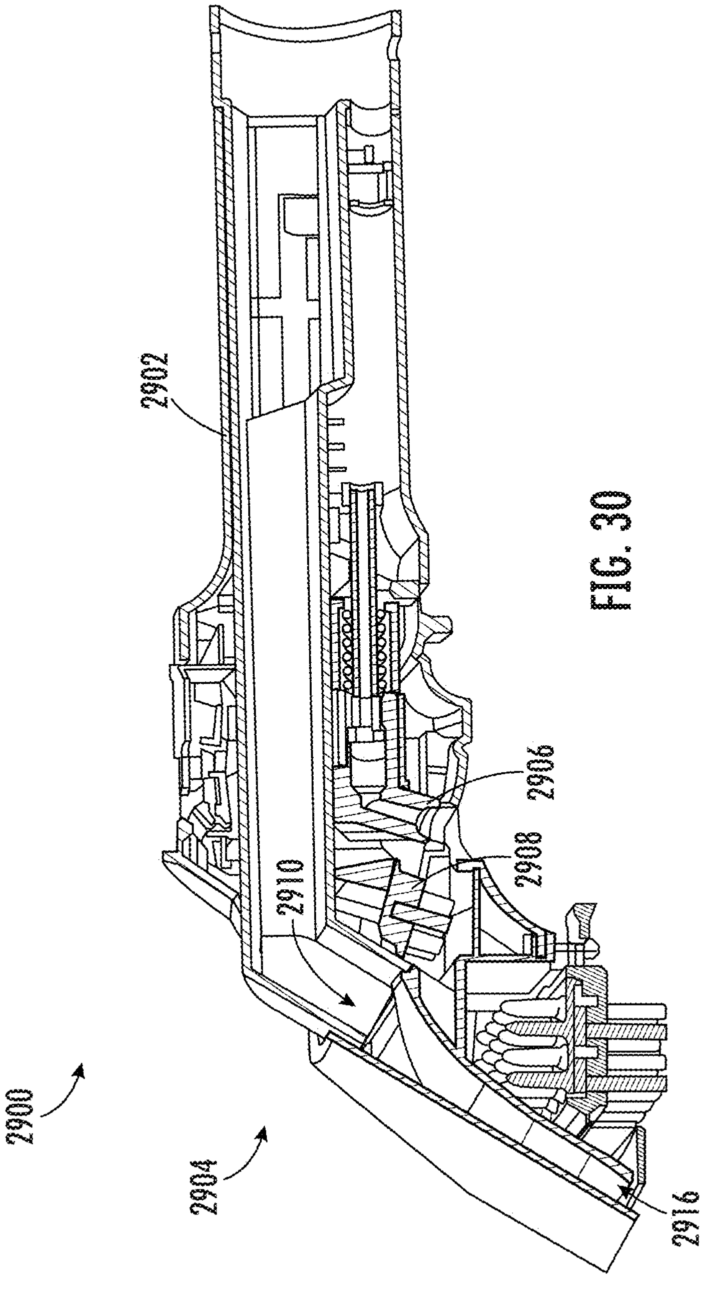
FIG. 30 shows an assembled cross-sectional view of the cleaning tool of FIG. 29, consistent with embodiments of the present disclosure.

FIG. 29 shows a cross-sectional exploded view of a cleaning tool 2900, which is an example of the cleaning tool 112 of FIG. 1. FIG. 30 shows a cross-sectional assembled view of the cleaning tool 2900.

As shown, the cleaning tool 2900 includes a tool body 2902 and a cleaning assembly 2904 removably coupled to the tool body 2902. The tool body 2902 includes a fluid applicator 2906, a body agitator 2908, and a suction inlet 2910. The body agitator 2908 is disposed between suction inlet 2910 and the fluid applicator 2906. The cleaning assembly 2904 includes an assembly body 2912, a nozzle cover 2914 removably coupled to the assembly body 2912 and defining at least a portion of a suction passageway 2916 extending between the nozzle cover 2914 and the assembly body 2912, and a removable assembly agitator 2918. The assembly body 2912 defines a tool body cavity 2920 for receiving at least a portion of the tool body 2902 (e.g., the body agitator 2908 and the suction inlet 2910) such that the suction inlet 2910 is fluidly coupled to the suction passageway 2916.

When the cleaning assembly 2904 is coupled to the tool body 2902, the assembly agitator 2918 is disposed between the nozzle cover 2914 and the fluid applicator 2906. In some instances, the fluid applicator 2906 can be oriented such that cleaning fluid is emitted in a direction of the nozzle cover 2914 and the assembly agitator 2918. For example, the fluid applicator 2906 can be oriented to emit fluid in a forward direction at an emission angle θ in a range of, for example, 5° to 25°. By way of further example, the emission angle θ may be about (e.g., within 1% of, 5% of, or 10% of) 15°.

The tool body 2902 may further include a cleaning fluid actuator 2922 configured to actuate a cleaning tool valve assembly 2924. As shown, the cleaning fluid actuator 2922 may include a pivoting slide switch that is configured to actuate the cleaning tool valve assembly 2924 in response to pivotal movement of the switch. A pivoting slide switch may reduce the risk of a user accidentally actuating the cleaning fluid actuator 2922 (e.g., when compared to a push button). In some instances, a secondary safety switch may be included, wherein the secondary safety switch needs to be actuated in order for the cleaning fluid actuator 2922 is activated. Such a configuration may reduce the risk of a user accidentally actuating the cleaning fluid actuator 2922.

An example of an extraction cleaner, consistent with the present disclosure, may include a cleaner body including a pump and a suction motor, a flexible hose including a fluid delivery pathway fluidly coupled to the pump and a recovery pathway fluidly coupled to the suction motor, a supply tank configured to be removably coupled to the cleaner body and configured to receive a first cleaning fluid, the supply tank being configured to be fluidly coupled to the fluid delivery pathway, an additive tank configured to receive a second cleaning fluid, the additive tank is configured to be at least partially received within an additive tank receptacle defined within the supply tank and the additive tank is configured to be fluidly coupled to the fluid delivery pathway, a recovery tank configured to be removably coupled to the cleaner body and configured to be fluidly coupled to the recovery pathway, and a cleaning tool including a fluid applicator and a cleaning assembly, the fluid applicator is configured to be selectively fluidly coupled to the fluid delivery pathway to selectively deliver one of the first cleaning fluid or a mixture of the first cleaning fluid and the second cleaning fluid to a surface to be cleaned and the cleaning assembly is configured to extract at least a portion of the delivered first cleaning fluid or at least a portion of the delivered mixture from the surface to be cleaned.

In some instances, the extraction cleaner may further include a control valve configured to selectively fluidly couple the additive tank to the fluid delivery pathway. In some instances, the extraction cleaner may further include a carry handle coupled to the cleaner body and an additive actuator coupled to the carry handle, the additive actuator configured to actuate the control valve. In some instances, the cleaning tool may include a cleaning fluid actuator configured to selectively fluidly couple the fluid applicator to the fluid delivery pathway. In some instances, the cleaning fluid actuator may be configured to actuate a cleaning tool valve assembly. In some instances, the cleaning tool valve assembly may include a tool valve body, a shuttle slidably received within the tool valve body, and an outlet channel fluidly coupling the tool valve body to the fluid applicator. In some instances, the shuttle may define a shuttle channel that fluidly couples the tool valve body to the fluid delivery pathway. In some instances, the shuttle may be configured to selectively sealingly engage the outlet channel. In some instances, the control valve may include a control valve body having a control valve inlet fluidly coupled to the additive tank and a control valve outlet and a plunger slidably received within the control valve body that is configured to selectively fluidly couple the control valve inlet to the control valve outlet, an actuation axis of the plunger extends transverse to an inlet axis of the control valve inlet and an outlet axis of the control valve outlet. In some instances, the plunger may move in response to movement of the additive actuator. In some instances, the cleaning tool may include a tool body and the cleaning assembly may be removably coupled to the tool body. In some instances, the tool body may include the fluid applicator, a suction inlet, and a body agitator. In some instances, at least a portion of the suction inlet may be disposed between the fluid applicator and the body agitator. In some instances, the cleaning assembly may include an assembly body having a tool body cavity that is configured to receive at least a portion of the tool body, a nozzle cover removably coupled to the assembly body, and an assembly agitator removably coupled to the assembly body. In some instances, the body agitator may be configured to be received within the tool body cavity. In some instances, the assembly agitator may include a first cleaning implement on a first side and a second cleaning implement on a second side, the first side being opposite the second side and the first cleaning implement being different from the second cleaning implement. In some instances, the recovery tank may include a recovery tank body, a recovery tank lid removably coupled to the recovery tank body, and a recovery tank handle pivotally coupled to the recovery tank body. In some instances, the recovery tank handle may be configured to pivot between a carry position, a storage position, and a lid removal position and, when the recovery tank handle is in the carry position, the recovery tank lid is prevented from being removed from the recovery tank body, and, when the recovery tank handle is in the lid removal position, the recovery tank lid is removable from recovery tank body. In some instances, the recovery tank body may include a standoff having a trunnion extending therefrom and the recovery tank handle includes a hook configured to pivot about the trunnion as the recovery tank handle pivots between the storage and lid removal positions. In some instances, when the recovery tank handle is in the storage position, removal of the recovery tank lid from the recovery tank body is prevented. In some instances, the recovery tank body may include a collection chamber and the recovery tank lid may include a recovery downpipe and an exhaust downpipe, the recovery and exhaust downpipes being external to the collection chamber. In some instances, the recovery tank lid may include a recovery pathway fluidly coupling the recovery downpipe to the collection chamber and an exhaust pathway fluidly coupling the exhaust downpipe to the collection chamber. In some instances, the recovery tank lid may include a plurality of float tracks extending from opposing sides of a lid exhaust outlet of the exhaust pathway and a float that is disposed between the float tracks and slidably coupled to the float tracks. In some instances, the recovery tank body may include a recovery tank catch for removably coupling the recovery tank to the cleaner body and the recovery tank body defines a catch cavity for receiving at least a portion of the recovery tank catch and a catch plate extends over at least a portion of an open end of the catch cavity to retain the recovery tank catch within the catch cavity. In some instances, the supply tank may include a supply tank body, a supply tank refill top removably coupled to the supply tank body, and a supply tank cap coupled to the supply tank body, the supply tank cap defining a cap cavity that receives at least a portion of a supply tank catch, the supply tank catch configured to removably couple the supply tank to the cleaner body.

An example of a cleaning tool for an extraction cleaner, consistent with the present disclosure, may include a tool body including a fluid applicator, a body agitator, and a suction inlet, at least a portion of the suction inlet is disposed between the fluid applicator and the body agitator and a cleaning assembly removably coupled to the tool body, the cleaning assembly having an assembly body, a nozzle cover removably coupled to the assembly body, and an assembly agitator removably coupled to the assembly body, the assembly body including a tool body cavity configured to receive at least a portion of the suction inlet, the fluid applicator, and the body agitator.

In some instances, the cleaning tool may further include a cleaning fluid actuator configured to actuate a cleaning tool valve assembly. In some instances, the cleaning tool valve assembly may include a tool valve body, a shuttle slidably received within the tool valve body, and an outlet channel fluidly coupling the tool valve body to the fluid applicator. In some instances, the shuttle may define a shuttle channel that is configured to fluidly couple the tool valve body to a fluid delivery pathway. In some instances, the shuttle may be configured to selectively sealingly engage the outlet channel.

Another example of an extraction cleaner, consistent with the present disclosure, may include a cleaner body including a pump and a suction motor, a flexible hose including a fluid delivery pathway fluidly coupled to the pump and a recovery pathway fluidly coupled to the suction motor, a supply tank configured to be removably coupled to the cleaner body and configured to receive a first cleaning fluid, the supply tank being configured to be fluidly coupled to the fluid delivery pathway, an additive tank configured to receive a second cleaning fluid and configured to be fluidly coupled to the fluid delivery pathway, a recovery tank configured to be removably coupled to the cleaner body and configured to be fluidly coupled to the recovery pathway, a carry handle coupled to the cleaner body, an additive actuator coupled to the carry handle, the additive actuator configured to selectively fluidly couple the additive tank to the fluid delivery pathway, and a cleaning tool including a fluid applicator and a cleaning assembly, the fluid applicator is configured to be selectively fluidly coupled to the fluid delivery pathway to selectively deliver one of the first cleaning fluid or a mixture of the first cleaning fluid and the second cleaning fluid to a surface to be cleaned and the cleaning assembly is configured to extract at least a portion of the delivered first cleaning fluid or at least a portion of the delivered mixture from the surface to be cleaned.

In some instances, the additive tank may be configured to be at least partially received within an additive tank receptacle defined within the supply tank. In some instances, the extraction cleaner may further include a control valve configured to selectively fluidly couple the additive tank to the fluid delivery pathway, the additive actuator configured to actuate the control valve. In some instances, the cleaning tool may include a cleaning fluid actuator configured to selectively fluidly couple the fluid applicator to the fluid delivery pathway. In some instances, the cleaning fluid actuator may be configured to actuate a cleaning tool valve assembly. In some instances, the cleaning tool valve assembly may include a tool valve body, a shuttle slidably received within the tool valve body, and an outlet channel fluidly coupling the tool valve body to the fluid applicator. In some instances, the shuttle may define a shuttle channel that fluidly couples the tool valve body to the fluid delivery pathway. In some instances, the shuttle may be configured to selectively sealingly engage the outlet channel. In some instances, the control valve may include a control valve body having a control valve inlet fluidly coupled to the additive tank and a control valve outlet and a plunger slidably received within the control valve body that is configured to selectively fluidly couple the control valve inlet to the control valve outlet, an actuation axis of the plunger extends transverse to an inlet axis of the control valve inlet and an outlet axis of the control valve outlet. In some instances, the plunger may move in response to movement of the additive actuator. In some instances, the cleaning tool may include a tool body and the cleaning assembly is removably coupled to the tool body. In some instances, the tool body may include the fluid applicator, a suction inlet, and a body agitator. In some instances, at least a portion of the suction inlet may be disposed between the fluid applicator and the body agitator. In some instances, the cleaning assembly may include an assembly body having a tool body cavity that is configured to receive at least a portion of the tool body, a nozzle cover removably coupled to the assembly body, and an assembly agitator removably coupled to the assembly body. In some instances, the body agitator may be configured to be received within the tool body cavity. In some instances, the assembly agitator may include a first cleaning implement on a first side and a second cleaning implement on a second side, the first side being opposite the second side and the first cleaning implement being different from the second cleaning implement. In some instances, the recovery tank may include a recovery tank body, a recovery tank lid removably coupled to the recovery tank body, and a recovery tank handle pivotally coupled to the recovery tank body. In some instances, the recovery tank handle may be configured to pivot between a carry position, a storage position, and a lid removal position and, when the recovery tank handle is in the carry position, the recovery tank lid is prevented from being removed from the recovery tank body, and, when the recovery tank handle is in the lid removal position, the recovery tank lid is removable from recovery tank body. In some instances, the recovery tank body may include a standoff having a trunnion extending therefrom and the recovery tank handle includes a hook configured to pivot about the trunnion as the recovery tank handle pivots between the storage and lid removal positions. In some instances, when the recovery tank handle is in the storage position, removal of the recovery tank lid from the recovery tank body is prevented. In some instances, the recovery tank body may include a collection chamber and the recovery tank lid may include a recovery downpipe and an exhaust downpipe, the recovery and exhaust downpipes being external to the collection chamber. In some instances, the recovery tank lid may include a recovery pathway fluidly coupling the recovery downpipe to the collection chamber and an exhaust pathway fluidly coupling the exhaust downpipe to the collection chamber. In some instances, the recovery tank lid may include a plurality of float tracks extending from opposing sides of a lid exhaust outlet of the exhaust pathway and a float that is disposed between the float tracks and slidably coupled to the float tracks. In some instances, the recovery tank body may include a recovery tank catch for removably coupling the recovery tank to the cleaner body and the recovery tank body defines a catch cavity for receiving at least a portion of the recovery tank catch and a catch plate extends over at least a portion of an open end of the catch cavity to retain the recovery tank catch within the catch cavity. In some instances, the supply tank may include a supply tank body, a supply tank refill top removably coupled to the supply tank body, and a supply tank cap coupled to the supply tank body, the supply tank cap defining a cap cavity that receives at least a portion of a supply tank catch, the supply tank catch configured to removably couple the supply tank to the cleaner body.

Another example of an extraction cleaner, consistent with the present disclosure, may include a cleaner body including a pump and a suction motor, a flexible hose including a fluid delivery pathway fluidly coupled to the pump and a recovery pathway fluidly coupled to the suction motor, a supply tank configured to be removably coupled to the cleaner body and configured to receive a first cleaning fluid, the supply tank being configured to be fluidly coupled to the fluid delivery pathway, an additive tank configured to receive a second cleaning fluid and configured to be fluidly coupled to the fluid delivery pathway, a recovery tank configured to be removably coupled to the cleaner body and configured to be fluidly coupled to the recovery pathway, and a cleaning tool including a tool body having a fluid applicator, a suction inlet, and a body agitator, the fluid applicator is configured to be selectively fluidly coupled to the fluid delivery pathway to deliver one of the first cleaning fluid or a mixture of the first cleaning fluid and the second cleaning fluid to a surface to be cleaned and a cleaning assembly removably coupled to the tool body and fluidly coupled to the suction inlet and configured to extract at least a portion of the delivered first cleaning fluid or at least a portion of the delivered mixture from the surface to be cleaned.

In some instances, the extraction cleaner may further include a carry handle coupled to the cleaner body and an additive actuator coupled to the carry handle, the additive actuator configured to selectively fluidly couple the additive tank to the fluid delivery pathway. In some instances, the extraction cleaner may further include a control valve configured to selectively fluidly couple the additive tank to the fluid delivery pathway, the additive actuator configured to actuate the control valve. In some instances, the cleaning tool may include a cleaning fluid actuator configured to selectively fluidly couple the fluid applicator to the fluid delivery pathway. In some instances, the cleaning fluid actuator may be configured to actuate a cleaning tool valve assembly. In some instances, the cleaning tool valve assembly may include a tool valve body, a shuttle slidably received within the tool valve body, and an outlet channel fluidly coupling the tool valve body to the fluid applicator. In some instances, the shuttle may define a shuttle channel that fluidly couples the tool valve body to the fluid delivery pathway. In some instances, the shuttle may be configured to selectively sealingly engage the outlet channel. In some instances, the control valve includes a control valve body having a control valve inlet fluidly coupled to the additive tank and a control valve outlet and a plunger slidably received within the control valve body that is configured to selectively fluidly couple the control valve inlet to the control valve outlet, an actuation axis of the plunger extends transverse to an inlet axis of the control valve inlet and an outlet axis of the control valve outlet. In some instances, the plunger may move in response to movement of the additive actuator. In some instances, at least a portion of the suction inlet may be disposed between the fluid applicator and the body agitator. In some instances, the cleaning assembly may include an assembly body having a tool body cavity that is configured to receive at least a portion of the tool body, a nozzle cover removably coupled to the assembly body, and an assembly agitator removably coupled to the assembly body. In some instances, the body agitator may be configured to be received within the tool body cavity. In some instances, the assembly agitator may include a first cleaning implement on a first side and a second cleaning implement on a second side, the first side being opposite the second side and the first cleaning implement being different from the second cleaning implement. In some instances, the recovery tank may include a recovery tank body, a recovery tank lid removably coupled to the recovery tank body, and a recovery tank handle pivotally coupled to the recovery tank body. In some instances, the recovery tank handle may be configured to pivot between a carry position, a storage position, and a lid removal position and, when the recovery tank handle is in the carry position, the recovery tank lid is prevented from being removed from the recovery tank body, and, when the recovery tank handle is in the lid removal position, the recovery tank lid is removable from recovery tank body. In some instances, the recovery tank body may include a standoff having a trunnion extending therefrom and the recovery tank handle includes a hook configured to pivot about the trunnion as the recovery tank handle pivots between the storage and lid removal positions. In some instances, when the recovery tank handle is in the storage position, removal of the recovery tank lid from the recovery tank body may be prevented. In some instances, the recovery tank body may include a collection chamber and the recovery tank lid may include a recovery downpipe and an exhaust downpipe, the recovery and exhaust downpipes being external to the collection chamber. In some instances, the recovery tank lid may include a recovery pathway fluidly coupling the recovery downpipe to the collection chamber and an exhaust pathway fluidly coupling the exhaust downpipe to the collection chamber. In some instances, the recovery tank lid may include a plurality of float tracks extending from opposing sides of a lid exhaust outlet of the exhaust pathway and a recovery float that is disposed between the float tracks and slidably coupled to the float tracks. In some instances, the recovery tank body may include a recovery tank catch for removably coupling the recovery tank to the cleaner body and the recovery tank body defines a catch cavity for receiving at least a portion of the recovery tank catch and a catch plate extends over at least a portion of an open end of the catch cavity to retain the recovery tank catch within the catch cavity. In some instances, the supply tank may include a supply tank body, a supply tank refill top removably coupled to the supply tank body, and a supply tank cap coupled to the supply tank body, the supply tank cap defining a cap cavity that receives at least a portion of a supply tank catch, the supply tank catch configured to removably couple the supply tank to the cleaner body. In some instances, the additive tank may be configured to be at least partially received within an additive tank receptacle defined within the supply tank. In some instances, the additive tank may include a removable additive tank refill top that includes a cage that defines a cage cavity having one or more cage openings and an additive float moveably disposed within the cage cavity. In some instances, when pivoted to the lid removal position, the recovery tank handle may be configured to urge the recovery tank lid in a direction away from the recovery tank body such that the recovery tank lid is at least partially removed from an open end of the recovery tank body.

An example of a cleaning system, consistent with the present disclosure, may include a handheld extraction cleaner, an upright extraction cleaner, and an interchangeable cleaning tool configured to be used interchangeably with the handheld extraction cleaner and the upright extraction cleaner.

An example of a method for cleaning carpet or fabric, consistent with the present disclosure, may include the steps of providing an aqueous based cleaning solution and an aqueous based oxidizing solution wherein the aqueous based cleaning solution is at a pH of >7.0 and comprises water, metal chelating agent, and a source of carbonate anion ($CO_3^{2-}$) and the aqueous based oxidizing solution is at a pH of <7.0 and comprises water and a peroxygen compound. A free-radical scavenger is present in the aqueous based cleaning solution and/or the aqueous based oxidizing solution. This is followed by mixing and dispensing the aqueous based cleaning solution with the aqueous based oxidizing solution on a carpet or fabric. The mixed composition is at a pH of 9.0 to 10.0 and comprises water, peroxygen compound at a molar concentration of $5.0\times10^{-2}$ 2 to $2.1\times10^{-1}$, metal chelating agent at a molar concentration of $1.70\times10^{-3}$ to $5.2\times10^{-3}$, carbonate anion ($CO_3^{2-}$) at a molar concentration of $1\times10^{-2}$ to $5.0\times10^{-2}$ and free-radical scavenger at a molar concentration of $2.0\times10^{-3}$ to $1.1\times10^{-1}$.

An example of a kit for cleaning carpet or fabric, consistent with the present disclosure, may include a first aqueous based cleaning solution at a pH of >7.0 comprising water, metal chelating agent, and a water soluble source of carbonate anion ($CO_3^{2-}$) and a second aqueous based oxidizing solution at a pH of <7.0 comprising water and a peroxygen compound. A free-radical scavenger is present in the aqueous based cleaning solution and/or the aqueous based oxidizing solution. The first and second aqueous solutions are configured to be combined and provide an aqueous based carpet or fabric cleaning composition, comprising water, peroxygen compound at a molar concentration of $5.0\times10^{-2}$ to $2.1\times10^{-1}$, metal chelating agent at a molar concentration of $1.70\times10^{-3}$ to $5.2\times10^{-3}$, carbonate anion ($CO_3^{2-}$) at a molar concentration of $1\times10^{-2}$ to $5.0\times10^{-2}$, free-radical scavenger at a molar concentration of $2.0\times10^{-3}$ to $1.1\times10^{-1}$, wherein the aqueous based carpet or fabric cleaning composition has a pH of 9.0 to 10.0.

Another example of an extraction cleaner, consistent with the present disclosure, may include a cleaner body including a pump and a suction motor, a flexible hose including a fluid delivery pathway fluidly coupled to the pump and a recovery pathway fluidly coupled to the suction motor, a supply tank configured to be removably coupled to the cleaner body and being configured to be fluidly coupled to the fluid delivery pathway, the supply tank including a relatively basic first aqueous based cleaning solution, an additive tank configured to be fluidly coupled to the fluid delivery pathway, the additive tank including a relatively acidic second aqueous based oxidizing solution, a recovery tank configured to be removably coupled to the cleaner body and configured to be fluidly coupled to the recovery pathway, and a cleaning tool configured to be fluidly coupled to the supply tank, the additive tank, and the recovery tank.

In some instances, the first aqueous based cleaning solution and the second aqueous based oxidizing solution may be mixed prior to application to a surface to be cleaned to form an aqueous based cleaning composition. In some instances, the aqueous based cleaning composition may include water, peroxygen compound at a molar concentration of $5.0\times10^{-2}$ to $2.1\times10^{-1}$, metal chelating agent at a molar concentration of $1.70\times10^{-3}$ to $5.2\times10^{-3}$, carbonate anion ($CO_3^{2-}$) at a molar concentration of $1\times10^{-2}$ to $5.0\times10^{-2}$, free-radical scavenger at a molar concentration of $2.0\times10^{-3}$ to $1.1\times10^{-1}$ and wherein the composition has a pH of 9.0 to 10.0. In some instances, the peroxygen compound may include hydrogen peroxide. In some instances, the peroxygen compound may include sodium peroxide or urea hydrogen peroxide. In some instances, the peroxygen compound may include an alkyl hydroperoxide or an aryl hydroperoxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid.

An example of an aqueous based carpet or fabric cleaning composition, consistent with the present disclosure, may include water, peroxygen compound at a molar concentration of $5.0\times10^{-2}$ to $2.1\times10^{-1}$, metal chelating agent at a molar concentration of $1.70\times10^{-3}$ to $5.2\times10^{-3}$, carbonate anion ($CO_3^{2-}$) at a molar concentration of $1\times10^{-2}$ to $5.0\times10^{-2}$, free-radical scavenger at a molar concentration of $2.0\times10^{-3}$ to $1.1\times10^{-1}$ and wherein the composition has a pH of 9.0 to 10.0.

In some instances, the peroxygen compound may include hydrogen peroxide. In some instances, the peroxygen compound may include sodium peroxide or urea hydrogen peroxide. In some instances, the peroxygen compound may include an alkyl hydroperoxide or an aryl hydroperoxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid.

Another example of a method for cleaning carpet or fabric, consistent with the present disclosure, may include the steps of providing an aqueous based cleaning solution and an aqueous based oxidizing solution wherein the aqueous based cleaning solution is at a pH of >7.0 and comprises water, metal chelating agent, and a water soluble source of carbonate anion ($CO_3^{2-}$) and the aqueous based oxidizing solution is at a pH of <7.0 and comprises water and a peroxygen compound, a free-radical scavenger present in the aqueous based cleaning solution and/or the aqueous based oxidizing solution, mixing and dispensing the aqueous based cleaning solution with the aqueous based oxidizing solution on a carpet or fabric, wherein the mixed composition is at a pH of 9.0 to 10.0 and comprises water, peroxygen compound at a molar concentration of $5.0\times10^{-2}$ to $2.1\times10^{-1}$, metal chelating agent at a molar concentration of $1.70\times10^{-3}$ to $5.2\times10^{-3}$, carbonate anion ($CO_3^{2-}$) at a molar concentration of $1\times10^{-2}$ to $5.0\times10^{-2}$, and free-radical scavenger at a molar concentration of $2.0\times10^{-3}$ to $1.1\times10^{-1}$.

In some instances, the peroxygen compound may include hydrogen peroxide. In some instances, the peroxygen compound may include sodium peroxide, urea hydrogen peroxide, or mixtures thereof. In some instances, the peroxygen compound may include an alkyl hydroperoxide or an aryl hydroperoxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid. In some instances, the water soluble source of carbonate anion may include an alkali metal carbonate or alkali metal bicarbonate. In some instances, the source of carbonate anion may be selected from the group consisting of sodium bicarbonate, potassium bicarbonate, potassium carbonate and sodium carbonate.

Another example of a kit for cleaning carpet or fabric, consistent with the present disclosure, may include a first aqueous based cleaning solution at a pH of >7.0 comprising water, metal chelating agent, and a water soluble source of carbonate anion ($CO_3^{2-}$), a second aqueous based oxidizing solution at a pH of <7.0 comprising water and a peroxygen compound, a free-radical scavenger present in the aqueous based cleaning solution and/or the aqueous based oxidizing solution, wherein the first and second aqueous solutions are configured to be combined and provide an aqueous based carpet or fabric cleaning composition, comprising water, peroxygen compound at a molar concentration of $5.0\times10^{-2}$ to $2.1\times10^{-1}$, metal chelating agent at a molar concentration of $1.70\times10^{-3}$ to $5.2\times10^{-3}$, carbonate anion ($CO_3^{2-}$) at a molar concentration of $1\times10^{-2}$ to $5.0\times10^{-2}$, free-radical scavenger at a molar concentration of $2.0\times10^{-3}$ to $1.1\times10^{-1}$ and wherein the aqueous based carpet or fabric cleaning composition has a pH of 9.0 to 10.0.

In some instances, the peroxygen compound may include hydrogen peroxide. In some instances, the free radical scavenger may be selected from the group consisting of glycine, sarcosine, lysine, serine, glutamic acid, and mixtures thereof. In some instances, the free radical scavenger may be selected from the group consisting of 2-methoxyethylamine, glucosamine, morpholine, piperdine, ethylamine and 3-amino-1-propanol, and mixture thereof. In some instances, the metal chelating agent may have relatively higher binding affinity to transition metals than to calcium and magnesium divalent ions. In some instances, the metal chelating agent may include ethylenediamine-N,N'-disuccinic acid. In some instances, the water soluble source of carbonate anion may include an alkali metal carbonate or alkali metal bicarbonate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An extraction cleaner comprising:

a cleaner body including a pump and a suction motor;

a supply tank configured to be removably coupled to the cleaner body, the supply tank including a relatively basic first aqueous based cleaning solution;

an additive tank including a relatively acidic second aqueous based oxidizing solution;

a recovery tank configured to be removably coupled to the cleaner body;

a cleaning tool configured to be fluidly coupled to the supply tank, the additive tank, and the recovery tank; and wherein the first aqueous based cleaning solution and second aqueous based oxidizing solution are mixed prior to application to a surface to be cleaned to form an aqueous based cleaning composition comprising water, peroxygen compound at a molar concentration of $5.0\times10^{-2}$ to $2.1\times10^{-1}$, metal chelating agent at a molar concentration of $1.70\times10^{-3}$ to $5.2\times10^{-3}$, carbonate anion ($CO_3^{2-}$) at a molar concentration of $1\times10^{-2}$ to $5.0\times10^{-2}$, free-radical scavenger at a molar concentration of $2.0\times10^{-3}$ to $1.1\times10^{-1}$ and wherein the composition has a pH of 9.0 to 10.0.

2. The extraction cleaner of claim 1, wherein the peroxygen compound comprises hydrogen peroxide.

3. The extraction cleaner of claim 1, wherein the peroxygen compound comprises sodium peroxide or urea hydrogen peroxide.

4. The extraction cleaner of claim 1, wherein the peroxygen compound comprises an alkyl hydroperoxide or an aryl hydroperoxide.

5. The extraction cleaner of claim 1, wherein the free radical scavenger is selected from the group consisting of glycine, sarcosine, lysine, serine, glutamic acid, and mixtures thereof.

6. The extraction cleaner of claim 1, wherein the free radical scavenger is selected from the group consisting of 2-methoxyethylamine, glucosamine, morpholine, piperdine, ethylamine and 3-amino-1-propanol, and mixture thereof.

7. The extraction cleaner of claim 1, wherein the metal chelating agent has relatively higher binding affinity to transition metals than to calcium and magnesium divalent ions.

8. The extraction cleaner of claim 1, wherein the metal chelating agent comprises ethylenediamine-N,N'-disuccinic acid.

* * * * *